(12) United States Patent
Takagi

(10) Patent No.: US 10,725,984 B2
(45) Date of Patent: Jul. 28, 2020

(54) TIME SERIES DATA DEVICE, TIME SERIES DATA PROCESSING METHOD AND TIME SERIES DATA PROCESSING PROGRAM STORAGE MEDIUM

(71) Applicant: NEC CORPORATION, Tokyo (JP)

(72) Inventor: Masamichi Takagi, Toyko (JP)

(73) Assignee: NEC CORPORATION, Tokyo (JP)

( * ) Notice: Subject to any disclaimer, the term of this patent is extended or adjusted under 35 U.S.C. 154(b) by 1434 days.

(21) Appl. No.: 14/381,231

(22) PCT Filed: Mar. 5, 2013

(86) PCT No.: PCT/JP2013/001365
§ 371 (c)(1),
(2) Date: Aug. 27, 2014

(87) PCT Pub. No.: WO2013/136718
PCT Pub. Date: Sep. 19, 2013

(65) Prior Publication Data
US 2015/0106332 A1    Apr. 16, 2015

(30) Foreign Application Priority Data
Mar. 16, 2012 (JP) .................. 2012-060862

(51) Int. Cl.
*G06F 17/30* (2006.01)
*G06F 16/21* (2019.01)
(Continued)

(52) U.S. Cl.
CPC .............. *G06F 16/219* (2019.01); *G06F 9/46* (2013.01); *G06F 16/24568* (2019.01)

(58) Field of Classification Search
CPC ..................... G06F 17/30575; G06F 17/30607
(Continued)

(56) References Cited

U.S. PATENT DOCUMENTS 8,326,836 B1 * 12/2012 Pike .................... G06F 16/9537
707/739
2003/0159077 A1 * 8/2003 Matsuo ................. G06F 1/3203
713/300
(Continued)

FOREIGN PATENT DOCUMENTS

JP    2000-137620    5/2000
JP    2001-075908    3/2001
(Continued)

OTHER PUBLICATIONS

International Search Report—PCT/JP2013/001365—dated Apr. 9, 2013.
(Continued)

*Primary Examiner* — Jeff A Burke
(74) *Attorney, Agent, or Firm* — Young & Thompson

(57) ABSTRACT

Provided is a time series data device with which, when a process is changed, results of both a new and an old process are not outputted to the outside being mixed, and the results of the old process before and after the process is changed can be outputted to the outside. The device is equipped with: a first processing unit that executes a first process and outputs first results data; a second processing unit that executes a second process and outputs second results data; and a control unit that, when an instruction to change a process is received, determines whether the first process can be stopped, and generates first and second results data sets by appending identification information corresponding to process contents to the respective first and second results data.

15 Claims, 43 Drawing Sheets

(51) Int. Cl.
*G06F 9/46* (2006.01)
*G06F 16/2455* (2019.01)

(58) Field of Classification Search
USPC .......................................... 707/613, 614, 638
See application file for complete search history.

(56) References Cited

U.S. PATENT DOCUMENTS

| | | | | |
|---|---|---|---|---|
| 2003/0204848 | A1* | 10/2003 | Cheng | H04N 5/782 725/58 |
| 2004/0197073 | A1* | 10/2004 | Oesterreicher | G06F 8/67 386/332 |
| 2005/0076020 | A1* | 4/2005 | Huntley | G06Q 20/123 |
| 2006/0036912 | A1* | 2/2006 | Abe | G06F 11/20 714/31 |
| 2006/0190500 | A1* | 8/2006 | Rao | G06F 16/273 |
| 2006/0190503 | A1* | 8/2006 | Naicken | G06F 17/30587 |
| 2007/0022135 | A1* | 1/2007 | Malik | G06F 17/30876 |
| 2007/0130223 | A1* | 6/2007 | Savilampi | G06F 16/27 |
| 2007/0244987 | A1* | 10/2007 | Pedersen | H04L 63/0272 709/217 |
| 2008/0319878 | A1* | 12/2008 | Glebe | G06Q 10/00 705/28 |
| 2009/0228530 | A1* | 9/2009 | Anglin | G06F 11/1451 |
| 2009/0271529 | A1* | 10/2009 | Kashiyama | G06F 16/2455 710/1 |
| 2009/0313311 | A1* | 12/2009 | Hoffmann | G06F 11/2094 |
| 2010/0138181 | A1* | 6/2010 | Nagoya | H04L 1/244 702/108 |
| 2010/0211682 | A1* | 8/2010 | Capomassi | G06F 16/2322 709/226 |
| 2011/0066593 | A1* | 3/2011 | Ahluwalia | G06F 17/30312 707/624 |
| 2011/0099550 | A1* | 4/2011 | Shafi | G06F 11/3058 718/102 |
| 2011/0179340 | A1* | 7/2011 | Poulain | H04H 20/67 714/799 |
| 2011/0264625 | A1* | 10/2011 | Samudrala | G06F 17/30557 707/624 |
| 2011/0282836 | A1* | 11/2011 | Erickson | G06F 16/27 707/622 |
| 2012/0072402 | A1* | 3/2012 | Fraboulet-Laudy | G06N 5/02 707/705 |
| 2012/0179841 | A1* | 7/2012 | Matesan | G06F 17/30174 709/248 |
| 2013/0097687 | A1* | 4/2013 | Storm | H04L 63/0807 726/9 |
| 2013/0156094 | A1* | 6/2013 | Syed | H04N 21/23424 375/240.02 |
| 2014/0114907 | A1* | 4/2014 | Kozina | G06F 17/30592 707/602 |
| 2014/0365551 | A1* | 12/2014 | Mutschler | H04L 67/12 709/201 |
| 2015/0379065 | A1* | 12/2015 | Yoshizawa | G06F 16/219 707/689 |

FOREIGN PATENT DOCUMENTS

| | | |
|---|---|---|
| JP | 2002-049747 | 2/2002 |
| JP | 2004-078550 | 3/2004 |
| JP | 2004-508617 | 3/2004 |
| JP | 2004-178472 | 6/2004 |
| JP | 2004-274141 | 9/2004 |
| JP | 2005-049102 | 2/2005 |
| JP | 2006-522416 | 9/2006 |
| JP | 2007-108910 | 4/2007 |
| JP | 2010-198307 | 9/2010 |

OTHER PUBLICATIONS

Esmaili et al., "Changing Flights in Mid-air: A model for Safely Modifying Continuous Queries", In Proc. Of SIGMOD'11, Jun. 2011.

* cited by examiner

Fig.5

| RESULTS DATA | PROCESS ID | VERSION NUMBER |

Fig.32

| TIME | 1 | 2 | 3 | 4 | 5 |
|---|---|---|---|---|---|
| INPUT | 1 | 2 | 3 | 4 | 5 |
| WINDOW DATA OF OLD PROCESS | [ ] ⇒ [1] | [1] ⇒ [1,2] | [1,2] ⇒ [2,3] | [2,3] ⇒ [3,4] | [3,4] ⇒ [4, 5] |
| RESULTS OF OLD PROCESS | | 3 | 5 | 7 | 9 |
| INSTRUCTION TO REWRITE | | | REWRITE TO NEW PROCESS | | |
| WINDOW DATA OF NEW PROCESS | | | [ ] ⇒ [3] | [3] ⇒ [3,4] | [3,4] ⇒ [3,4,5] |
| RESULTS OF NEW PROCESS | | | | | 12 |

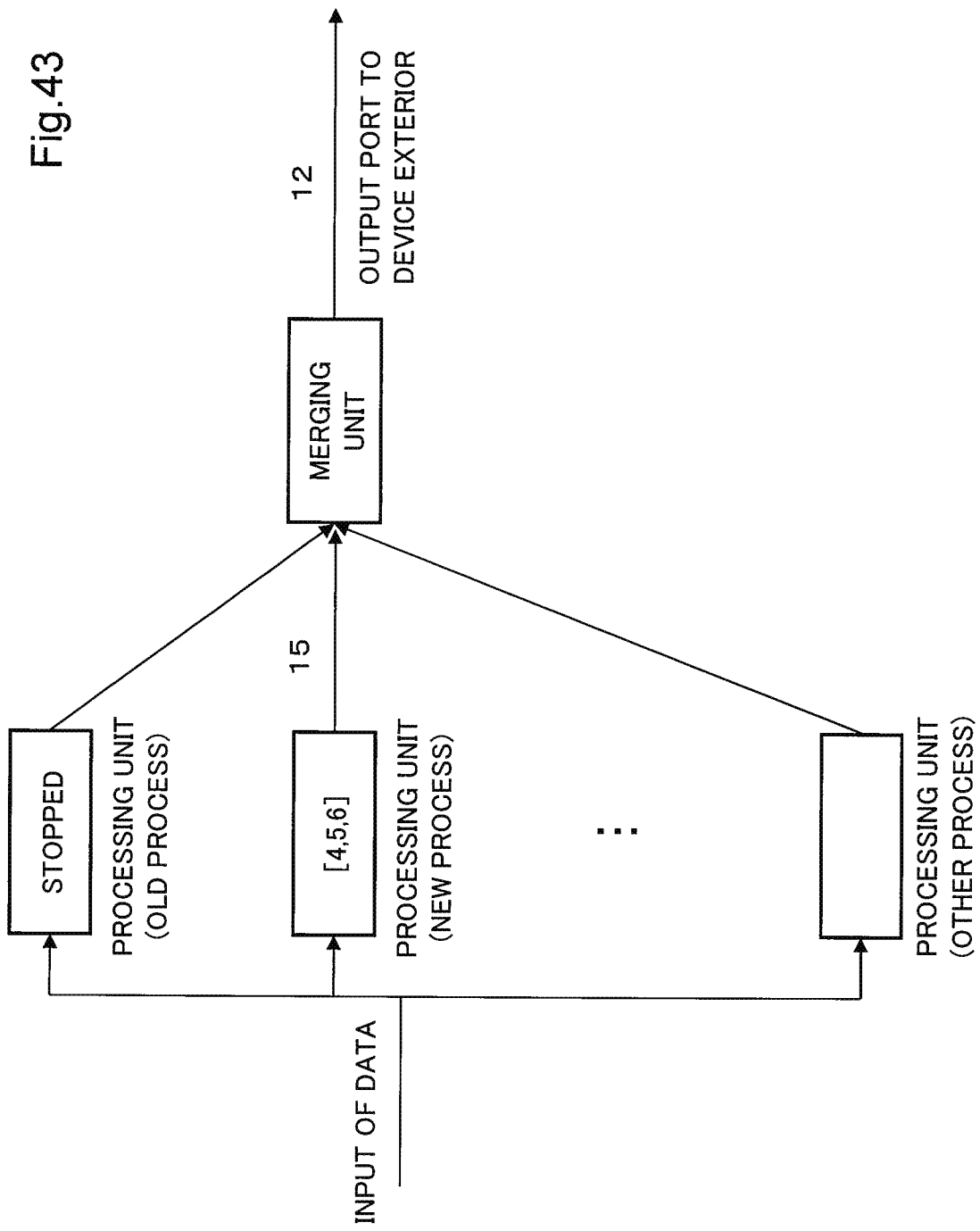

TIME SERIES DATA DEVICE, TIME SERIES DATA PROCESSING METHOD AND TIME SERIES DATA PROCESSING PROGRAM STORAGE MEDIUM

TECHNICAL FIELD

The present invention relates to a time series data processing device, a time series data processing method and a time series data processing program storage medium which process time series data. In particular, it relates to a time series data processing device, a time series data processing method and a time series data processing program storage medium in which contents of a process concerning the time series data change.

BACKGROUND ART

First, "data processing concerning the time series data" will be explained. In this description, "data processing concerning the time series data" means a process that is carried out for time series input data, that is, a series of data inputted one after another. Results data of the data processing concerning the time series data is also outputted one after another similarly. "To be inputted one after another" means that a plurality of data arrives at a processing device at different timing over a period of time respectively. As an example of the data processing concerning the time series data, such as a process that calculates a sum of two nearest values of the time series data can be mentioned. Hereinafter, the data processing concerning the time series data is simply called as "time series data processing".

In the following explanation, an array of data is represented as [1, 2, 3, 4], a set (collection of elements) of data is represented as {1, 2, 3, 4}, and a set of data is represented as <10 degrees, January 1> by distinguishing them with different kinds of parentheses. Also, individual values of data such as 1 and 2 are transcribed as "1" and "2" and are distinguished from codes that show components.

Also, a period of a clock used for operation of a time series data processing device is called "a cycle", and it is used as a unit of a period of time. "Start time of cycle" means the first point of time of the period of time and "end time of cycle" means the last point of time of the period of time. For example, in case a frequency of a clock is 1 GHz, concerning a certain reference time, the first cycle means a period of time between the reference time plus zero second and the reference time plus 1 nanosecond, and the N-th cycle means a period of time between the reference time plus (N−1) nanoseconds and the reference time plus N nanoseconds. Start time of the M-th cycle means the reference time plus (M−1) nanoseconds, and end time of the M-th cycle means the reference time plus M nanoseconds.

Here, input data is a set consisting of no smaller than one value. As an example, a set of temperature and date, a set of temperatures only and a set of brand name, stock price and time can be mentioned. For example, a set of temperature and date is represented as <10 degrees, January 1>. In case there is no concern that they are confused, input data and a value handled by a device are simply called "data".

Time series data processing is often carried out to a plurality of input data. Further, the time series data processing is often carried out to a window of time series data. "Window" is a set (collection of elements) of input data, and there are two kinds. One is, supposing that a predefined number is N (N is an integer of no smaller than 1), a set (collection of elements) of input data of nearest N pieces. The other is, supposing that a period of time at a certain predefined time is P and regarding one element of a set of input data as time, the set (collection of elements) of input data that fits into the period of time.

For example, it is supposed that input data is a set of temperature and date, and that time series data such as <10 degrees, January 1>, <11 degrees, January 2>, <10 degrees, January 3> and <10 degrees, January 4> are given. The window that fits into a period of time from January 4 to the last 3 days is {<11 degrees, January 2>, <10 degrees, January 3> and <10 degrees, January 4>}.

Also, a set (collection of elements), a subset (collection of elements) and an element of input data in a window are called "window data". In the time series data processing, this window data is often stored. In the following explanation, the window or the window data is represented as an array or a set (collection of elements).

It is supposed that time series data processing is executed using an IC (Integrated Circuit) chip that has in plural an area (hereinafter, referred to as "a partition") that can define contents of a process and specifically, an area in which circuit information and so on for configuring a circuit that executes the process can be written. As an example of such an IC chip, an FPGA (Field Programmable Gate Array) can be mentioned. Or, it is possible to execute the time series data processing by using, as an IC chip, a processor that reads a program from a memory and executes it. In this case, process content, that is, a program that designates a procedure of the process may be written in the memory.

In time series data processing, there exist needs that want to change the first user defined process (referred to as "an old process") to the second user defined process (referred to as "a new process"). That is, the first user defined process (referred to as "an old process") is executed in the first partition on the IC chip. And at the time the first user defined process is in execution, by writing circuit information that executes the second user defined process (referred to as "a new process") in the second partition, the new process is executed and the old process is stopped. There exist needs to want to change the old process to the new process in this way.

As an example, consider an application that makes values of temperature sensors positioned distributed in a wide area as input data, calculates an average over a certain period of time, and detects an emergency situation including a fire. When temperature change has become intense, in order to raise speed that follows the temperature change, there exist needs to reduce a length of the target period of time to calculate the average of the temperature.

Also, consider an application that calculates an index to decide timing to purchase or sell financial products such as a stock. Depending on a brand of financial products to be purchased or sold and a strategy to purchase or sell, there exists a plurality of indices that is necessary, and sets (collection of elements) of the indices that should be outputted are different. A certain device can calculate only a finite number of indices simultaneously. Depending on time, the brand to be purchased or sold and the strategy change. Therefore, there exist needs to want to change the indices to be calculated depending on the brand to be purchased or sold at that time and on the strategy.

An example of change of processes in the background art will be explained using FIG. 32. In this example, an old process that calculates a sum of nearest two values is changed to a new process that calculates a sum of nearest three values.

Also, it is supposed that data is inputted every 1 cycle, and explanation will be made by using time with 1 cycle as a unit.

At start time of the first cycle, time series data 1 is inputted and the old process stores the value as a window data.

At start time of the second cycle, time series data 2 is inputted and the old process stores the value as the window data. Also, since the old process obtained nearest two values, "3" is outputted as a results data.

At start time of the third cycle, an instruction to change is issued to the new process. Also, it is supposed that information to execute the new process is written in a device, and operation has started. For example, it is supposed that circuit information to execute the new process is written in a certain area of an FPGA. Here, it is supposed that the circuit information to execute the new process is written separately from the circuit information to execute the old process, and the old process and the new process operate in parallel for a while.

At start time of the third cycle, time series data "3" is inputted and the new process stores the value as the window data.

At start time of the fourth cycle, time series data "4" is inputted and the new process stores the value as the window data.

At start time of the fifth cycle, time series data "5" is inputted and the new process stores the value as the window data. Also, since the new process obtained nearest three values, "12" is outputted as the results data.

Here, the old process is stopped or deleted, and change of the processes is completed.

Here, at the time of change of the processes, (1) it is desired that, while both the results of the new process and the old process are not outputted to device exterior being mixed, both the processes are carried out. (2) Further, there exist needs that both the processes are carried out while, among the results of the old process before and after the process is changed, those that are still useful and available are outputted to device exterior.

As an example, consider the application mentioned above that calculates an average of the values of the temperature sensor over a certain period of time and detects an emergency situation including a fire. At this time, when temperature change has become intense, in order to raise speed that follows the temperature change, it is desirable to change a width of the period of time to calculate the average of the temperature. Also, in order that the results of the old process and the new process are not confused, it is also necessary to change the processes so that both of the results may not be outputted to device exterior being mixed. Further, since also the result of the old process is still useful and available, it is desirable to receive the result of the old process from as many devices as possible until the result of the new process is outputted to device exterior. Needs as described above exist.

As another example, consider the application that carries out orders to purchase or sell financial products. Since it is desired to change a brand to be purchased or sold, it is necessary to change the process of instruction to purchase or sell. The brand before change is called "an old brand", and the brand after change is called "a new brand". Also, when instructions related to the new and the old brand are mixed before and after the processes are changed, there is a concern that purchasing or selling may be mistaken. Therefore, it is necessary that the processes are changed while the results of both the new and the old process may not be outputted to device exterior being mixed. Also, since instructions to purchase or sell may be carried out to the old brand until the last timing, it is desirable to receive the result of the old process from as many devices as possible until the result of the new process is outputted to device exterior. Needs as described above exists.

Further, in this application, there exist needs, in the course to change the processes, to stop the old process after a safe state is reached. For example, there is a case that, when an order to sell is issued, the instruction of the old process is made to be issued until an order to purchase is issued, and after that, only the instruction of the new process will be issued. That is, there exist needs that: (1) since a sequence of results that is outputted from the old process that is not in a state that can be stopped is useful and available, it is outputted to device exterior, and (2) after that, a sequence of results that is outputted from the old process that becomes to a state that can be stopped is replaced by a sequence of results outputted from the new process and is outputted to device exterior.

Technologies related to the processes as above are described in PTL 1-4 and NPL 1.

A system using a re-configurable device is disclosed in PTL 1.

A time series data compression device that carries out two kinds of processes is disclosed in PTL 2.

In PTL 3 and 4, a processing device that handles information to which a version number (an update version number) is appended is disclosed.

In NPL 1, a time series data processing device in which two kinds of processes, that is, an old process and a new process, is disclosed. In NPL 1, although implementation by software is assumed, for convenience sake, implementation by hardware is assumed and its block diagram is shown in FIG. 33.

The technology of NPL 1 is equipped with a processing unit 501 that carries out a user defined process corresponding to an old process and a user defined process corresponding to a new process; and a merging unit 511 that connects a result of the processing unit to an output port to the outside.

The technology of NPL 1 operates, roughly divided, in two kinds of methods. The operation by the first method is explained using FIG. 34 to FIG. 38.

In this example, the old process that calculates a sum of nearest two values is changed to the new process that calculates a sum of nearest three values. It is supposed that both the new and the old process generate the results in the same cycle as data is inputted. Also, it is supposed that the results of the processes reach the merging unit 511 from the processing unit 501 in 1 cycle. Also, it is supposed that the results of the processes reach device exterior from the merging unit 511 in 1 cycle. Also, it is supposed that the data is inputted every 1 cycle, and explanation will be made by using time with 1 cycle as a unit.

It is supposed that time series data "1" is inputted at start time of the first cycle and time series data "2" is inputted at start time of the second cycle. Since the old process obtained [1, 2] that are nearest two values, the processing unit 501 calculates and outputs the result "3". At end time of the second cycle, each unit will be in the state as in FIG. 34.

It is supposed that time series data 3 is inputted to the new and the old process at start time of the third cycle. The old process outputs the result "5". At the same time, it is supposed that the contents of the new process is defined and starts execution. Definition of the contents of the new process is, in case the device that realizes the process is an FPGA, carried out, for example, by a partial reconfiguration function. The new process stores the time series data "3". The result of the old process "3" is outputted to device exterior. At end time of the third cycle, each unit will be in the state as in FIG. 35.

It is supposed that time series data "4" is inputted to the new and the old process at start time of the fourth cycle. The old process outputs the result "7". The new process stores the time series data "4". The result of the old process "5" is outputted to device exterior. At end time of the fourth cycle, each unit will be in the state as in FIG. 36.

It is supposed that time series data "5" is inputted to the new and the old process at start time of the fifth cycle. The old process outputs the result "9". Since the new process obtained [3, 4, 5] that are nearest three values, the result "12" that is a sum of the three values is outputted. The result of the old process "7" is outputted to device exterior. At end time of the fifth cycle, each unit will be in the state as in FIG. 37.

It is supposed that time series data "6" is inputted to the new and the old process at start time of the sixth cycle. The old process outputs the result "11". The new process outputs the result "15". The result of the old process "9" and the result of the new process "12" are outputted to device exterior. At end time of the sixth cycle, each unit will be in the state as in FIG. 38. Thus, according to the first method of NPL 1, the results of both the new and the old process are outputted to device exterior being mixed.

Next, the operation by the second method of NPL 1 will be explained using FIG. 39 to FIG. 43.

Also, the old process that calculates a sum of nearest two values is changed to the new process that obtains a sum of nearest three values here. It is supposed that both the new and the old process output results in the same cycle as data is inputted. Also, it is supposed that the results of the processes reach the merging unit from the processing unit in 1 cycle. Also, it is supposed that the result of the process reaches device exterior from the merging unit in 1 cycle. Also, it is supposed that the data is inputted every 1 cycle, and explanation will be made by using time with 1 cycle as a unit.

It is supposed that time series data "1" is inputted at stat time of the first cycle. It is supposed that time series data "2" is inputted at start time of the second cycle. Since the old process obtained [1, 2] that are nearest two values, the processing unit 501 calculates and outputs the result "3". At end time of the second cycle, each unit will be in the state as in FIG. 39.

It is supposed that time series data "3" is inputted to the new and the old process at start time of the third cycle. At the same time, it is supposed that information to execute the new process is written and execution is started. According to the second method, the old process is stopped at this timing. The new process stores the time series data "3". At end time of the third cycle, each unit will be in the state as in FIG. 40.

It is supposed that time series data "4" is inputted to the new and the old process at start time of the fourth cycle. The new process stores the time series data "4". At end time of the fourth cycle, each unit will be in the state as in FIG. 41. Thus, according to the second method, the result is not outputted to device exterior at this timing. In contrast, according to the first method, as shown in FIG. 36, the result is outputted.

It is supposed that time series data "5" is inputted to the new and the old process at start time of the fifth cycle. Since the new process obtained [3, 4, 5] that are nearest three values, the result "12" is outputted. At end time of the fifth cycle, each unit will be in the state as in FIG. 42. Thus, according to the second method, the result is not outputted to device exterior at this timing either. In contrast, according to the first method, as shown in FIG. 37, the result is outputted.

It is supposed that time series data "6" is inputted to the new and the old process at start time of the sixth cycle. The new process outputs the result "15". At end time of the sixth cycle, each unit will be in the state as in FIG. 43.

As mentioned above, according to the second method of NPL 1, the results of both the new and the old process are not outputted to device exterior being mixed.

CITATION LIST

Patent Literature

[PTL 1] Japanese Unexamined Patent Application Publication (Translation of PCT Application) No. 2004-508617 (pages 6, 15, FIGS. 1, 2)
[PTL 2] Japanese Unexamined Patent Application Publication No. 2002-049747 (page 4, FIG. 1)
[PTL 3] Japanese Unexamined Patent Application Publication No. 2001-075908 (page 4)
[PTL 4] Japanese Unexamined Patent Application Publication No. 2005-049102 (page 6, FIG. 3)

Non Patent Literature

[NPL 1] Kyumars Sheykh Esmail et al., Changing Flights in Mid-air: A model for Safely Modifying Continuous Queries, In Proc. of SIGMOD'11, June 2011

SUMMARY OF INVENTION

Technical Problem

A system using a re-configurable device is disclosed in PTL 1. However, in PLT 1, problems that occur when a configuration file of a device (circuit information for configuring a predetermined circuit) is rewritten are not referred to. Accordingly, such problems cannot be solved.

A time series data compression device that carries out two kinds of processes is disclosed in PTL 2. However, according to the device of PTL 2, one of the two kinds of processes is applied on the basis of a result of predetermined determination concerning a result of a pre-process. And distinction is not made as for either process was applied to the final result of the process. Accordingly, the respective results by the two kinds of processes cannot be discriminated.

In PTL 3 and 4, a processing device that handles information to which a version number (an update version number) is appended is disclosed. However, in both of the technology in PTL 3 and the technology in PTL 4, the version number is used to determine whether information to which it is appended is old or new and to perform update to the new information. Accordingly, since the information of which the version number is older is discarded, even if the information is useful, it cannot be utilized.

When the technology of PTL 2 and that of PTL 3 or PTL 4 are combined, it becomes possible to carry out two kinds of processes, that is, a new process and an old process, to time series data, and to discriminate either process was applied to the result data. However, the discrimination is one to discriminate the processes between old and new, and the results data by the old process cannot be utilized.

According to the first method of NPL 1, as shown in FIG. 38, the results of both the new and the old process are outputted to device exterior being mixed. The result data that was outputted being mixed cannot be identified whether it is one by the new process or one by the old process. Therefore, there is a problem that the results data by the old process before and after the process is changed cannot be used.

According to the second method of NPL 1, the results of both the new and the old process are not outputted to device exterior being mixed. Therefore, it is possible to use the results data.

However, even when there is a useful and available result in the results data by the old process, it is not outputted to device exterior. That is, since the old process is stopped even though it can operate, the data obtained by the old process cannot be outputted to the outside. For example, in the example mentioned above, even though the sum of [2, 3] and the sum of [3, 4] are available, they are not outputted.

Further, even if the old process continues to be operated, since the results of the new process and the results of the old process are mixed in the merging unit, it is not possible to output the results of the old process until designated timing. In the example mentioned above, the sum of [2, 3] and the sum of [3, 4] cannot be outputted without being mixed with the results of the new process.

Thus, in the second method of NPL 1, there is a problem from the point of view of effective use of the processing device, such as to make the old process execute to the utmost and to use the process results to the maximum.

To summarize the explanation mentioned above, according to the technology of NPL 1, the results data of the process is outputted being mixed without distinguishing whether it is one by the new process or one by the old process. Therefore, according to the technology of NPL 1, when the process is changed to the old process from the new process during execution, there is a problem that the results of both the new and the old process are outputted to device exterior being mixed.

Or, according to the technology of NPL 1, when the new process is started, the old process is stopped. Therefore, the second problem is, there is the problem that a useful and available result of the old process is not outputted to device exterior.

Object of Invention

The present invention is proposed in view of such circumstances, and is meant to provide a time series data device, a time series data method and a time series data processing program storage medium by which, in a process of time series data and when the process is changed from a first process to a second process, both results of the new and the old process are not outputted to the outside being mixed and the results of the old process before and after the process is changed can be outputted to the outside.

Solution to Problem

A time series data processing device of the present invention is characterized by being equipped with: a first processing unit that executes a first process and outputs first results data; a second processing unit that executes a second process and outputs second results data; a control unit that, when an instruction to change a process is received from outside, determines whether the first process can be stopped, generates a first results data set by appending first identification information corresponding to contents of the first process to the first results data, and generates a second results data set by appending second identification information corresponding to contents of the second process to the second results data; a selection unit that, when the first results data set and the second results data set have arrived simultaneously, selects either of the first results data set or the second results data set as a third results data set on the basis of a first comparison result of the first identification information and the second identification information; and a synchronization unit that, on the basis of a second comparison result of third identification information included in the third results data and prerecorded fourth identification information, outputs or discards third results data included in the third results data set.

A time series data processing method of the present invention is characterized by: executing a first process and outputting first results data; executing a second process and outputting second results data; when an instruction to change a process is received from outside, determining whether the first process can be stopped, generating a first results data set by appending first identification information corresponding to contents of the first process to the first results data, and generating a second results data set by appending second identification information corresponding to contents of the second process to the second results data; selecting, when the first results data set and the second results data set have arrived simultaneously, either of the first results data set or the second results data set as a third results data set on the basis of a first comparison result of the first identification information and the second identification information; and outputting or discarding, on the basis of a second comparison result of third identification information included in the third results data and prerecorded fourth identification information, third results data included in the third results data set.

A time series data processing program storage medium of the present invention stores a program that makes a computer equipped in a time series data processing device equipped with: a first processing unit that executes a first process and outputs first results data and a second processing unit that executes a second process and outputs second results data function as: a control means that, when an instruction to change a process is received from outside, determines whether the first process can be stopped, generates a first results data set by appending first identification information corresponding to contents of the first process to the first results data, and generates a second results data set by appending second identification information corresponding to contents of the second process to the second results data; a selection means that, when the first results data set and the second results data set have arrived simultaneously, selects either of the first results data set or the second results data set as a third results data set on the basis of a first comparison result of the first identification information and the second identification information; and a synchronization means that, on the basis of a second comparison result of third identification information included in the third results data and prerecorded fourth identification information, outputs or discards third results data included in the third results data set.

Advantageous Effects of Invention

According to the present invention, in the process of time series data, even when the process to be executed is changed from the first process to the second process, both the results of the first and the second are not outputted to device exterior being mixed. Further, the results of the old process before and after the process is changed can be outputted to the outside.

BRIEF DESCRIPTION OF DRAWINGS

FIG. 5 A figure showing an example of data structure of a results data set.

FIG. 32 A time transition diagram of states of an old process and a new process in an example of operation of the background art.

FIG. 43 A figure showing a state of output data of each unit at end time of the sixth cycle by the second method of the time series data processing device of NPL 1.

DESCRIPTION OF EMBODIMENTS

The First Exemplary Embodiment

Next, exemplary embodiments of the present invention will be explained in detail with reference to drawings.

In a time series data processing device that carries out a process to time series data, a user defined process is executed in a plurality of areas on an IC chip, and during execution, is changed to a process that performs different operation in an arbitrary area. As described above, the process before change is called "the first user defined process", and the process after change is called "the second user defined process". Or, there is a case when the process before change is called "the old process", and the process after change is called "the new process".

In the IC chip, by changing the processes in a form to write circuit information to execute the new process while the old process is being operated, to start operation of the new process, and after that, to stop the old process and to delete circuit information to execute the old process, change of the processes is realized while reducing a period of time during which the results are not outputted. Further, the change of the processes mentioned above may also be realized using an IC chip that has in plural an area (referred to as "a partition") in which circuit information to execute the time series data processing can be written. As an example of such an IC chip, an FPGA can be mentioned.

Figure 1:
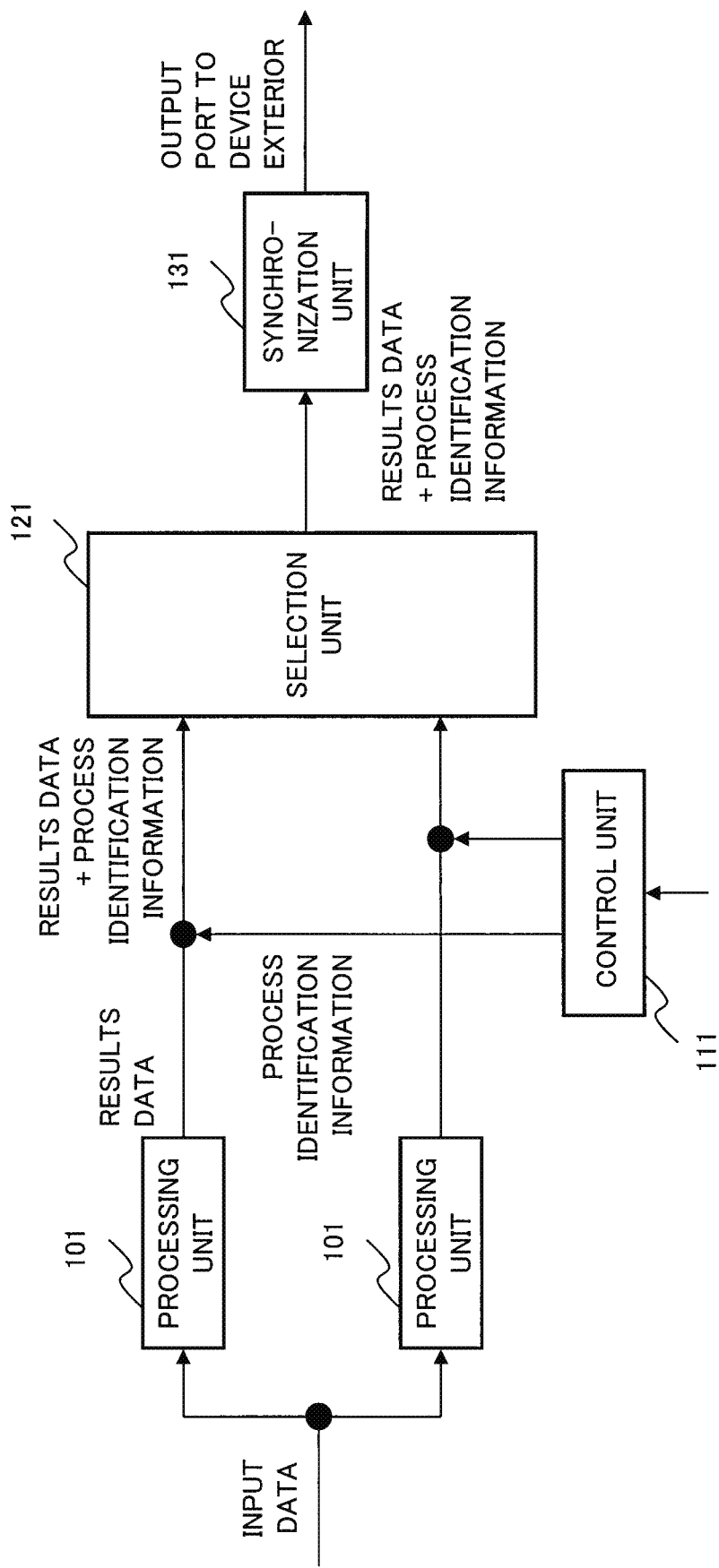
FIG. 1 A block diagram showing a structure of a time series data processing device of an exemplary embodiment of the present invention.

FIG. 1 is a block diagram showing a structure of a time series data processing device 100 according to an exemplary embodiment of the present invention.

The time series data processing device 100 is equipped with a processing unit 101, a control unit 111, a selection unit 121 and a synchronization unit 131.

The processing unit 101 executes the old process and outputs the results data. Or, the processing unit 101 executes the new process that is replaced during execution of the old process, and outputs the results data. Whether the process that the processing unit 101 executes is the old process or the new process is decided depending on presence or absence of change of the processes that the processing unit 101 executes. Functions and internal structure of a plurality of the processing unit 101 may be all the same or different in part or entirely.

The control unit 111 sets "identification information" corresponding to the contents of the process which each processing unit 101 carried out. By a difference of the identification information, differences in the processes that the processing unit 101 carried out can be identified. The identification information is, for example, "a process ID" that identifies basic contents of the process and "a version number" that identifies update history among the processes with the same ID. In the following explanation, an example that uses the process ID and the version number as the identification information will be shown. However, there are no essential differences between the process ID and the version number, and other information can be used as far as it is "the identification information" that can identify that the contents of the process have changed.

And at the timing when the processing unit 101 outputs the results data, the control unit 111 appends the process ID and the version number to the results data and outputs it to the selection unit 121.

The selection unit 121 receives a set of the results data, the process ID and the version number from a plurality of the processing units 101 and the control unit 111. When a plurality of sets has arrived simultaneously, among the ones with the same process ID, the results data to which an older version number is appended is discarded, and the other results data is outputted to the synchronization unit 131. Further, as mentioned above, since the selection unit 121 compares version information included as the identification information and selects the results data outputted, in this exemplary embodiment, the selection unit is described as "a version comparison unit" hereinafter.

In the synchronization unit 131, the version number is registered for each process ID in advance. The synchronization unit 131 receives the set of the results data, the process ID and the version number from the version comparison unit 121. And the results data to which the version number older than the version number registered in the synchronization unit 131 for each process ID is appended is discarded, and the other results data is outputted to the outside. Further, the process ID and the version number that are appended to the results data outputted may also be outputted to the outside. And when the results data is outputted, the synchronization unit 131 updates the old version number recorded in the synchronization unit 131 to the version number that was appended to the results data outputted.

Figure 5:
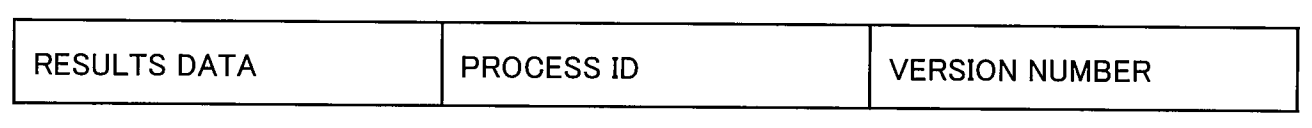

The control unit 111 outputs the process ID and the version number concurrently with the output of the results data of the processing unit 101. As a result, input information to the version comparison unit 121 is a set of the results data that the processing unit 101 outputted and the process ID and the version number that the control unit appended. Information inputted from the version comparison unit 121 to the synchronization unit 131 is also the set of the results data that the processing unit 101 outputted and the process ID and the version number that the control unit appended. The set of the information mentioned above may, for example, take a structure as shown in FIG. 5. Hereinafter, when the set of information that consists of the results data, the process ID and the version number mentioned above is handled as an integrated one, it is called "a results data set".

Figure 2:
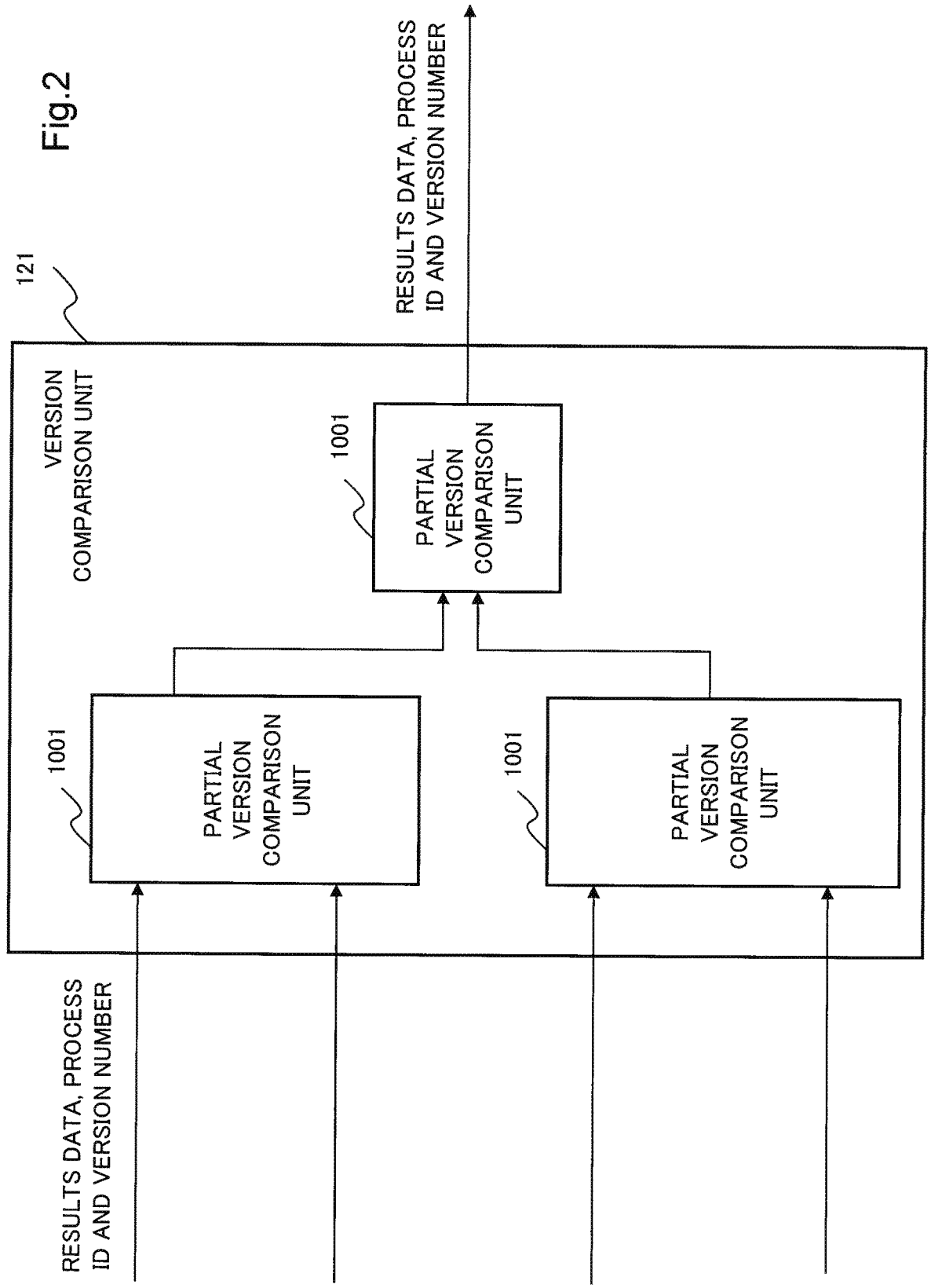
FIG. 2 A block diagram showing a first example of implementation of a version comparison unit 121.

FIG. 2 is a block diagram showing a first example of implementation of the version comparison unit 121. The version comparison unit 121 of FIG. 2 corresponds to a time series data processing unit equipped with the four processing units 101 and receives four sets of the results data set. The version comparison unit 121 is equipped with three partial version comparison units 1001. Each of the three partial version comparison units 1001, when two sets of the results data set have arrived simultaneously, among the ones with the same process ID, discards the results data set to which an older version number is appended, and outputs the other results data set to an output port.

Figure 3:
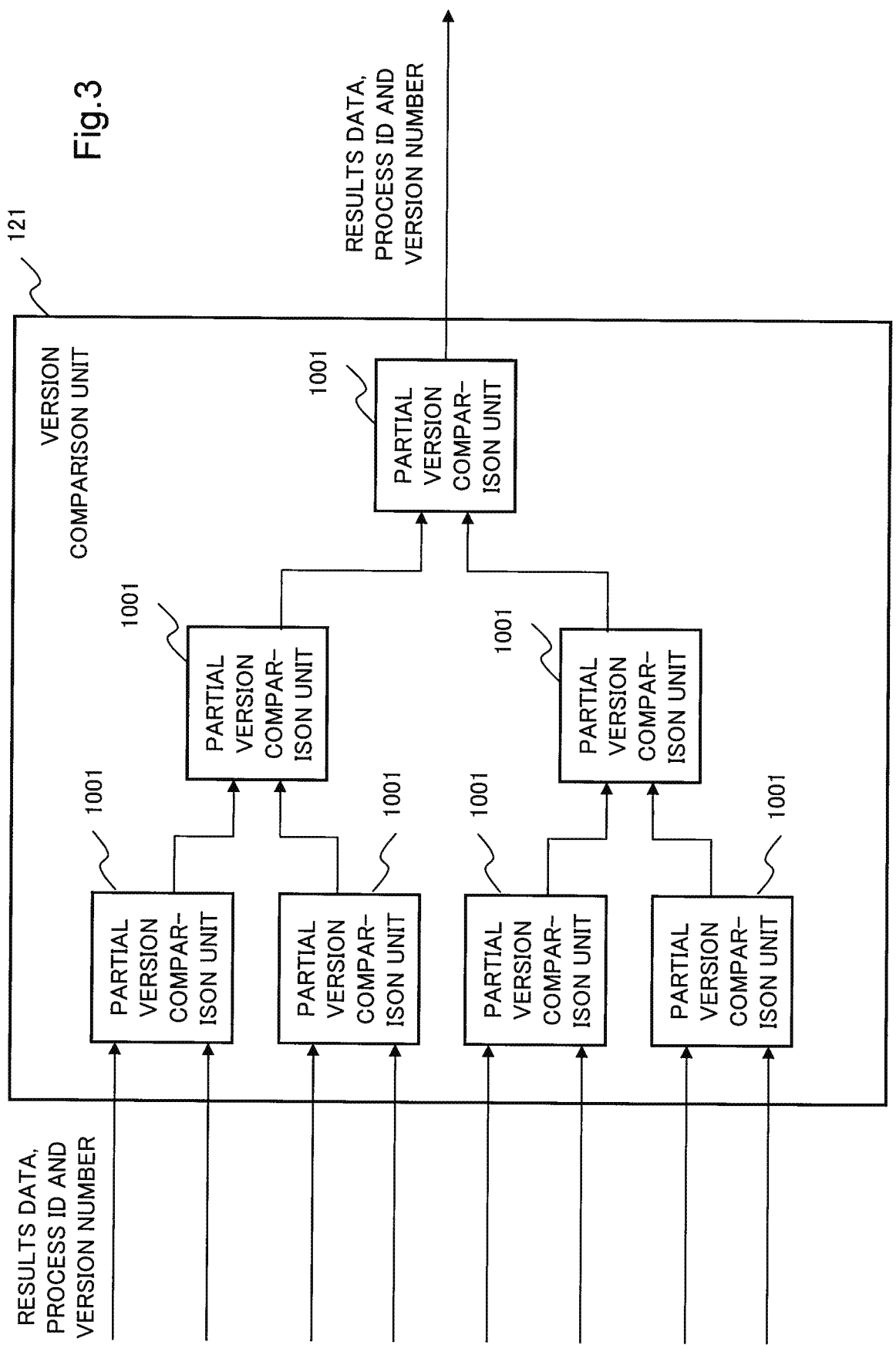
FIG. 3 A block diagram showing a second example of implementation of the version comparison unit 121.

FIG. 3 is a block diagram showing a second example of implementation of the version comparison unit 121. The version comparison unit 121 of FIG. 3 corresponds to a time series data processing unit equipped with eight processing units 101 and receives eight sets of the results data set. The version comparison unit 121 is equipped with the seven partial version comparison units 1001. By installing the partial version comparison units like FIGS. 2 and 3, the version comparison unit 121 having an arbitrary number of inputs can be structured.

Figure 4:
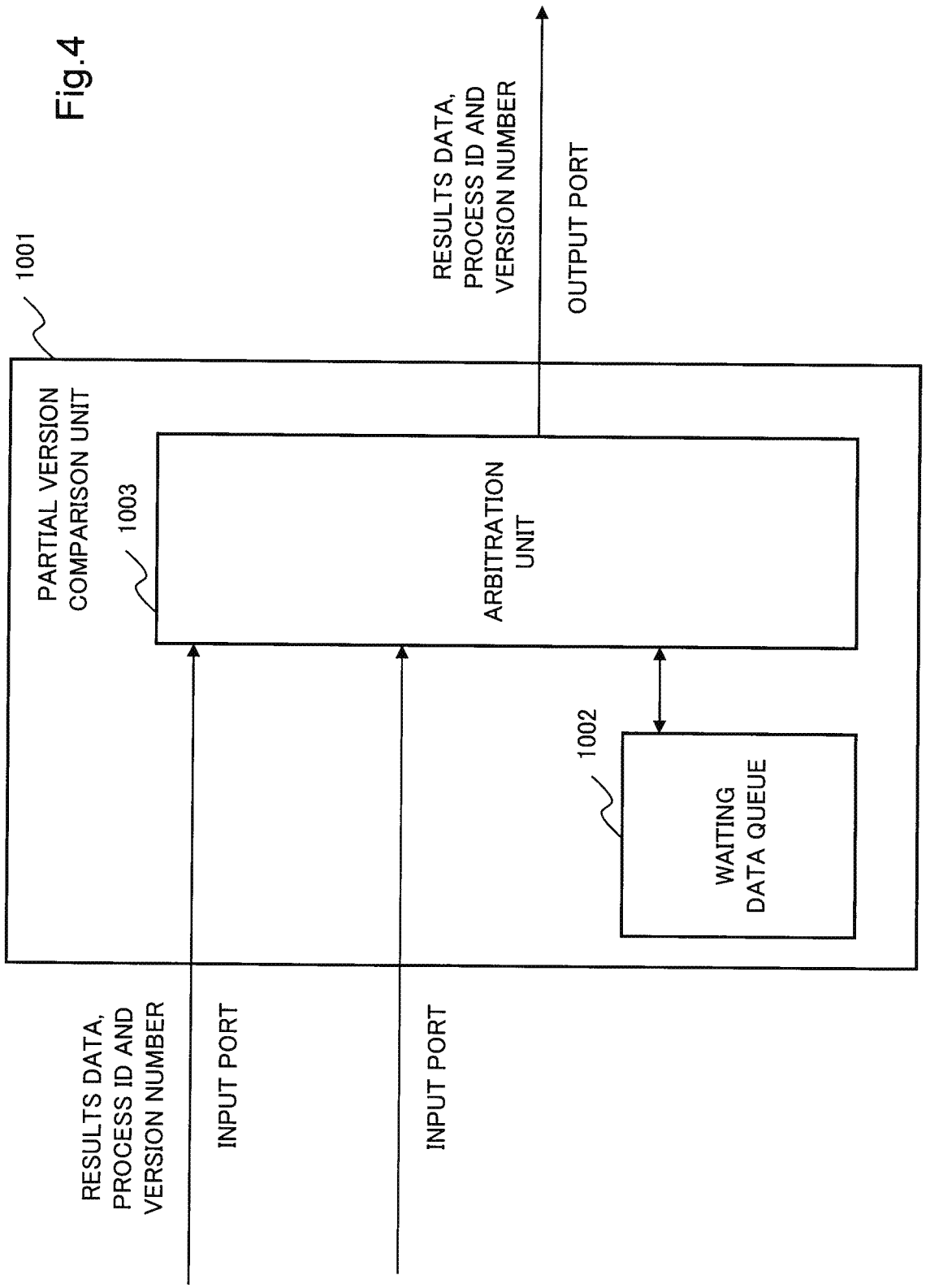
FIG. 4 A block diagram showing an example of implementation of a partial version comparison unit 1001.

FIG. 4 is a block diagram showing an example of implementation of the partial version comparison unit 1001. The partial version comparison unit 1001 may be implemented by a structure having an input port, an output port, a waiting data queue 1002 and an arbitration unit 1003. The partial version comparison unit 1001 carries out arbitration of allocation of the output port about the results data sets received from the two input ports and the waiting data queue 1002 using the arbitration unit 1003. The results data set to which the output port is allocated is outputted to the output port. The results data set to which the output port is not allocated is discarded or inserted in the waiting data queue 1002. The data inserted in the waiting data queue 1002 will be the input to the partial version comparison unit 1001 again in the following cycle.

Explanation of operation afterwards will be carried out only for a case when the version comparison unit 121 is structured from one partial version comparison unit 1001. The operation of the version comparison unit 121 explained can also be applied easily to the version comparison unit 121 equipped with no smaller than two partial version comparison units 1001.

Figure 7:
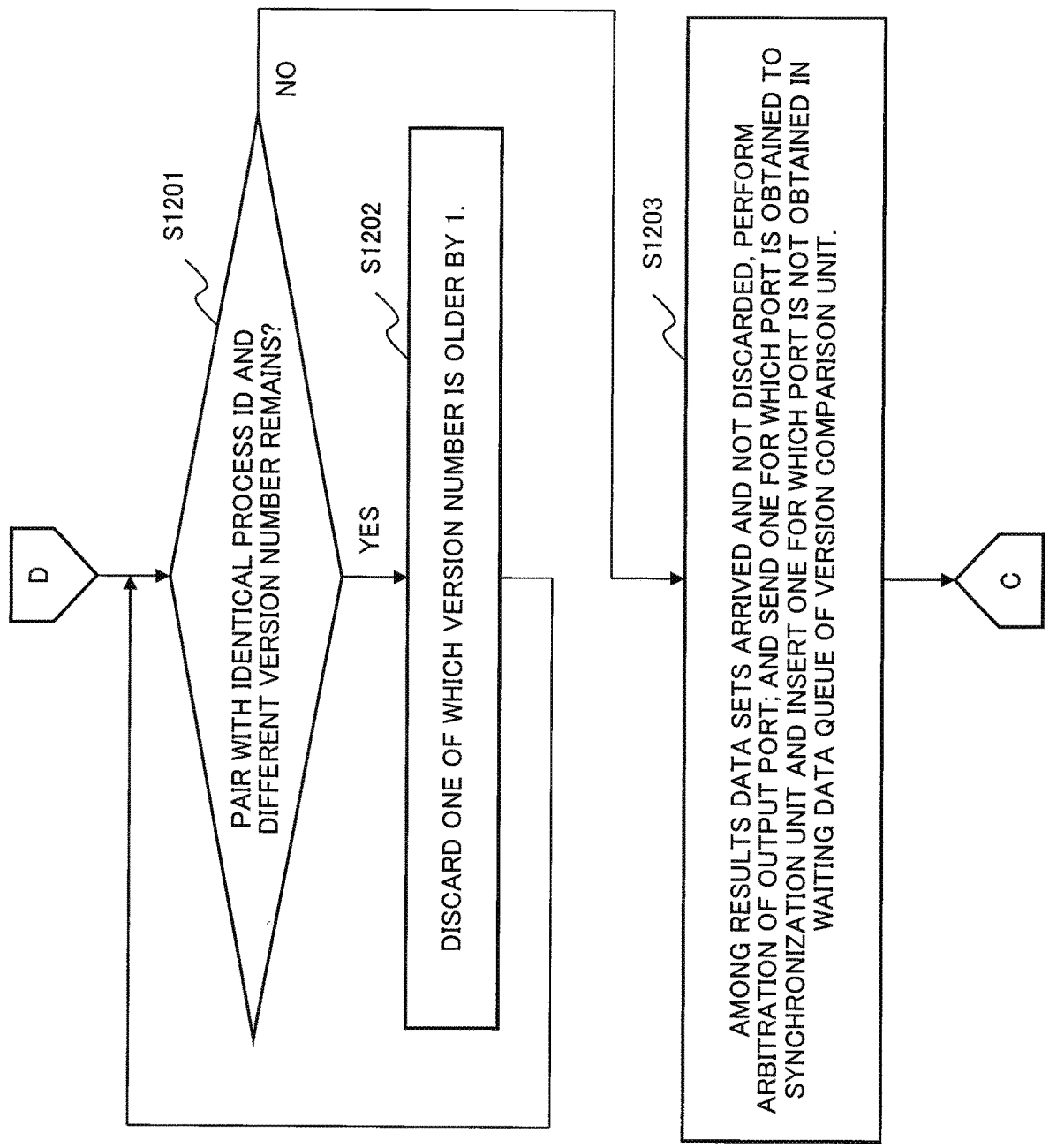
FIG. 7 A flow chart showing a process example in a time series data processing device of an exemplary embodiment of the present invention.
Figure 8:
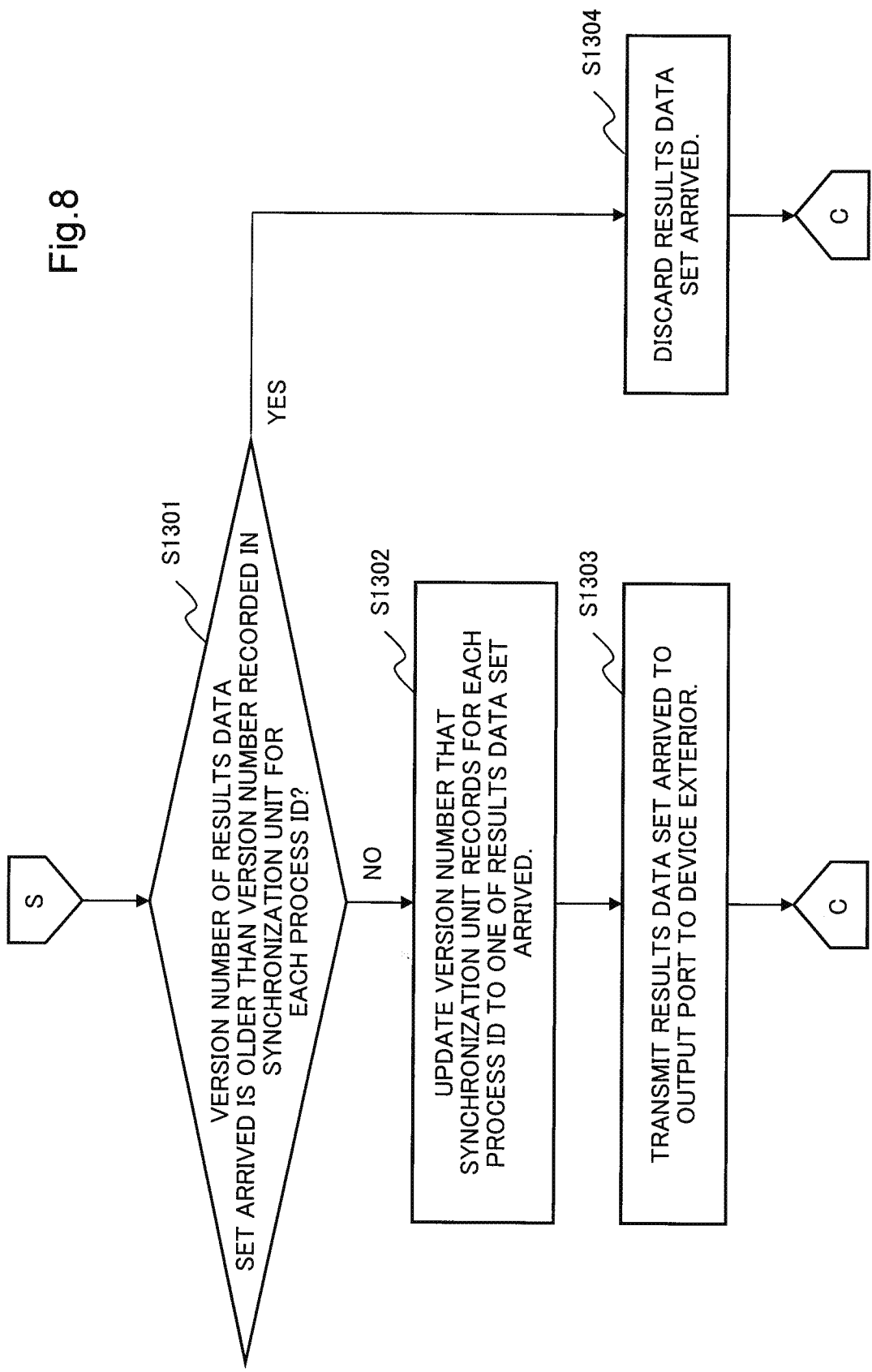
FIG. 8 A flow chart showing a process example in a time series data processing device of an exemplary embodiment of the present invention.

Next, operation of the time series data processing device 100 according to this exemplary embodiment will be explained with reference to FIG. 6, FIG. 7 and FIG. 8.

First, several technical terms will be defined. A period of time after a new input arrives and until the next input arrives is called "1 input period of time". A period of a clock that defines a unit time necessary for the time series data processing device to complete predetermined operation is called "1 cycle".

As described above, areas of circuit in which the processes can be executed are set in plural and separately on an IC chip, and they are called "the partitions". By setting information called structure data or configuration data to the partitions, circuits that execute the user defined processes can be created.

Also, "to order" and "to instruct" mean that a certain part (referred to as "an order source part") operates a signal of wiring connected to a different part (referred to as "an order destination part") or writes a value in a storage device which exists in the order destination part. "To register", "to set" and "to record" mean that a certain part of a registration source writes a value in a storage device that exists in a different part of a registration destination. "To send information", "to send data" and "to output results" mean that a certain part of a device that is a sending source operates a signal of wiring that is connected to a different part of the device which is a sending destination, or writes a value in a storage device that exists in a part of the sending destination.

The version number may be expressed by an integer. Or, a residue system of M may be used. Also, "a version number newer by "1"" means, in case an integer is used for the version number, for a certain integer N that is the old version number, a value of (N+1). Or, "a version number newer by "1"" means, in case the residue system of M is used for the version number, for a residue of N divided by M that is the old version number, a residue of (N+1) divided by M. "A version number older by "1"" means, in case an integer is used for the version number, for a certain inter N that is the new version number, a value of (N−1). Or, "a version number older by "1"" means, in case the residue system of M is used for the version number, for a residue of N divided by M that is the new version number, a residue of (N−1) divided by M. For example, using the residue system of 3, a value newer than "0" by "1" may be expressed as "1", a value newer than "1" by "1" as "2", a value newer than "2" by "1" as "0", a value older than "2" by "1" as "1" a value older than "1" by "1" as "0", and a value older than "0" by "1" as "2".

The process ID is used, in such a case as change from the first old process to the first new process and change from the second old process to the second new process are progressing simultaneously, in order to distinguish pairs of the old process and the new process.

By the way, in this exemplary embodiment, the results data that is outputted from the time series data processing device 100 is changed from the one by the old process to the one by the new process. This change is permitted by an instruction to change the process (hereinafter, referred to as "an instruction to change process") concerning the time series data processing device 100 by a host computer and so on which is not illustrated. In the following explanation, it is supposed that the time series data processing device 100 has already received the instruction to change process.

Figure 6:
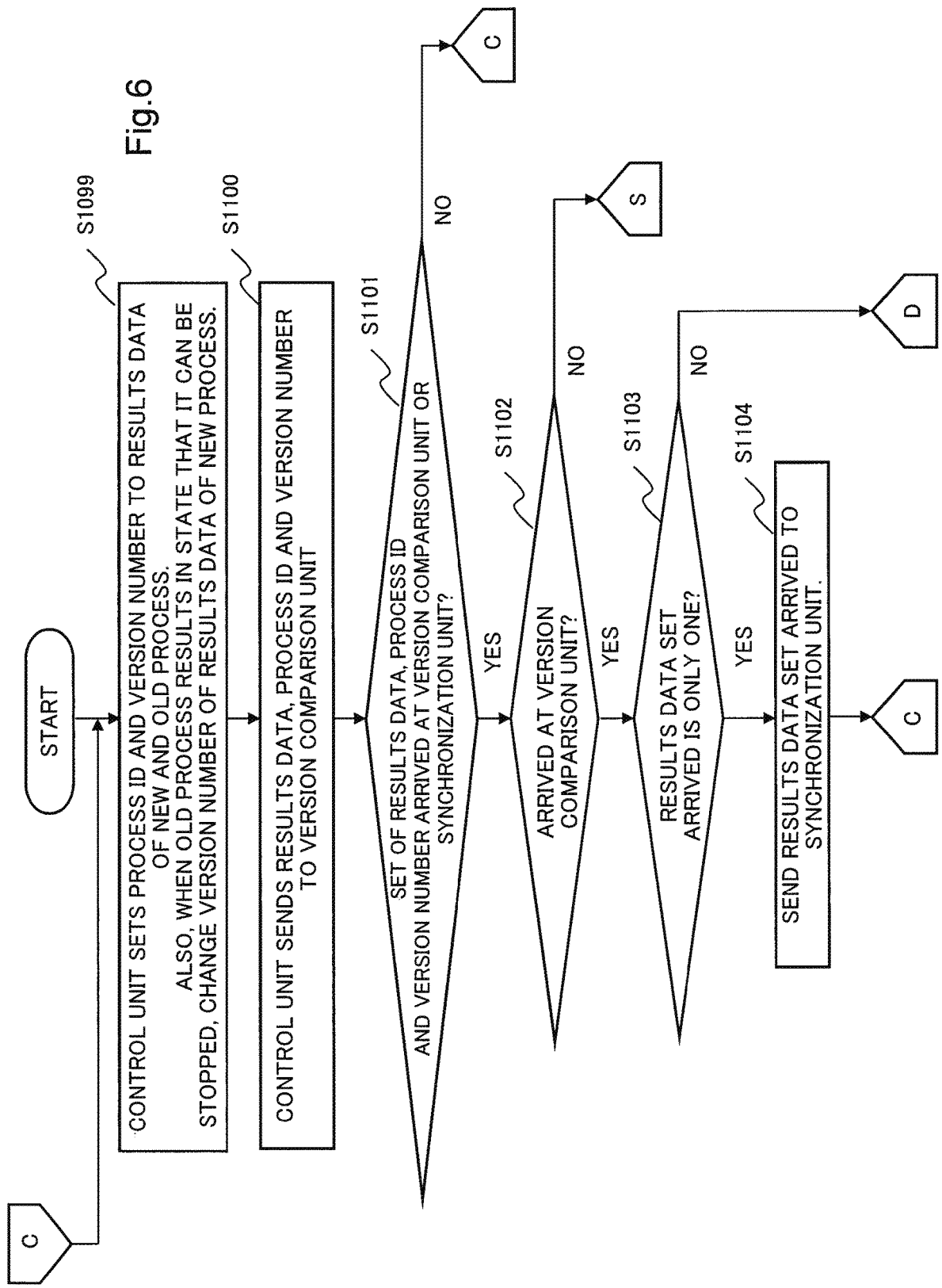
FIG. 6 A flow chart showing a process example in a time series data processing device of an exemplary embodiment of the present invention.

In a flow chart of FIG. 6, first, the control unit 111 sets the process ID and the version number corresponding to the results data of the new and the old process. At that time, in case the old process resulted in a state that can be stopped, the version number of the new process is changed (Step S1099). The control unit 111 determines whether the old process resulted in the state that can be stopped.

Here, "the state that the old process can be stopped" means a state in which operation of the processing unit 101 that executes the old process can be stopped and output of the results data can be stopped. In the state that the old process can be stopped, the results data that is outputted from the time series data processing device 100 can be changed from the results data by the old process to the results data by the new process.

That is, the results data that is outputted from the time series data processing device 100 is not changed immediately to the results data by the new process when the instruction to change process is received. After the time series data processing device 100 receives the instruction to change process and further, after the old process resulted in the state that ii can be stopped, the results data that is outputted from the time series data processing device 100 is changed to the results data by the new process.

For example, depending on a process status of the processing unit 101 that executes the old process such as the old process is in progress or depending on an output status of the processing unit 101 such as a series of data by the old process is being outputted, the old process will not become the state that it can be stopped. In this case, from the time series data processing device 100, output of the results data of the old process continues.

A main constituent that instructs setting of the version number or gives a value may also be the host computer that is not illustrated. Or, the main constituent may also be the control unit. The version number is set at the timing before the contents of the new process is defined or when the results data that the old process outputs needs not be outputted to device exterior any more, that is, the old process becomes the state that it can be stopped. In case the old process is not in the state that it can be stopped, the same value as the process ID of the results data of the old process may be set to the process ID of the results data of the new process, and the value older than the version number of the results data of the old process by 1 may be set to the version number of the results data of the new process. For example, the process ID of the results data of the old process may be set to "0", and the version number to "1" and the process ID of the results data of the new process may be set to "0" and the version number to "0".

Just after the old process becomes the state that it can be stopped, the same value as the old process ID may be set to the new process ID, and the version number of the new process may be set to the value newer than the version number of the old process by "1". That is, the new process and the old process to which the same ID is set may be identified by the version number. For example, the old process ID may be set to 0 and the version number to "1" and the new process ID may be set to "0" and the version number to "2". Or, by using the residue system of 3 as the version number, the old process ID may be set to 100 and the version number to "2" and the new process ID may be set to 100 and the version number to "0".

Or, it may be supposed that the old process is always in the state that it can be stopped. In this case, the same value as the old process ID may be set to the new process ID, and the version number of the new process may be set to the value newer than the version number of the old process by "1". In this case, after the time that output of the results data by the new process from the processing unit 101 is started and the results data reached the output port to device exterior, only the results data of the new process is outputted to the outside of the time series data processing device. Until then, the results data of the old process is outputted to device exterior to the maximum.

Next, the control unit 111 sends the results data set to the version comparison unit 121 (Step S1100). Here, the process ID and the version number set in Step S1099 are used.

The version comparison unit 121 examines whether the results data set has arrived at the input port or the waiting data queue. The synchronization unit 131 also examines whether the results data set has arrived (Step S1101). When the results data set has arrived (Step S1101: Yes), step proceeds to Step S1102. When the results data set has not arrived (Step S1101: No), step returns to Step S1099.

"The waiting data queue" is a queue to which the results data set is inserted, that was not discarded by the version comparison unit 121 and not outputted. The results data set stored in the waiting data queue is taken out in the following cycle from the waiting data queue, and it is regarded as arrived at the version comparison unit 121.

The version comparison unit 121 examines whether the results data set has arrived at the version comparison unit (Step S1102). In case the results data set has arrived at the version comparison unit (Step S1102: Yes), step proceeds to Step S1103 (FIG. 8). In case the results data set has not arrived at the version comparison unit (Step S1102: No), that is, in case the results data set has arrived at the synchronization unit 131, step proceeds to Step S1301.

The arbitration unit 1003 of the version comparison unit 121 examines whether the results data set arrived is only one (Step S1103). In case of only one (Step S1103: Yes), step proceeds to Step S1104. In case the results data set that has arrived at the version comparison unit 121 is not only one (Step S1103: No), step proceeds to Step S1201 (FIG. 7).

The arbitration unit 1003 of the version comparison unit 121 sends the results data set to the synchronization unit 131 (Step 1104) and step returns to Step S1099.

Next, operation that follows will be explained using FIG. 7. In case the results data set that has arrived at the version comparison unit 121 is not only one (Step S1103: No), the arbitration unit 1003 of the version comparison unit 121 examines, among the results data sets arrived, whether the sets for which the process ID is identical and the version numbers are different remain (Step S1201). At this time, since there is a case when the results data sets may arrive in plural and simultaneously to the version comparison unit 121, the results data sets that arrived simultaneously are examined first. In case the sets for which the process ID is identical and the version numbers are different remain (Step S1201: Yes), step proceeds to Step S1202. In case a pair for which the process ID is identical and the version numbers are different does not remain (Step S1201: No), step proceeds to Step S1203.

In case the pair for which the process ID is identical and the version number are different remains, the arbitration unit 1003 of the version comparison unit 121 discards the results data set of which the version number is older by "1" (Step S1202), and step returns to Step S1201.

In case the pair for which the process ID is identical and the version numbers are different does not remain, the arbitration unit 1003 of the version comparison unit 121 carries out arbitration of allocation of the output port among the results data sets arrived and not discarded. That is, the results data set to which the port is allocated is sent to the synchronization unit, the results data set to which the port was not allocated is inserted in the waiting data queue 1002 of the version comparison unit 121 (Step S1203), and step returns to Step S1099. "Arbitration of allocation of the output port" means specifically an act of selecting one data that can use the output port. When data is selected in this arbitration, it is called as "data obtained the port".

Next, operation that follows will be explained using FIG. 8. In case the results data set has arrived at the synchronization unit 131 (Step S1102: No), the synchronization unit 131 examines whether the version number of the results data set arrived is older than the version number recorded in the synchronization unit 131 for each process ID (Step S1301). In case the version number of the results data set arrived is older, step proceeds to Step S1304, and in case not so, step proceeds to Step S1302.

In case the version number of the results data set arrived is not older than the version number recorded in the synchronization unit 131 for each process ID (Step S1301: No), the synchronization unit 131 updates the version number that synchronization unit 131 records for each process ID by the one of the results data set arrived (Step 1302) and step proceeds to Step S1303.

Next, the synchronization unit 131 transmits the results data set arrived to the output port to the outside (Step 1303) and step returns to Step S1099.

In case the version number of the results data set arrived is older than the version number recorded in the synchronization unit 131 for each process ID (Step S1301: Yes), the synchronization unit 131 discards the results data set arrived (Step S1304) and step returns to Step S1099.

Specific Example of Operation of the Exemplary Embodiment 1

A specific example of operation of the time series data processing device 100 according to the exemplary embodiment will be explained with reference to the flow charts of FIG. 6 to FIG. 8 and the block diagrams of FIG. 9 to FIG. 15.

The time series data processing device 100 of FIG. 9 to FIG. 15 is equipped with the four processing units 101. Hereinafter, the processing unit that takes charge of execution of the old process is transcribed as a processing unit 101-1, and the processing unit that takes charge of execution of the new process is transcribed as a processing unit 101-2. When whether the process to be executed is the old process or the new process does not need to be distinguished, and when it applies to both of the processing unit 101-1 and the processing unit 101-2, or when the process other than the old process and the new process is carried out, it is transcribed as the processing unit 100.

In the following explanation, an array of data is represented as [1, 2, 3, 4]. Each process employs, as the array, a data structure that stores data by inserting new data to the right one by one. For example, when it is supposed that data comes at every time, and in case the values as [1, 2, 3, 4] are stored at time 4, entry at right end corresponds to input data at time 4 and one at left end corresponds to input data at time 1. In the data structure mentioned above, like a FIFO or a shift register, values of each entry move to the left as time passes and only four nearest values are held automatically. In FIG. 9 to FIG. 15, the arrays of data are transcribed as mentioned above.

In this specific example, about time series data of a stock price, to change a process of calculating a sum of the four values (referred to as "an old process") to a process of calculating an average of the four values (referred to as "a new process") is considered.

Further, in the following explanation, it is assumed that both the new process and the old process are realized by, after circuit information to execute respective processes is written in a circuit element which is re-configurable like an FPGA, operating the circuit. However, the realization method of the new process and the old process is not limited to the method that is realized by hardware as mentioned above. That is, as described above, a method by software, that is, to make a processor equipped in the processing unit 101 execute a program, may be used. In the realization method by software, "circuit information" below may be replaced by and understood as "a program".

In this specific example, the processes are changed in the following steps.

(1) Write the circuit information to execute the new process in an area different from the area where the circuit information to execute the old process is written.
(2) Start operation of the new process.
(3) Start output of the new process.
(4) Stop operation of the old process.
(5) Delete the circuit information to execute the old process.

In the initial state, only the processing unit 101-1 that executes the old process is in operation on the time series data processing device 100.

Also, the time series data processing device 100 satisfies requirements that, after the time that the new process started to output the results data and the results data reached the output port to device exterior, only the results data of the new process is outputted to device exterior, and until then, the results data of the old process is outputted to device exterior to the maximum. In other words, since the execution of the old process is not indispensable after the new process has started, even though the old process continues execution as much as possible, it can be stopped at arbitrary point of time.

As mentioned above, the device that executes the new process and the old process may also be an FPGA. Destination that the time series data processing device 100 outputs the results may also be the host computer. In case the device that executes the processes is an FPGA, the old process may also be realized by using a reconfiguration function that the FPGA has and by writing the necessary circuit information in the FPGA.

Also, it is supposed that input data is an integer. As described above, a period of a clock used for the operation of the time series data processing device is called "a cycle", and this is used as a unit of a period of time. "Start time of cycle" means the first point of time of the period of time and "end time of cycle" means the last point of time of the period of time. For example, in case a frequency of the clock is a clock of 1 GHz, concerning a certain reference time, the first cycle means a period of time between the reference time plus zero second and the reference time plus 1 nanosecond, and the N-th cycle means a period of time between the reference time plus (N−1) nanoseconds and the reference time plus N nanoseconds. Start time of the M-th cycle means the reference time plus (M−1) nanoseconds, and end time of the M-th cycle means the reference time plus M nanoseconds. It is supposed that the input data is given at each start time of cycle.

Also, "the processing unit 101 outputs the results" means that the processing unit 101 literally outputs the results data calculated. To the results data that the processing unit 101 calculated, the process ID and the version information are appended by the control unit 111, and it is sent to the version comparison unit 121. "The version comparison unit 121 outputs the results" means that the version comparison unit 121 sends the results data to the synchronization unit 131.

First, the synchronization unit 131 records, for each process ID, the latest value of the version number of the results data outputted so far from the synchronization unit 131. This version number is initialized to "0" at the time of start-up.

When input data is given, the control unit 111 sets the process ID and the version number to the results data of the process of the processing unit 101-1. At this time, in case the old process resulted in the state that can be stopped, the version number of the results data of the new process is changed (Step S1099). To the results data of the old process, "10" is set as the process ID, and "1" is set as the version number. Following the requirements of the order to output the results data of the new and the old process, it may be supposed that the old process is always in the state that it can be stopped. Therefore, to the results data of the new process, "10" is set as the process ID, and "2" is set as the version number.

Figure 9:
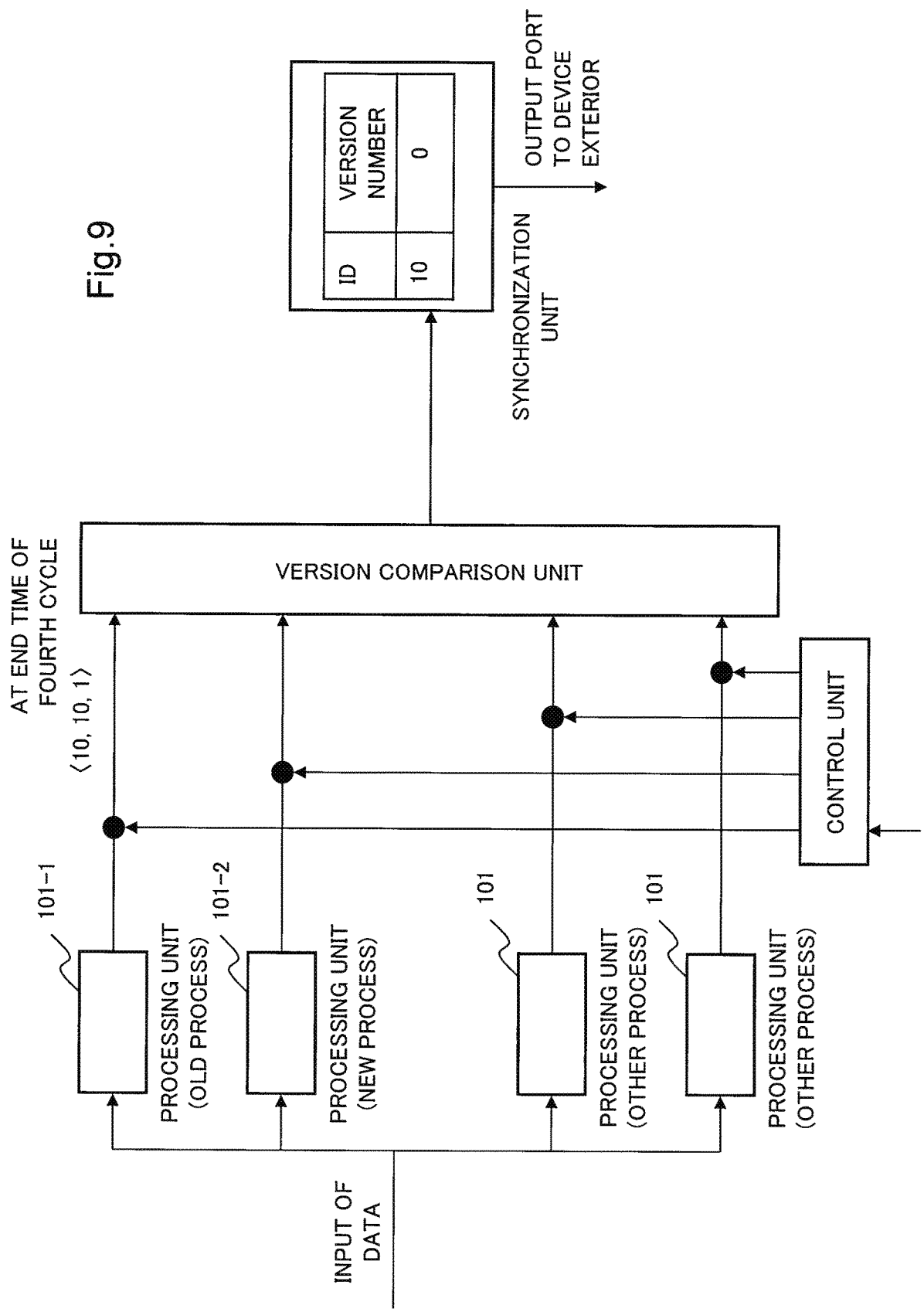
FIG. 9 A figure showing a state of output data of each unit at end time of the fourth cycle in a specific example 1 of operation of an exemplary embodiment of the present invention.

Next, at start time of the first, the second, the third and the fourth cycle, when 1, 2, 3 and 4 are given to the processing unit 101-1 that executes the old process as the input data, the processing unit 101-1 calculates a sum of the input data and outputs it. The processing unit 101-1 outputs the results data, and the control unit 111 appends "10" of the ID and "1" of the version number to the results data and sends it to the version comparison unit 121 (Step S1100). The results data, the ID and the version number are represented altogether as <10, 10, 1>. Hereinafter, as far as there is no confusion, this set of values is called as "results" or "a results data set". Output information inside the time series data processing device 100 at this point of time, that is, the results data set sent to the version comparison unit 121 from the processing unit 101-1 and the results data set sent to the synchronization unit 131 from the version comparison unit 121 are shown in FIG. 9.

At start time of the fifth cycle, the version comparison unit 121 examines whether the results data set has arrived at the input port or the waiting data queue (Step S1101). Since the results data set has arrived, step proceeds to Step S1102. The version comparison unit 121 examines whether the results data set has arrived at the version comparison unit 121 (Step S1102). Since the results data set has arrived at the version comparison unit 121, step proceeds to Step S1103. The version comparison unit 121 examines whether the results data set arrived is only one (S1103). Since the results data set is only one, step proceeds to Step S1104. The version comparison unit 121 sends the results data set arrived to the synchronization unit 131 (Step S1104).

At start time of the fifth cycle, input data "5" is given to the processing unit 101-1 that executes the old process, and the control unit 111 outputs <14, 10, 1> to the version comparison unit 121. The version comparison unit 121 executes as before Step S1101, Step S1102, Step S1103 and Step S1104 and sends the results data set arrived to the synchronization unit 131.

Figure 10:
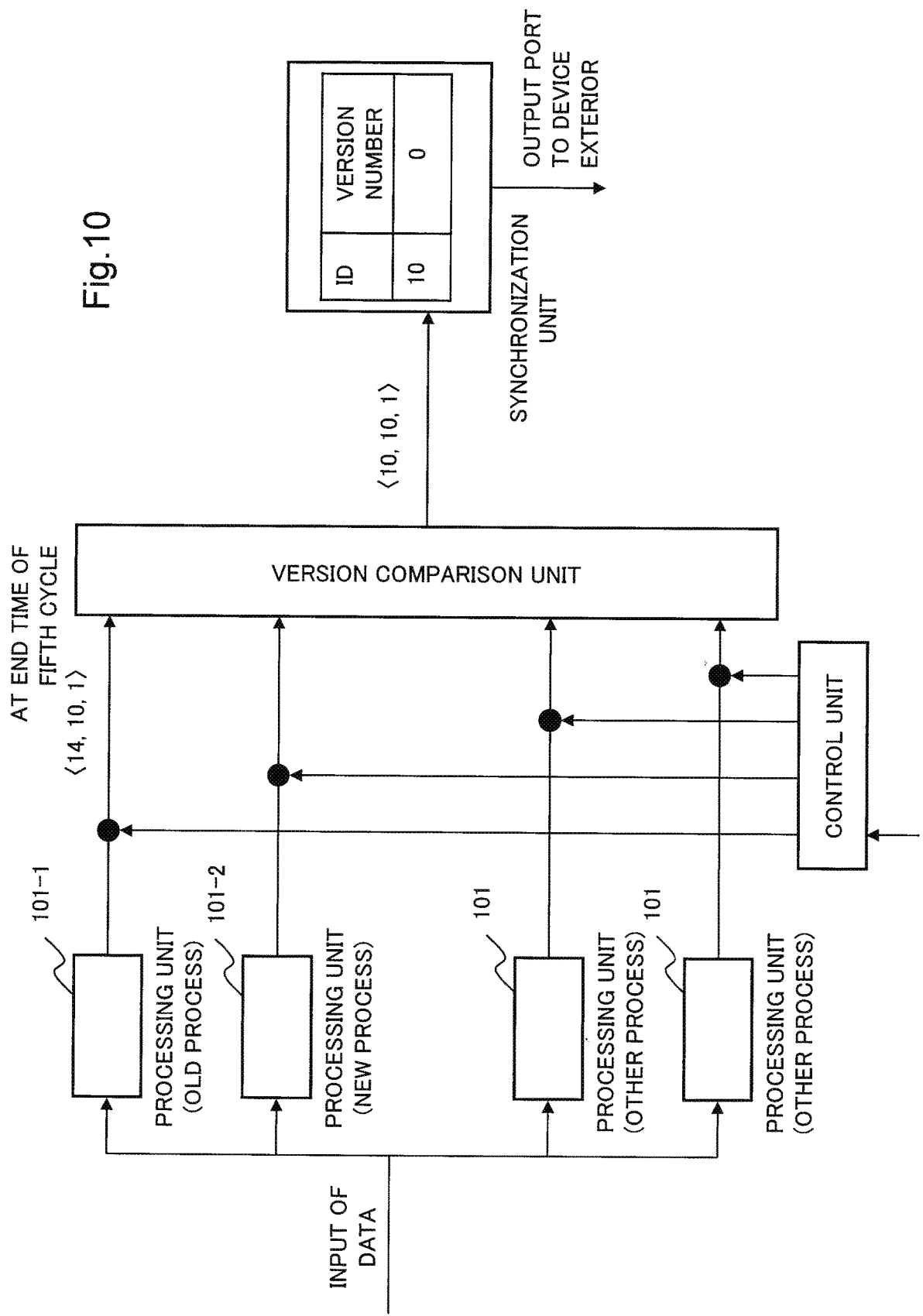
FIG. 10 A figure showing a state of output data of each unit at end time of the fifth cycle in a specific example 1 of operation of an exemplary embodiment of the present invention.

Output information inside the time series data processing device 100 at end time of the fifth cycle is shown in FIG. 10.

At start time of the sixth cycle, the synchronization unit 131 examines whether the version number of the data arrived is older than the version number recorded in the synchronization unit 131 for each process ID (Step S1301). In this case, since the version number "1" of the data arrived is newer than the recorded value "0" by "1", step proceeds to Step S1302. And the version number of the ID "10" recorded in the synchronization unit 131 is updated to the version number of the data arrived, that is, "1" (Step S1302). And the results data set arrived is transmitted to the output port to device exterior (Step S1303).

At start time of the sixth cycle, input data "6" is given to the processing unit 101-1 and the control unit 111 sends the results data set <18, 10, 1> to the version comparison unit 121.

Figure 11:
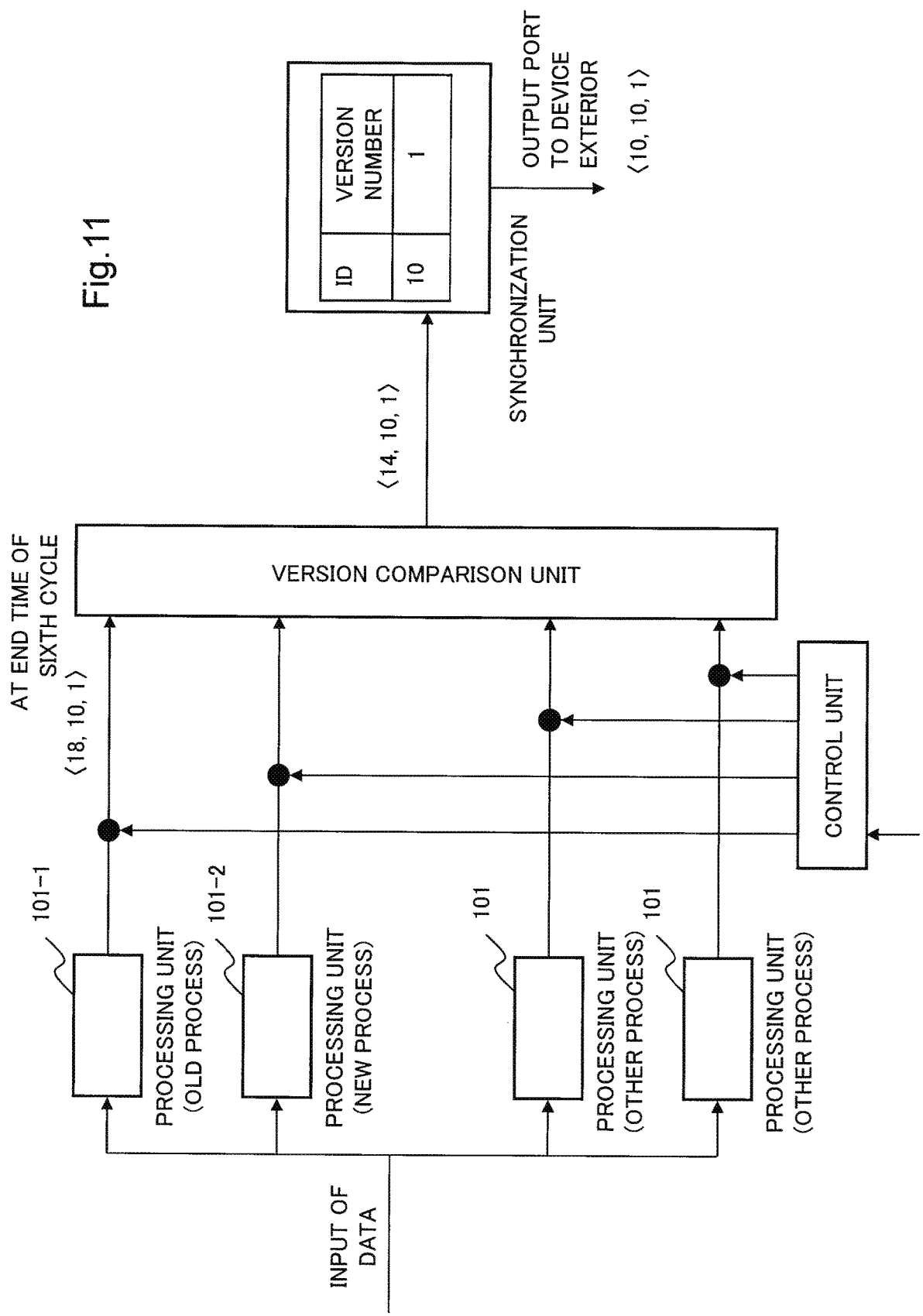
FIG. 11 A figure showing a state of output data of each unit at end time of the sixth cycle in a specific example 1 of operation of an exemplary embodiment of the present invention.

Output information inside the time series data processing device 100 at end time of the sixth cycle is shown in FIG. 11.

It is supposed that writing of the circuit information to execute the new process concerning the processing unit 101-2 has been completed during the sixth cycle. In case the device that executes the process is an FPGA, the new process may also be realized by using the partial reconfiguration function that the FPGA has and by writing the necessary circuit information in the FPGA.

Further, it is supposed that the processing unit 101-2 has started the new process from start time of the seventh cycle. The control unit 121 sets to the results data of the new process "10" same as the ID of the old process and sets the version number of the new process "2", not the version number of the old process "1".

At start time of the seventh cycle, input data 7 is given to the old process, and the control unit 111 sends the results data set <22, 10, 1> to the version comparison unit 121. Also, at the same timing, the input data 7 is also given to the new process, and the control unit 111 sends the results data set <5, 10, 2> to the version comparison unit 121.

Figure 12:
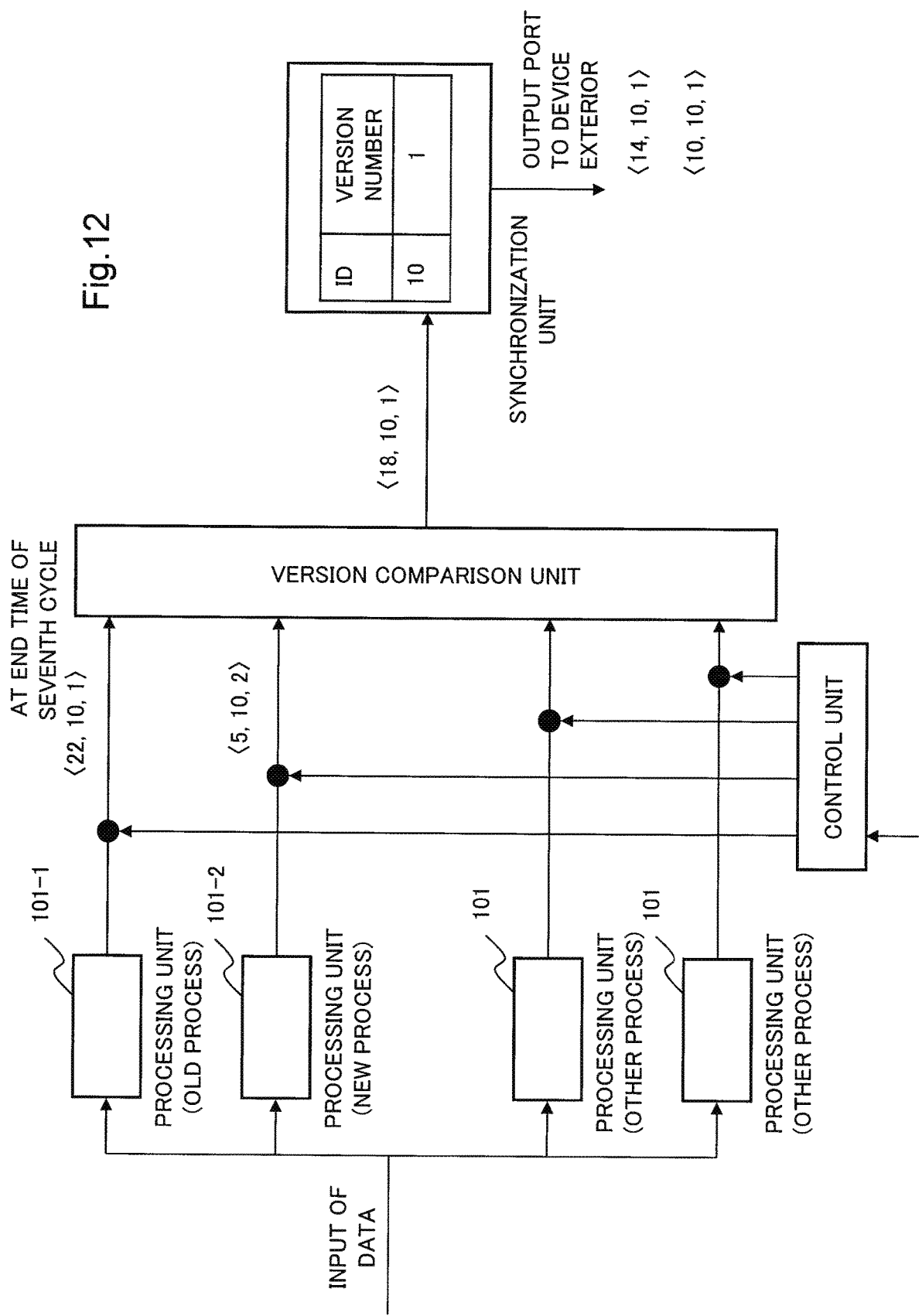
FIG. 12 A figure showing a state of output data of each unit at end time of the seventh cycle in a specific example 1 of operation of an exemplary embodiment of the present invention.

Output information inside the time series data processing device 100 at end time of the seventh cycle is shown in FIG. 12.

At start time of the eighth cycle, the version comparison unit 121 detects that the results data sets have arrived (Step S1101, Step S1102 and Step S1103). Since the results data sets arrived are two (Step S1103: No), step proceeds to Step S1201. The arbitration unit 1003 detects that the process IDs of the two results data arrived are identical (Step S1201), and discards the one of which the ID coincides and the version number is older by "1" (Step S1202). That is, the results data set of the old process is discarded. And step returns to Step S1201. Since one among the two results data sets arrived was discarded, and since there remains no pair of which the process ID is identical, step proceeds to Step S1203 (Step S1201). And for the remaining results data set, arbitration of the output port of the version comparison unit 121 is carried out. Since the remaining results data set is one, the results data set obtains the output port of the version comparison unit 121. And this results data set is sent to the synchronization unit 131 (Step S1203). That is, in the version comparison unit 121, <22, 10, 1> is discarded and <5, 10, 2> is outputted. By this operation, it can be realized that the result of the old process is not outputted to the output port to device exterior any more, and the result of the new process is outputted instead. At start time of the eighth cycle, input data 8 is given to the old process, and the control unit 111 sends the results data set <26, 10, 1> to the version comparison unit 121. Also, at the same timing, the input data "7" is given to the processing unit 101-2 that executes the new process, and the control unit 111 sends the results data set <6, 10, 2> to the version comparison unit 121.

Figure 13:
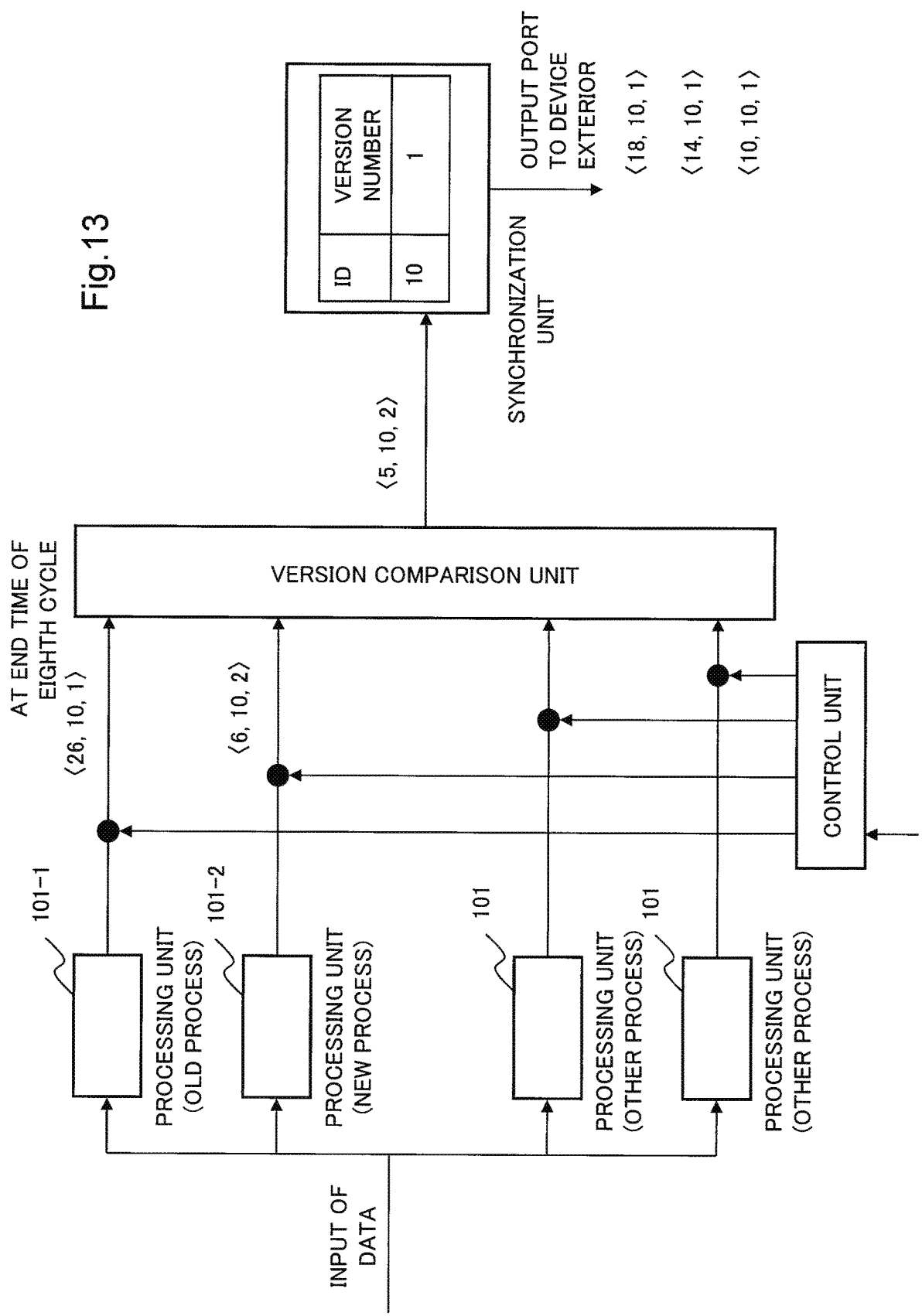
FIG. 13 A figure showing a state of output data of each unit at end time of the eighth cycle in a specific example 1 of operation of an exemplary embodiment of the present invention.

Output information inside the time series data processing device 100 at end time of the eighth cycle is shown in FIG. 13.

At start time of the ninth cycle, <5, 10, 2> reaches the synchronization unit 131. The synchronization unit 131 examines whether the results data set has arrived at the input port or the waiting data queue (Step S1101). Since the results data set has arrived, step proceeds to Step S1102. Further, the synchronization unit 131 examines whether the results data set has arrived at the version comparison unit 121. Since it arrived at the synchronization unit 131, step proceeds to Step S1301. And the version number of the results data set arrived is examined whether it is older than the version number of the process ID 10 recorded in the synchronization unit 131 (Step S1301). Since the version number of the results data set arrived is newer by "1", step proceeds to Step S1302. The synchronization unit 131 updates the version number to the one recorded in the synchronization unit 131 and the one of the results data set arrived with the version number of the process ID 10, that is, "2" (Step S1302). And step proceeds to Step S1303. The synchronization unit 131 advances the data arrived to the output port to device exterior (Step S1303). The old process may be stopped at this point of time. At start time of the ninth cycle, input data "9" is given to the processing unit 101-1 of the old process, and the control unit 111 sends the results data set <30, 10, 1> to the version comparison unit 121. Also, at the same timing, the input data "9" is also given to the processing unit 101-2 of the new process, and the control unit 111 sends the results data set <7, 10, 2> to the version comparison unit 121.

Figure 14:
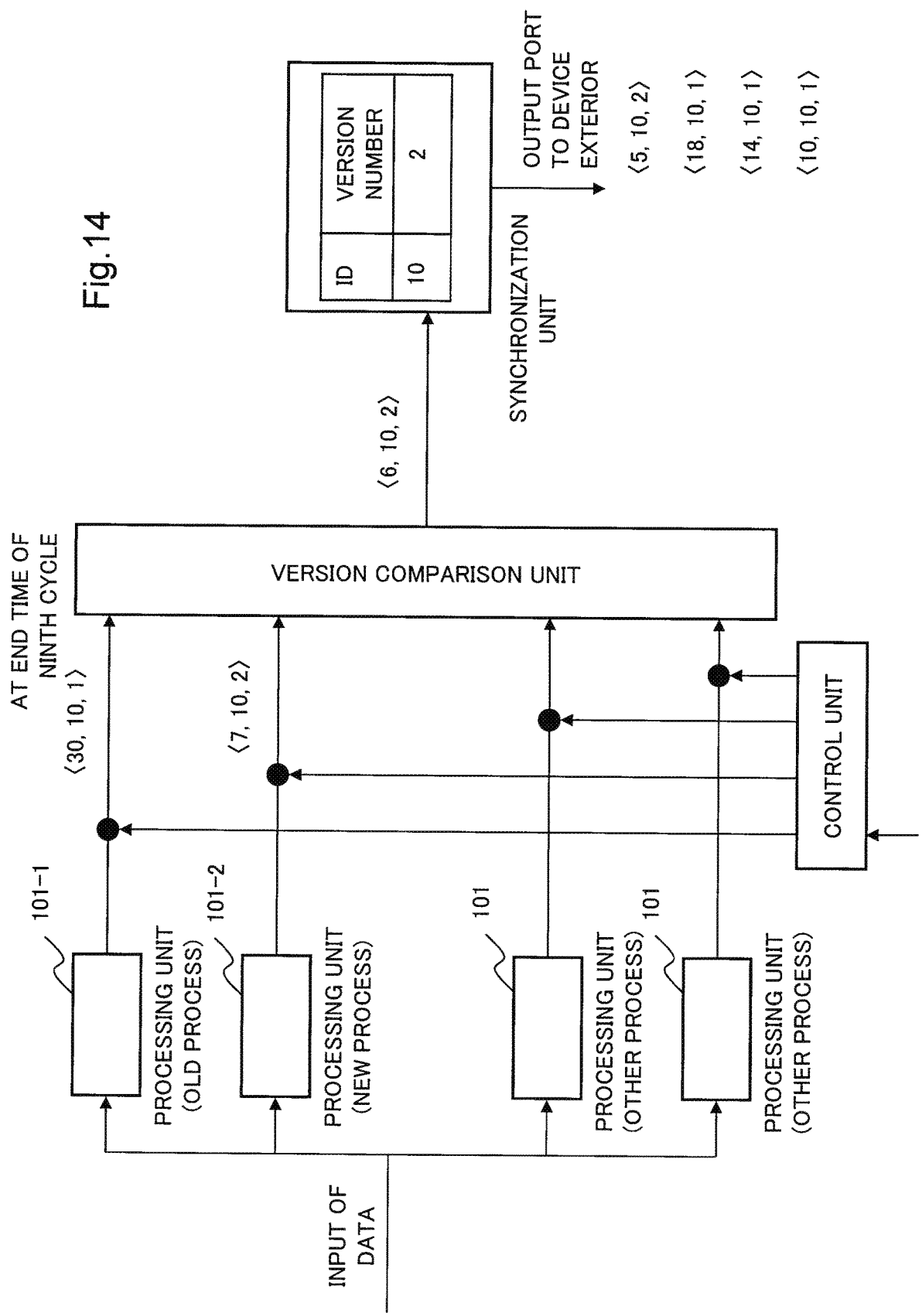
FIG. 14 A figure showing a state of output data of each unit at end time of the ninth cycle in a specific example 1 of operation of an exemplary embodiment of the present invention.

Output information inside the time series data processing device 100 at end time of the ninth cycle is shown in FIG. 14.

In the tenth cycle, the version comparison unit 121 repeats the same operation. That is, the version comparison unit 121 executes Step S1101, Step S1102, Step S1103, Step S1201, Step S1202, Step S1201 and Step S1203 in that order, discards the results data set of the old process, and sends only the result of the new process to the synchronization unit 131. At start time of the tenth cycle, input data 10 is given to the processing unit 101-1 of the old process, and the control unit 111 sends the results data set <34, 10, 1> to the version comparison unit 121. Also, at the same timing, the input data 10 is also given to the processing unit 101-2 of the new process, and the control unit 111 sends the results data set <8, 10, 2> to the version comparison unit 121.

Also, the synchronization unit 131 executes Step S1101 and Step S1102 like the cycle one before and step proceeds to Step 1301. Here, the version number of the data arrived is examined whether it is older than the version number that the synchronization unit 131 records for each process ID (Step S1301). Since the version number of the data arrived is 2 and is not older than the version number 2 recorded in the synchronization unit 131, step proceeds to Step S1302. The synchronization unit 131 updates the version number recorded in the synchronization unit 131 for each process ID to the one of the data arrived (Step S1302). The synchronization unit 131 advances the data arrived to the output port to device exterior (Step S1303).

Figure 15:
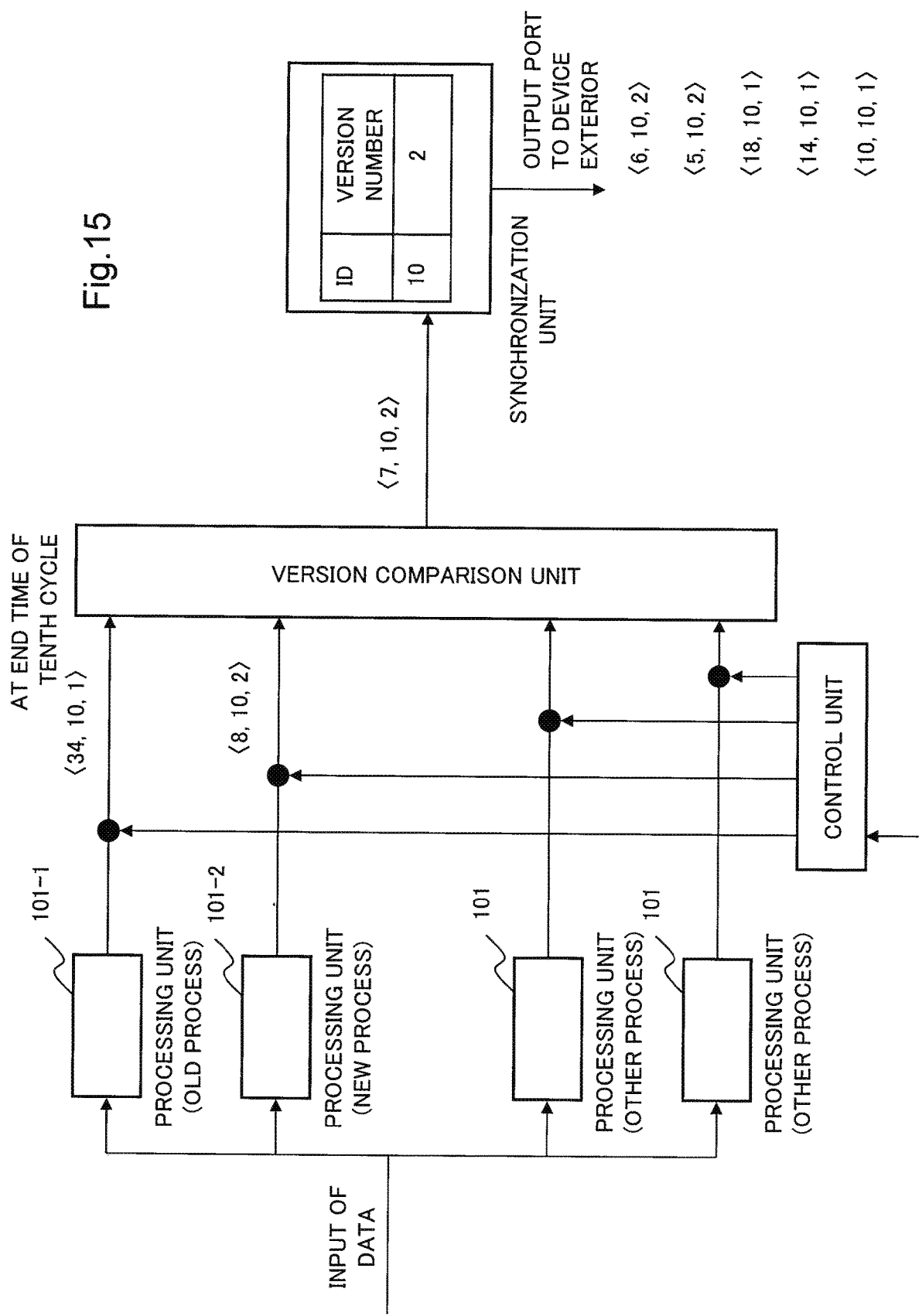
FIG. 15 A figure showing a state of output data of each unit at end time of the tenth cycle in a specific example 1 of operation of an exemplary embodiment of the present invention.

Output information inside the time series data processing device 100 at end time of the tenth cycle is shown in FIG. 15.

In the cycles of the eleventh and after, the version comparison unit 121 repeats the same operation. That is, it discards the results data sets of the old process, and sends only the results of the new process to the synchronization unit 131. Also, the synchronization unit 131 repeats the same operation. That is, it advances the results of the new process to the output port to device exterior.

As a result, it is realized that the new process continues to output the results.

When a sequence of the output to device exterior at end time of the tenth cycle is represented in younger order of time, it will be <10, 10, 1>, <14, 10, 1>, <18, 10, 1>, <5, 10, 2> and <6, 10, 2>. Seen from this, it can be understood that the results of the old process are outputted to device exterior just before the results of the new process start to be outputted to device exterior. In other words, it can be understood that, at the timing when the results of the old process are outputted to device exterior to the maximum, the output of the results of the old process to device exterior is stopped. Also, since unnecessary results data is discarded in the version comparison unit 121, it can also be understood that there are no cases that the results of both the new and the old process are outputted to device exterior.

Specific Example of Operation of the Exemplary Embodiment 2

A specific example of the time series data processing device 100 according to the exemplary embodiment will be explained with reference to the flow charts of FIG. 6 to FIG. 8 and the block diagrams of FIG. 16 to FIG. 24.

In this specific example, about time series data of a stock price, to change a process that calculates a sum of the four values (referred to as "an old process") to a process that calculates an average of the four values (referred to as "a new process") is considered.

In this specific example, the processes are changed in the following steps.

(1) Write the circuit information to execute the new process in an area different from the area where the circuit information to execute the old process is written.
(2) Start operation of the new process.
(3) Start output of the new process.
(4) Stop operation of the old process.
(5) Delete the circuit information to execute the old process.

In the initial state, only the processing unit 101-1 that executes the old process is in operating on the device.

Also, the time series data processing device 100 satisfies requirements that, after the time the new process started to output the results data and the results data reached the output port to device exterior, only the results data of the new process is outputted to device exterior, and until then, the results data of the old process is outputted to device exterior to the maximum. In other words, since the execution of the old process is not indispensable after the new process has started, even though the old process continues the execution as much as possible, it can be stopped at arbitrary point of time.

It is supposed that input data is an integer. In this specific example, the input data is given every other cycle, not every cycle.

When the input data is given, the control unit 111 sets the process ID and the version number to the results data of the processing unit 101-1. At this time, in case the old process resulted in the state that can be stopped, the version number of the results data of the new process is changed (Step S1099). To the results data of the old process, "10" is set as the process ID, and "1" is set as the version number. Following the requirements of the order to output the results data of the new and the old process, it may be supposed that the old process is in the state that can always be stopped. Therefore, to the results data of the new process, "10" is set as the process ID, and "2" is set as the version number.

The synchronization unit 131 records, for each process ID, the latest value of the version number of the results data outputted so far from the synchronization unit 131. This version number is initialized to "0" at the time of start-up.

At the timing when the processing unit 101-1 outputted the results data, the control unit 111 sends the process ID and the version number as well as the results data to the version comparison unit 121 (Step S1100).

To the processing unit 101-1 of the old process, input data "1" is given in the second cycle, input data "2" is given in the fourth cycle, input data "3" is given in the sixth cycle and input data "4" is given in the eighth cycle. FIG. 16 to FIG. 24 show output information at each position at point of time when the processing unit 101-1 calculated and outputted the sum. The control unit 111 sends to the version comparison unit 121 "10" as the process ID and "1" as the version number as well as the data.

Figure 16:
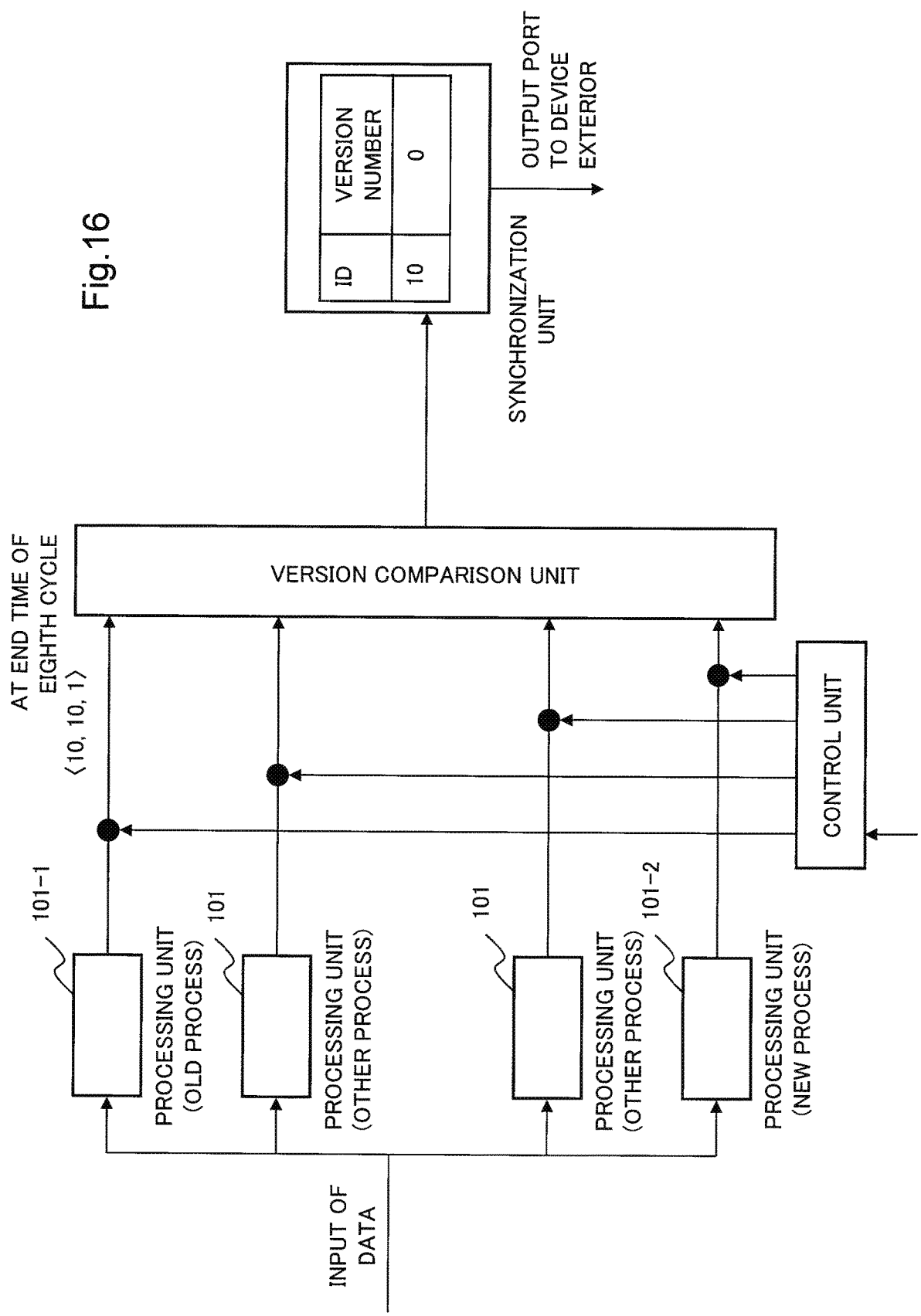
FIG. 16 A figure showing a state of output data of each unit at end time of the eighth cycle in a specific example 2 of operation of an exemplary embodiment of the present invention.

Output information inside the time series data processing device 100 at end time of the eighth cycle is shown in FIG. 16.

At start time of the ninth cycle, the version comparison unit 121 examines whether the results data set has arrived at the input port or the waiting data queue (Step S1101). Since the results data set has arrived, step proceeds to Step S1102. The version comparison unit 121 examines whether the results data set has arrived at the version comparison unit 121 (Step S1102). Since the results data set has arrived at the version comparison unit 121, step proceeds to Step S1103. The version comparison unit 121 examines whether the results data set arrived is only one (S1103). Since the results data set is only one, step proceeds to Step S1104. The version comparison unit 121 sends the results data set arrived to the synchronization unit 131 (Step S1104).

Figure 17:
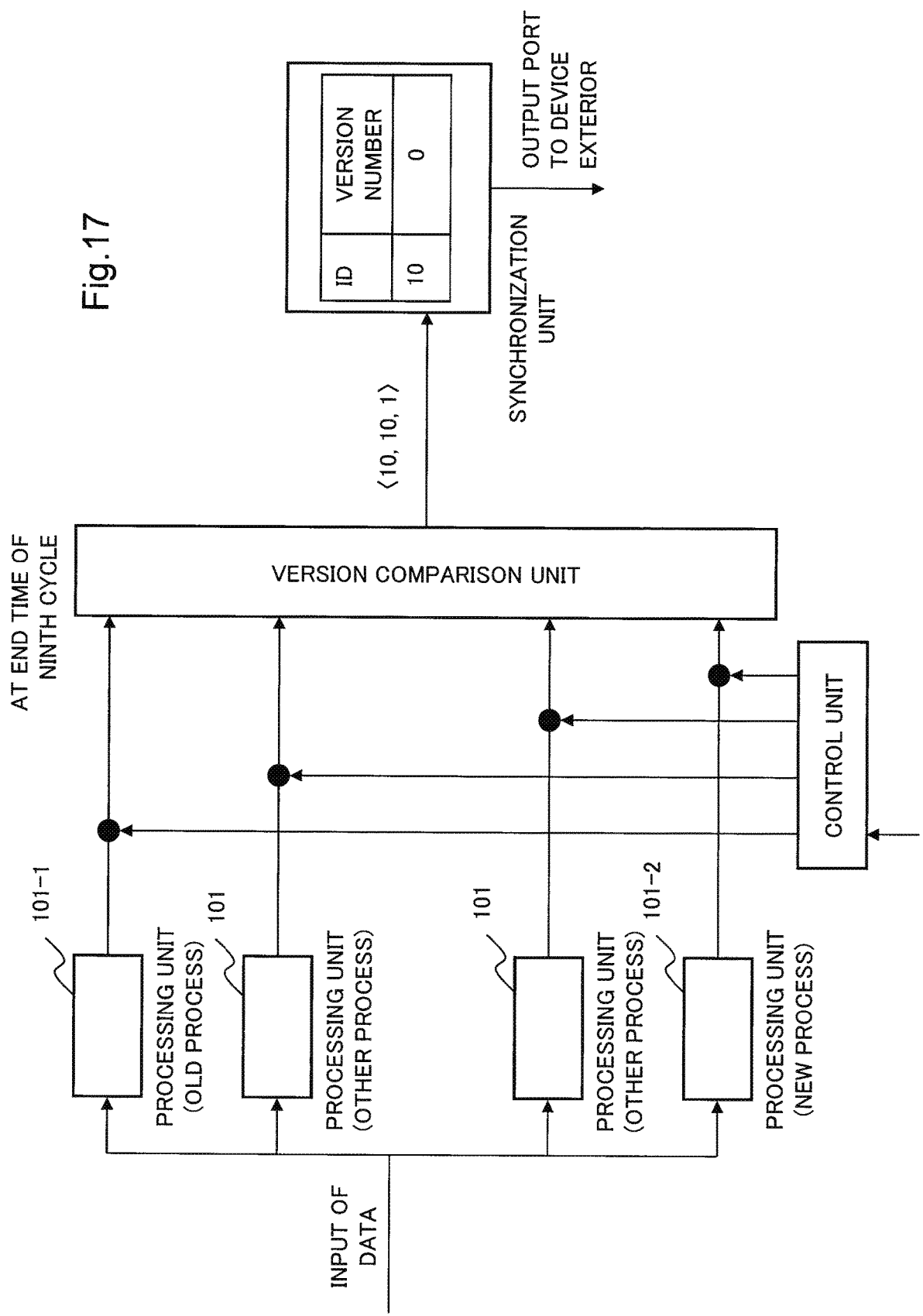
FIG. 17 A figure showing a state of output data of each unit at end time of the ninth cycle in a specific example 2 of operation of an exemplary embodiment of the present invention.

Output information inside the time series data processing device 100 at end time of the ninth cycle is shown in FIG. 17.

At start time of the tenth cycle, input data "5" is given to the processing unit 101-1 that executes the old process, and the control unit 111 outputs <14, 10, 1> to the version comparison unit 121. At start time of the tenth cycle, the synchronization unit 131 examines whether the version number of the data arrived is older than the version number recorded in the synchronization unit 131 for each process ID (Step S1301). In this case, since the version number "1" of the data arrived is newer than the recorded value "0" by "1", step proceeds to Step S1302. And the version number of the process ID "10" recorded in the synchronization unit 131 is updated to the version number of the data arrived, that is, "1" (Step S1302). And the results data set arrived is transmitted to the output port to device exterior (Step S1303).

Figure 18:
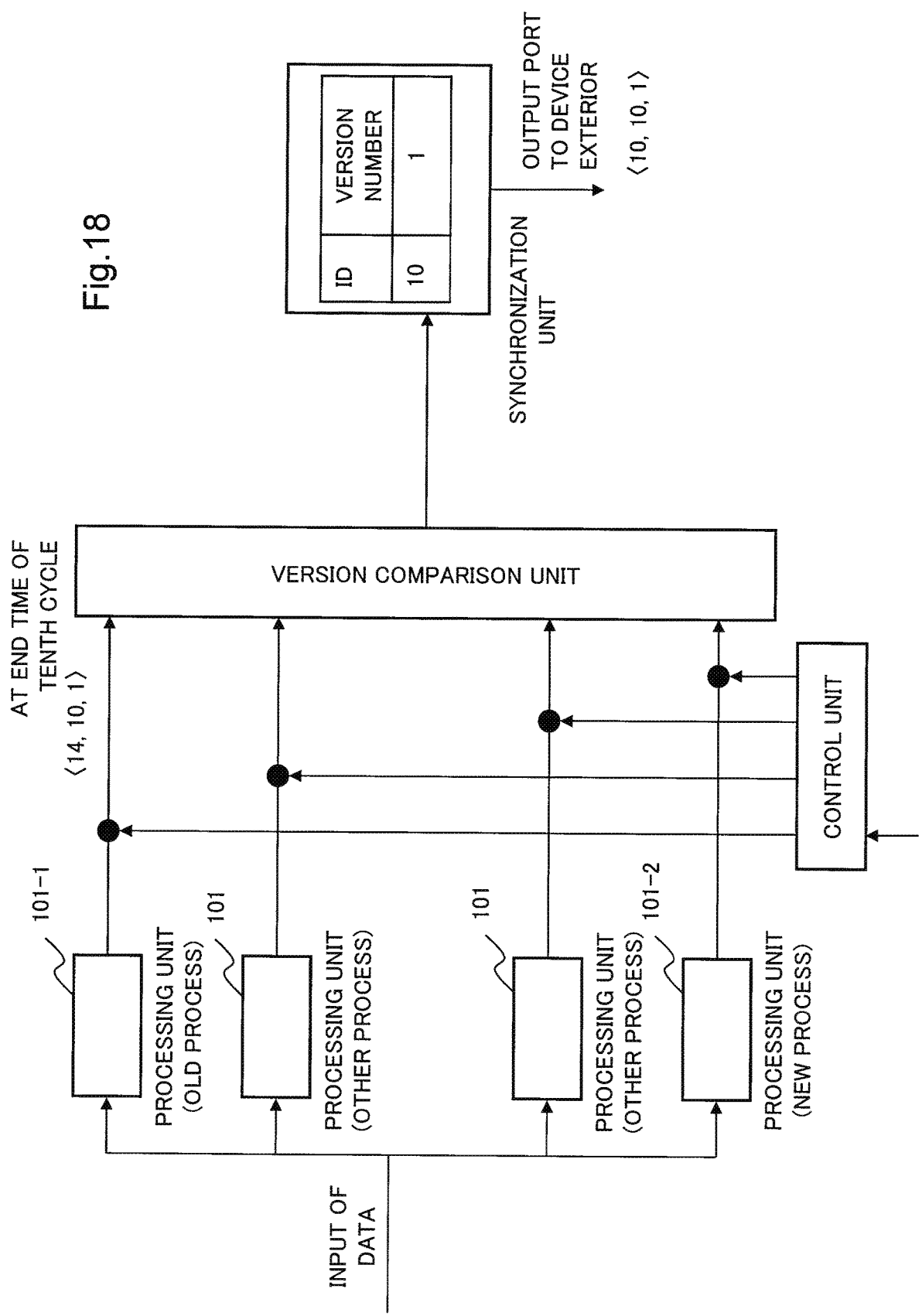
FIG. 18 A figure showing a state of output data of each unit at end time of the tenth cycle in a specific example 2 of operation of an exemplary embodiment of the present invention.

Output information inside the time series data processing device 100 at end time of the tenth cycle is shown in FIG. 18. Also, it is supposed that writing of the circuit information to execute the new process concerning the processing unit 101-2 has been completed during the tenth cycle.

At start time of the twelfth cycle, input data "6" is given to the old process and the control unit 111 sends <18, 10, 1> to the version comparison unit 121. It is supposed that the new process has started the process at start time of the twelfth cycle. The input data "6" is also given to the new process. Here, it is supposed that delay until the processing unit 101-2 of the new process outputs the results is larger than delay until the processing unit 101-2 of the old process outputs the results by 1 cycle.

Figure 19:
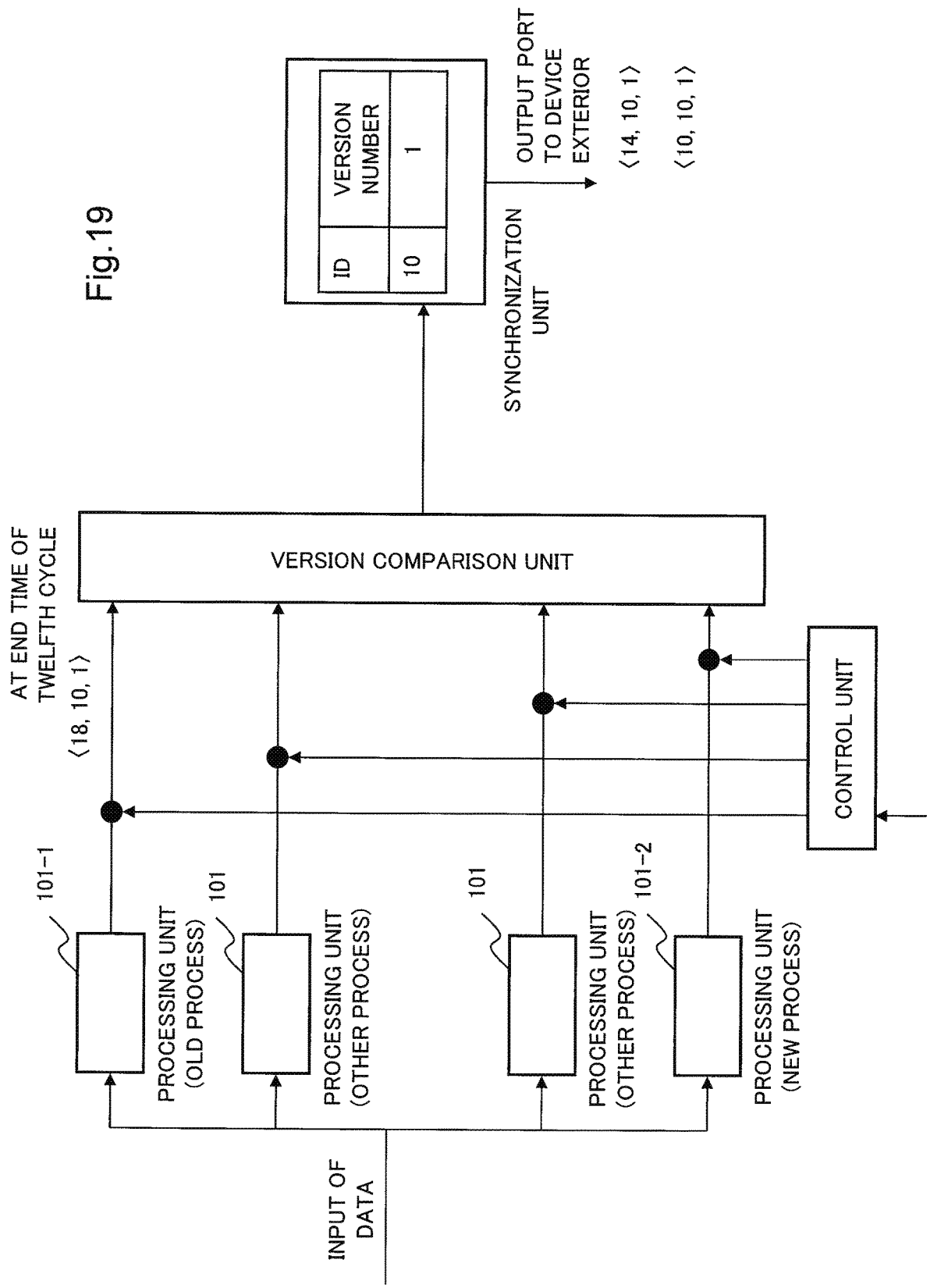
FIG. 19 A figure showing a state of output data of each unit at end time of the twelfth cycle in a specific example 2 of operation of an exemplary embodiment of the present invention.

Output information inside the time series data processing device 100 at end time of the twelfth cycle is shown in FIG. 19.

At end time of the thirteenth cycle, the processing unit 101-2 that executes the new process outputs the results data and the control unit 111 sends the results data set <4, 10, 2> to the version comparison unit 121. Since it is supposed that the delay until the results data of the new process is outputted is larger than the delay until the results data of the old process is outputted by 1 cycle, note that output is performed at this timing.

Figure 20:
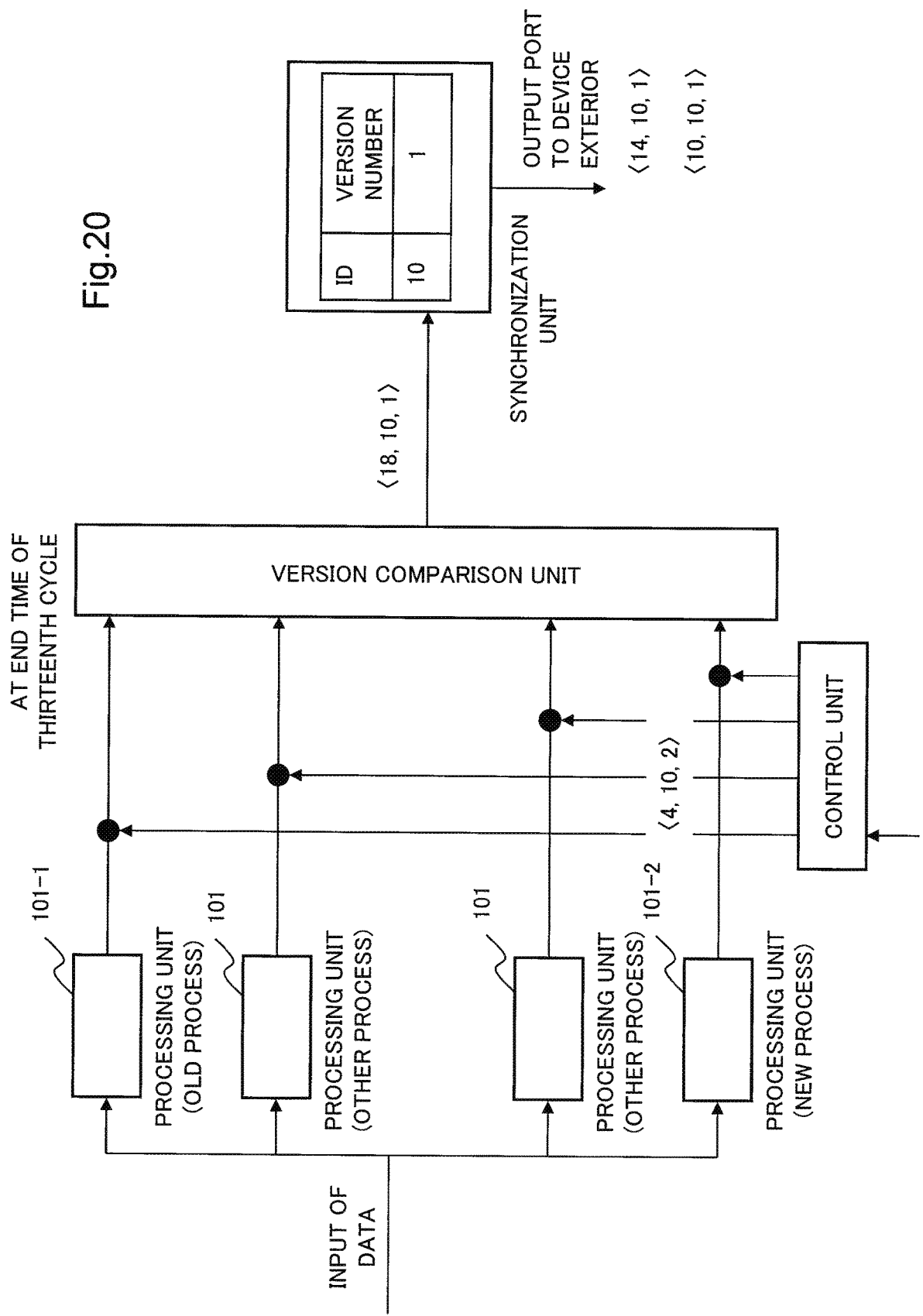
FIG. 20 A figure showing a state of output data of each unit at end time of the thirteenth cycle in a specific example 2 of operation of an exemplary embodiment of the present invention.

Output information inside the time series data processing device 100 at end time of the thirteenth cycle is shown in FIG. 20.

At start time of the fourteenth cycle, input data "7" is given to the processing unit 101-1 of the old process, and the control unit 111 sends <22, 10, 1> to the version comparison unit 121. At start time of the fourteenth cycle, the results data set <4, 10, 2> arrives at the version comparison unit 121. Here, since the timing that the results data set of the old process arrives and the timing that the results data set of the new process arrives at the version comparison unit 121 are different, the version comparison unit 121 outputs this data just as it is.

Figure 21:
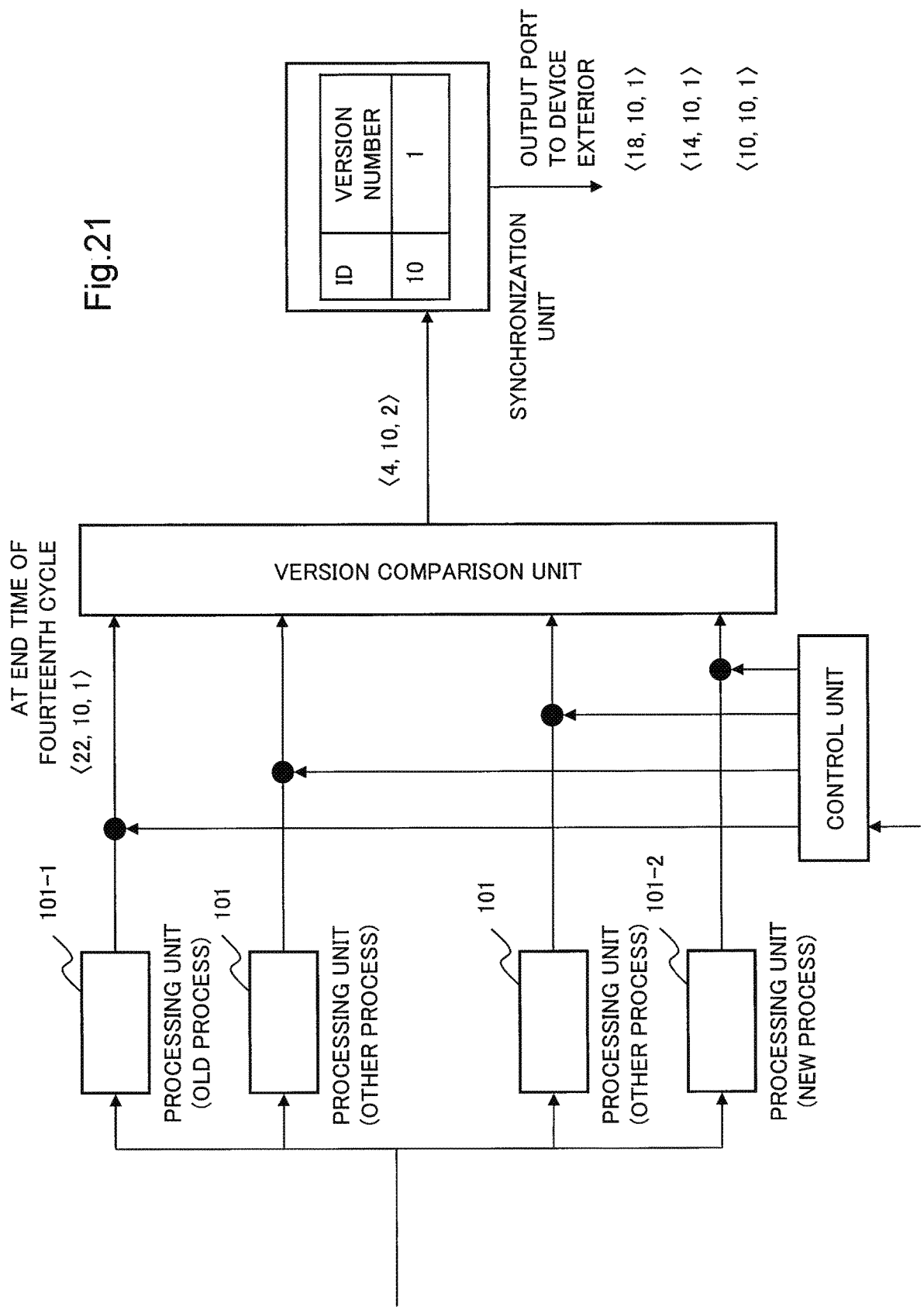
FIG. 21 A figure showing a state of output data of each unit at end time of the fourteenth cycle in a specific example 2 of operation of an exemplary embodiment of the present invention.

Output information inside the time series data processing device 100 at end point of time of the fourteenth cycle is shown in FIG. 21.

At start time of the fifteenth cycle, <4, 10, 2> reaches the synchronization unit 131. Since the version number of this data is "2", and the version number of ID 10 recorded in the synchronization unit 131 is "1", the latest version number corresponding to the ID "10" recorded in the synchronization unit 131 is updated to "2", and the data is outputted to device exterior (Step S1301, Step S1302 and Step S1303). The old process may be stopped at this point of time.

Figure 22:
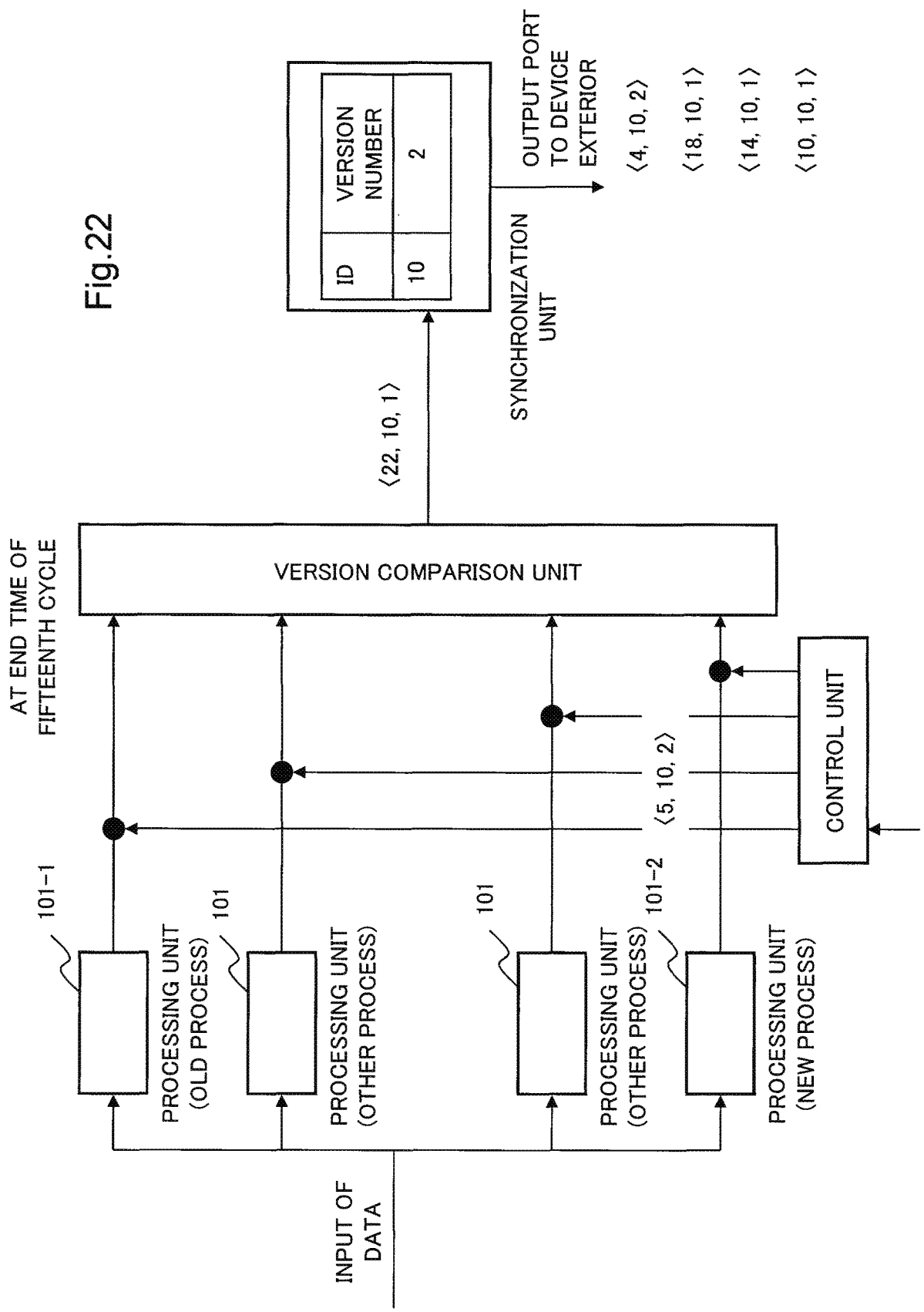
FIG. 22 A figure showing a state of output data of each unit at end time of the fifteenth cycle in a specific example 2 of operation of an exemplary embodiment of the present invention.

Output information inside the time series data processing device 100 at end point of time of the fifteenth cycle is shown in FIG. 22.

At start time of the sixteenth cycle, input data 7 is given to the processing unit 101-1 of the old process, and the control unit 111 sends <26, 10, 1> to the version comparison unit 121. <22, 10, 2> reaches the synchronization unit 131. Since version number corresponding to the ID "10" recorded in the synchronization unit 131 is "2", the synchronization unit 131 discards this results data set (Step S1301 and Step S1304).

Figure 23:
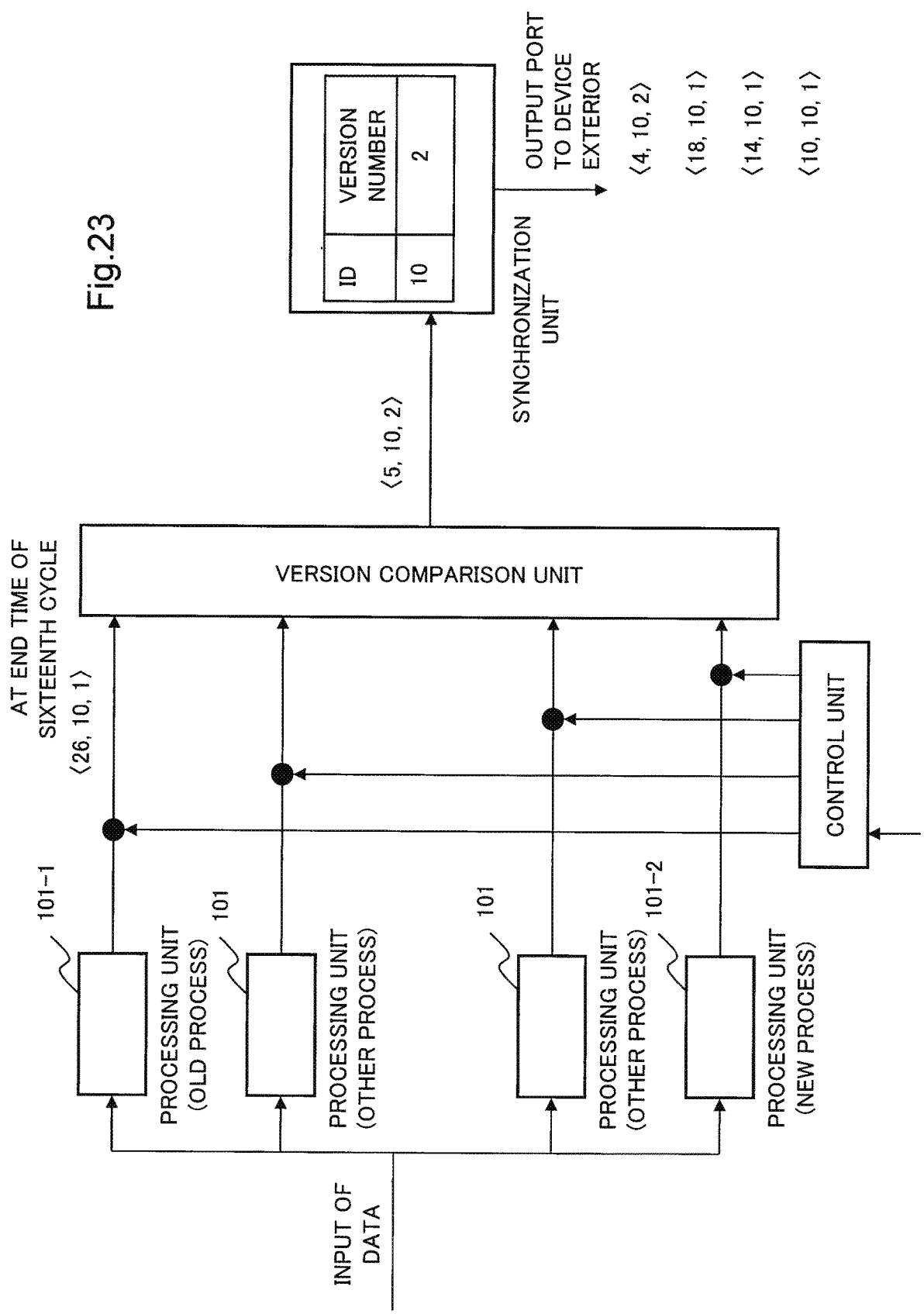
FIG. 23 A figure showing a state of output data of each unit at end time of the sixteenth cycle in a specific example 2 of operation of an exemplary embodiment of the present invention.

Output information inside the time series data processing device 100 at end point of time of the fifteenth cycle is shown in FIG. 23.

At start time of the seventeenth cycle, the synchronization unit 131 examines whether the version number of the results data set <5, 10, 2> of the new process is older than the version number "2" of the ID 10 recorded in the synchronization unit 131 (Step S1301). Since both of the two version numbers are the same, the results of the new process are outputted to device exterior (Step S1302 and Step S1303).

Figure 24:
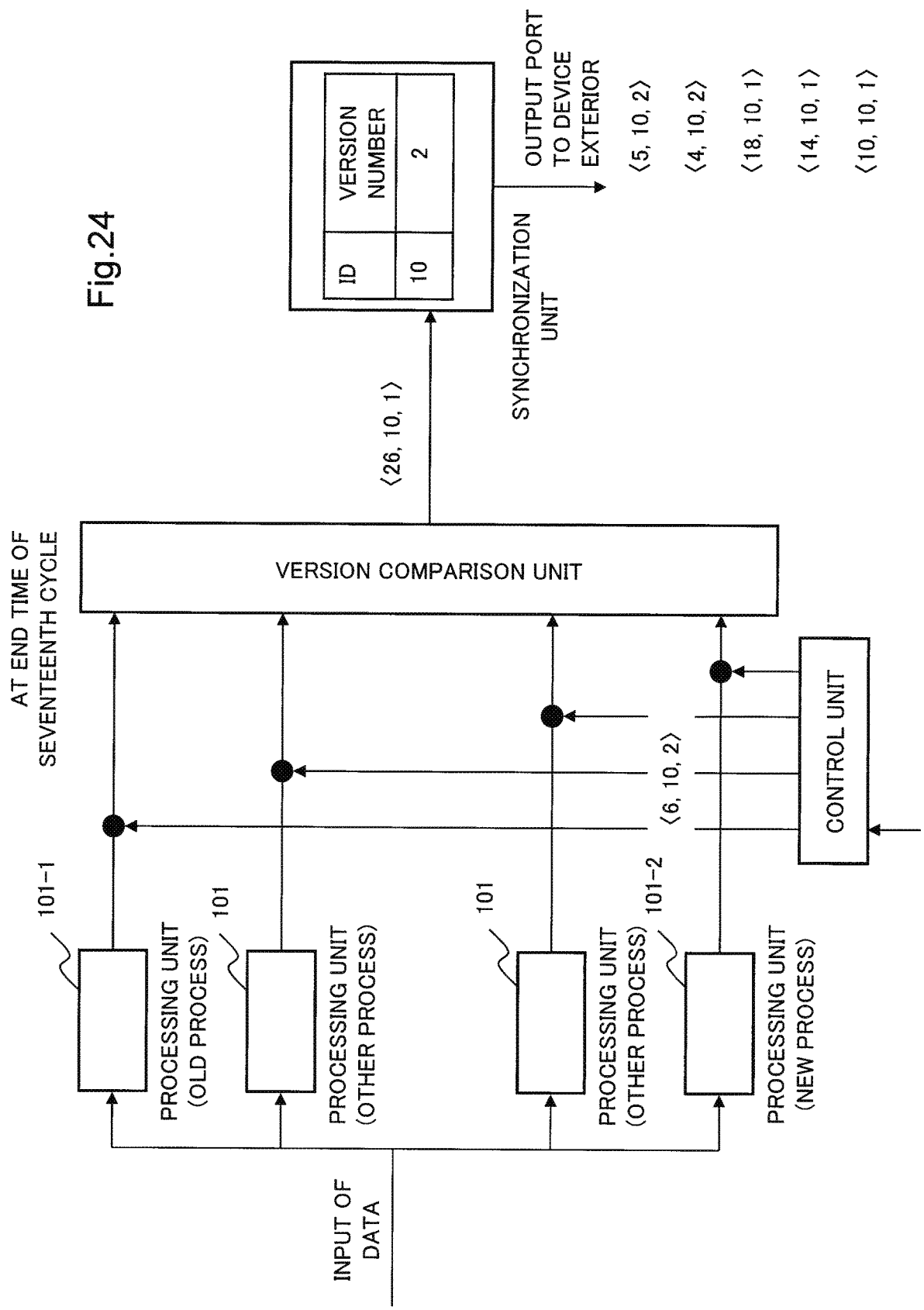
FIG. 24 A figure showing a state of output data of each unit at end time of the seventeenth cycle in a specific example 2 of operation of an exemplary embodiment of the present invention.

At end time of the seventeenth cycle, the state will be as shown in FIG. 24.

In the eighteenth cycle and after, the synchronization unit 131 repeats the same operation. As a result, it is realized that the results of the old process are discarded and that the results of the new process continue to be outputted to device exterior. When the output to device exterior at end time of the seventeenth cycle is represented by a sequence in younger order of time, it will be <10, 10, 1>, <14, 10, 1>, <18, 10, 1>, <4, 10, 1> and <5, 10, 2>. Seen from this, it can be understood that the results of the old process are outputted to device exterior just before the results of the new process are outputted. In other words, it can be understood that the results of the old process are stopped at the timing when the results are utilized to the maximum. Also, it can be understood that there are no cases that the results of both the new and the old process are outputted to device exterior being mixed.

Also, when output of the results of the old process is, by using the technology of NPL 1, stopped at the same time as process start of the new process, that is, at start of the twelfth cycle, the useful and available results data set <18, 10, 1> of the old process is not outputted. In other words, by the technique of this exemplary embodiment, the results of the old process that were not outputted by the technology of NPL 1 and that are useful and available can be outputted to device exterior to the maximum.

Specific Example of Operation of the Exemplary Embodiment 3

A specific example of the time series data processing device 100 according to the exemplary embodiment will be explained with reference to the flow charts of FIG. 6 to FIG. 8 and the block diagrams of FIG. 25 to FIG. 31.

In the explanation of this specific example also, an array of data is represented as [1, 2, 3, 4]. Each process employs, as the array, a data structure that stores data by inserting new data to the right one by one. For example, it is supposed that data comes at every time, and in case the values as [1, 2, 3, 4] are stored at time 4, entry at right end corresponds to input data at time 4 and one at left end corresponds to input data at time 1. In the data structure mentioned above, like a FIFO or a shift register, values of each entry move to the left as time passes and only four nearest values are held automatically. In FIG. 25 to FIG. 31, the arrays of data are transcribed as mentioned above.

In this specific example, about time series data of a stock price, to change a process of calculating a sum of the four values (referred to as "an old process") to a process of calculating an average of the four values (referred to as "a new process") is considered.

In this specific example, the processes are changed in the following steps.

(1) Write the circuit information to execute the new process in an area different from the area where the circuit information to execute the old process is written.

(2) Start operation of the new process.
(3) Start output of the new process.
(4) Stop operation of the old process.
(5) Delete the circuit information to execute the old process.

In the initial state, only the processing unit 101-1 that executes the old process is in operating on the time series data processing device 100.

It is supposed that input data is an integer. It is supposed that the input data is given at each start time of cycle.

Also, the synchronization unit 131 records, for each process ID, the latest value of the version number of the results data set outputted so far from the synchronization unit 131. This version number is initialized to "0" at the time of start-up.

Here, it is supposed that the timing that the old process becomes being able to be stopped, and by replacing a sequence of the results data of the old process to a sequence of the results data of the new process, output of the sequence of the results data may be started, is given from the processing unit 101-1 of the old process to the control unit 111. However, when the timing is not reached, the control unit 111 sets to the results data of the new process "10" as the process ID and "0" as the version number. Also, the control unit 111 sets to the results data of the old process "10" as the process ID and "1" as the version number. (Step S1099).

At the timing when the processing unit 101-1 outputs the results data, the control unit 111 sends the process ID and the version number as well as the results data to the version comparison unit 121 (Step S1100).

Next, after "1", "2", "3" and "4" are given as the input data at start time of the first, the second, the third and the fourth cycle respectively, the processing unit 101-1 of the old process calculates the sum and outputs the results data. The control unit 111 sends "10" of the ID and the version number "1" to the version comparison unit 121 as well as the results data (Step S1100). The results data, the ID and the version number are represented altogether as <10, 10, 1>.

Figure 25:
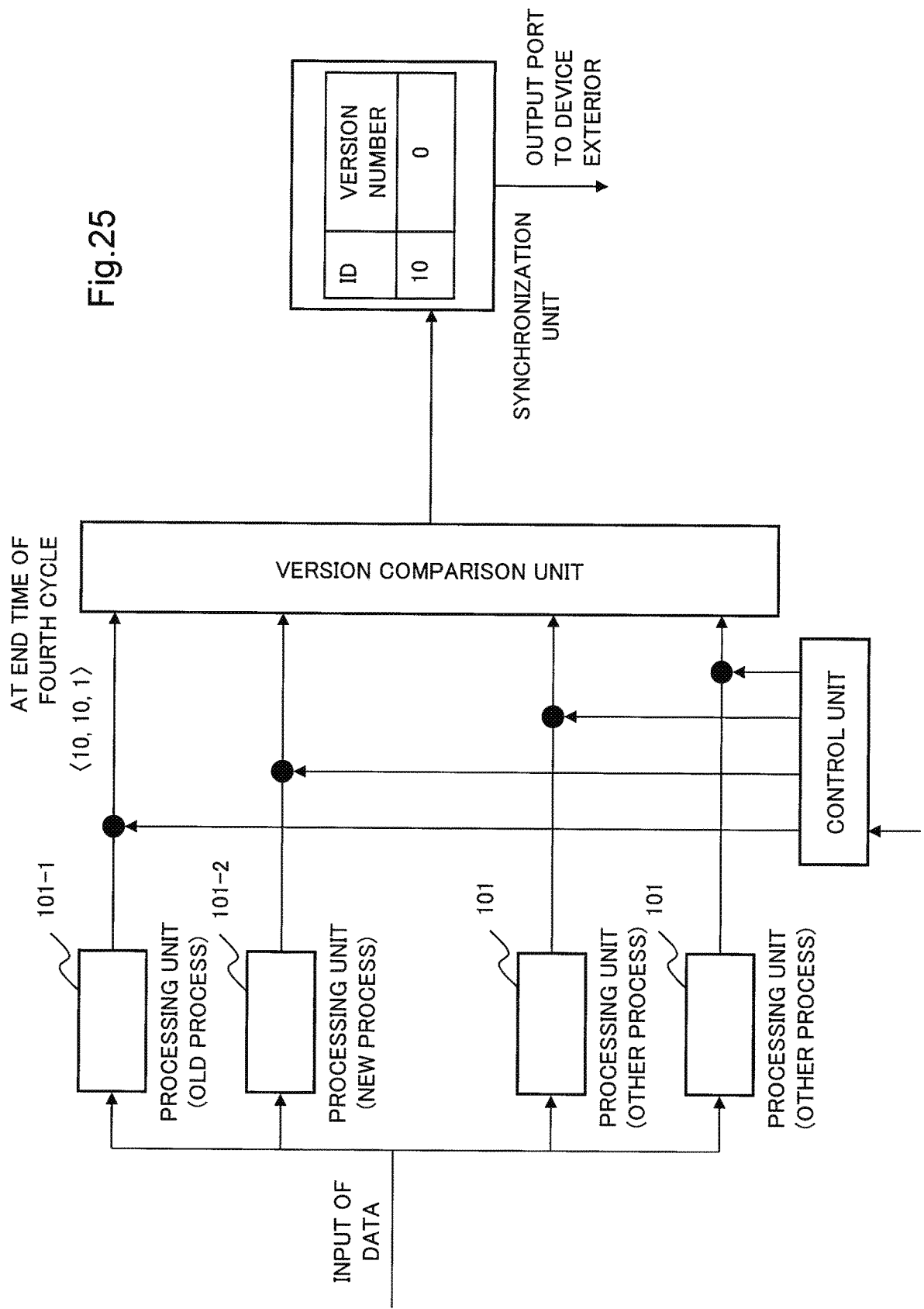
FIG. 25 A figure showing a state of output data of each unit at end time of the fourth cycle in a specific example 3 of operation of an exemplary embodiment of the present invention.

Output information inside the time series data processing device 100 at this point of time is shown in FIG. 25.

At start time of the fifth cycle, the version comparison unit 121 examines whether the results data set has arrived at the input port or the waiting data queue (Step S1101). Since the results data set has arrived, step proceeds to Step S1102. The version comparison unit 121 examines whether the results data set has arrived at the version comparison unit 121 (Step S1102). Since the results data set has arrived at the version comparison unit 121, step proceeds to Step S1103. The version comparison unit 121 examines whether the results data set arrived is only one (S1103). At this time, since the results data set arrived is only one, step proceeds to Step S1104. The version comparison unit 121 sends the arrived data to the synchronization unit 131 (Step S1104).

At start time of the fifth cycle, input data "5" is given to the processing unit 101-1 of the old process that executes the old process and the control unit 111 sends <14, 10, 1> to the version comparison unit 121 (Step S1100). The version comparison unit 121 executes Step S1101, Step S1102, Step S1103 and Step S1104 same as the previous cycle and sends the results data set arrived to the synchronization unit 131.

Figure 26:
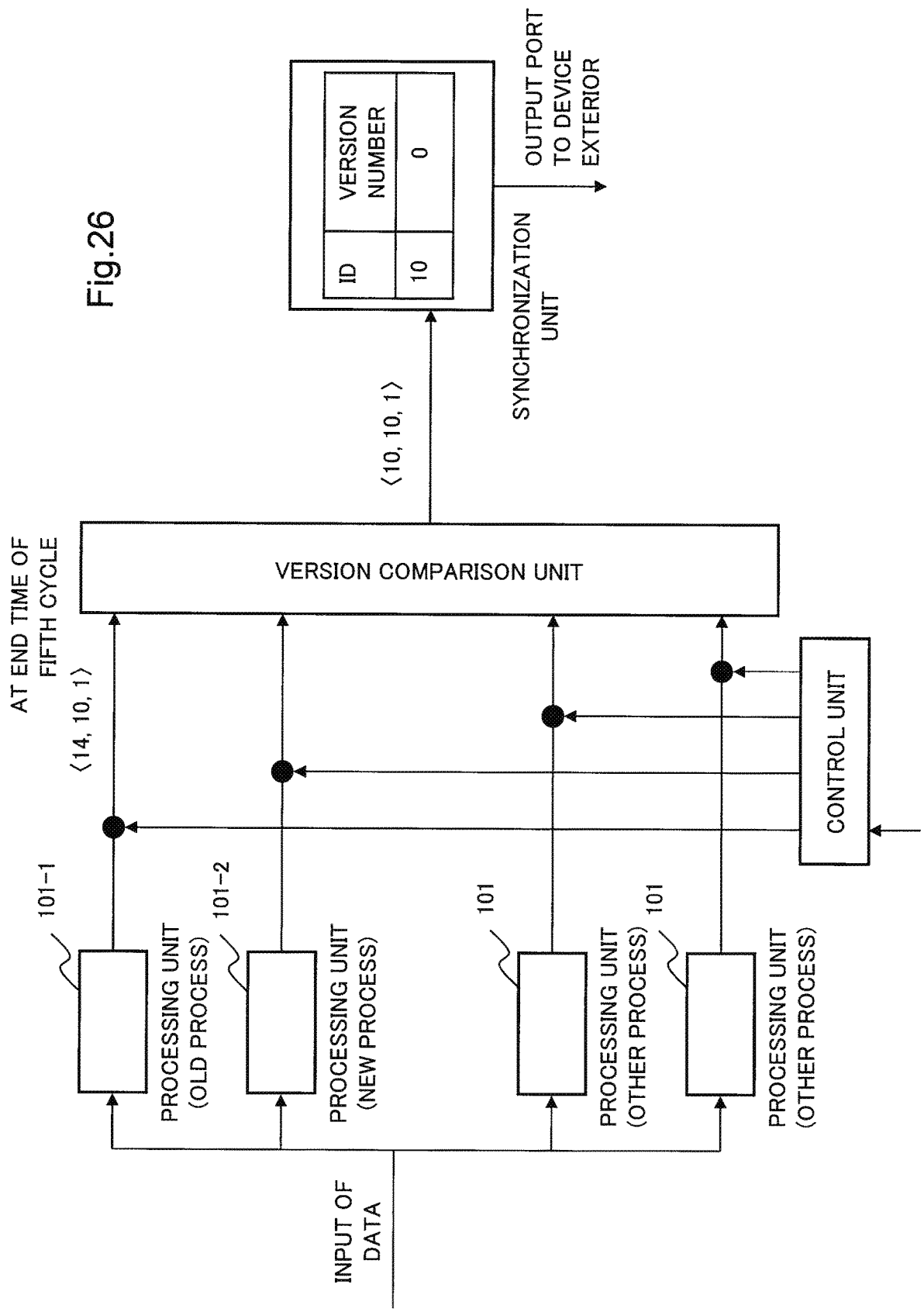
FIG. 26 A figure showing a state of output data of each unit at end time of the fifth cycle in a specific example 3 of operation of an exemplary embodiment of the present invention.

Output information inside the time series data processing device 100 at end time of the fifth cycle is shown in FIG. 26.

At start time of the sixth cycle, input data "7" is given to the processing unit 101-1 of the old process, and the control unit 111 sends <18, 10, 1> to the version comparison unit 121 (Step S1100). At start time of the sixth cycle, the synchronization unit 131 examines whether the version number of the data arrived is older than the version number recorded in the synchronization unit 131 for each process ID (Step S1301). In this case, since the version number 1 of the data arrived is newer than the recorded value 0 by "1", step proceeds to Step S1302. And the version number of the ID "10" recorded in the synchronization unit 131 is updated to the version number of the data arrived, that is, "1" (Step S1302). And the data arrived is transmitted to the output port to device exterior (Step S1303).

Figure 27:
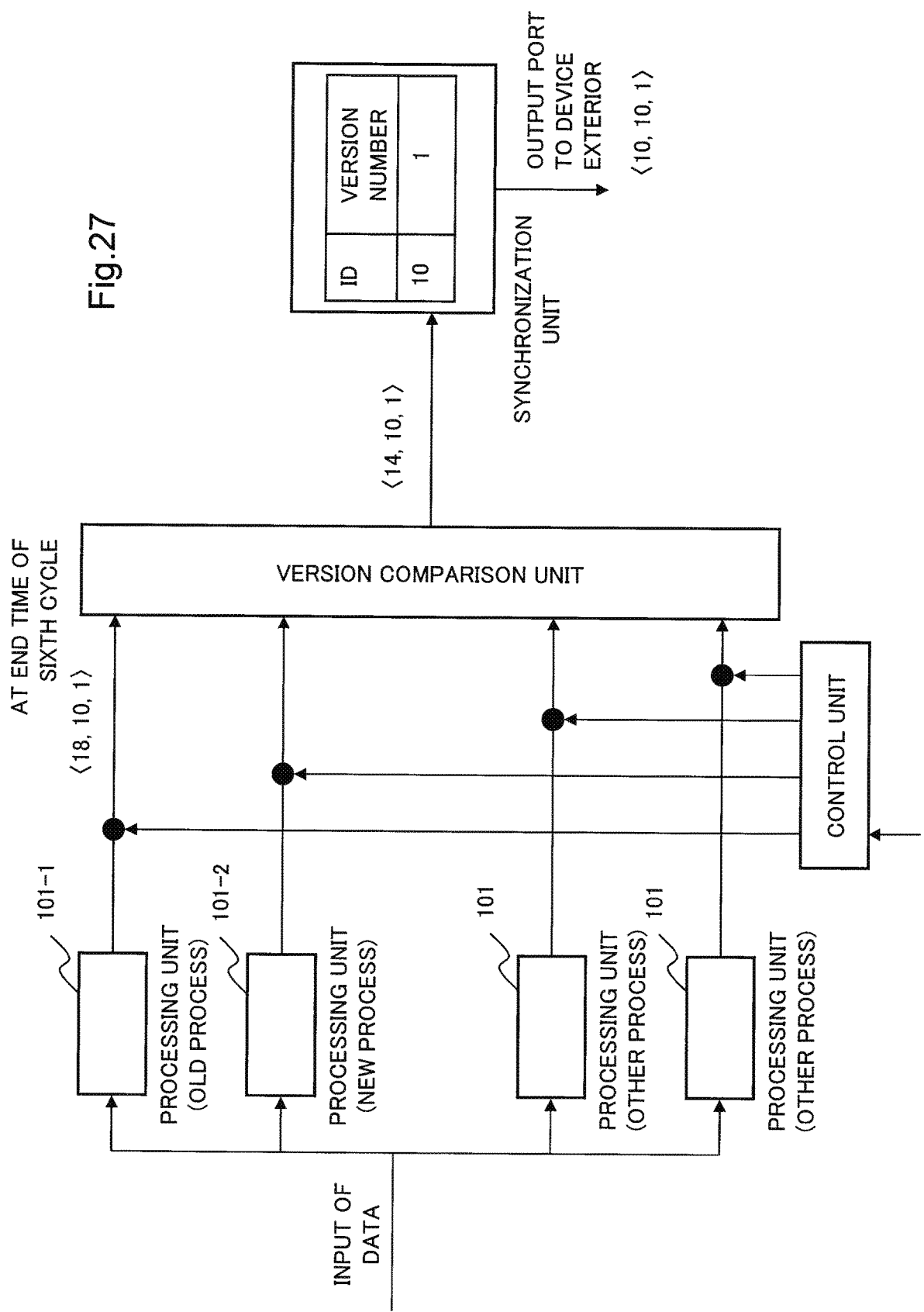
FIG. 27 A figure showing a state of output data of each unit at end time of the sixth cycle in a specific example 3 of operation of an exemplary embodiment of the present invention.

Output information inside the time series data processing device 100 at end time of the sixth cycle will be in the state as shown in FIG. 27.

It is supposed that writing of the circuit information to execute the new process has been completed during the sixth cycle. Further, it is supposed that the new process has started the process from start time of the seventh cycle. Here, note that, in order to still use the results of the old process, the control unit 121 has set to the results data set of the new process, as the ID, "10" same as the old process ID, and as the version number, "0" that is older than the version number of the old process by "1".

At start time of the seventh cycle, input data "7" is given to the processing unit 101-1 of the old process, and the control unit 111 sends <22, 10, 1> to the version comparison unit 121. Also, at the same timing, the input data 7 is also given to the processing unit 101-2 of the new process, and the control unit 111 outputs the results data set <5, 10, 0> (Step S1100).

Figure 28:
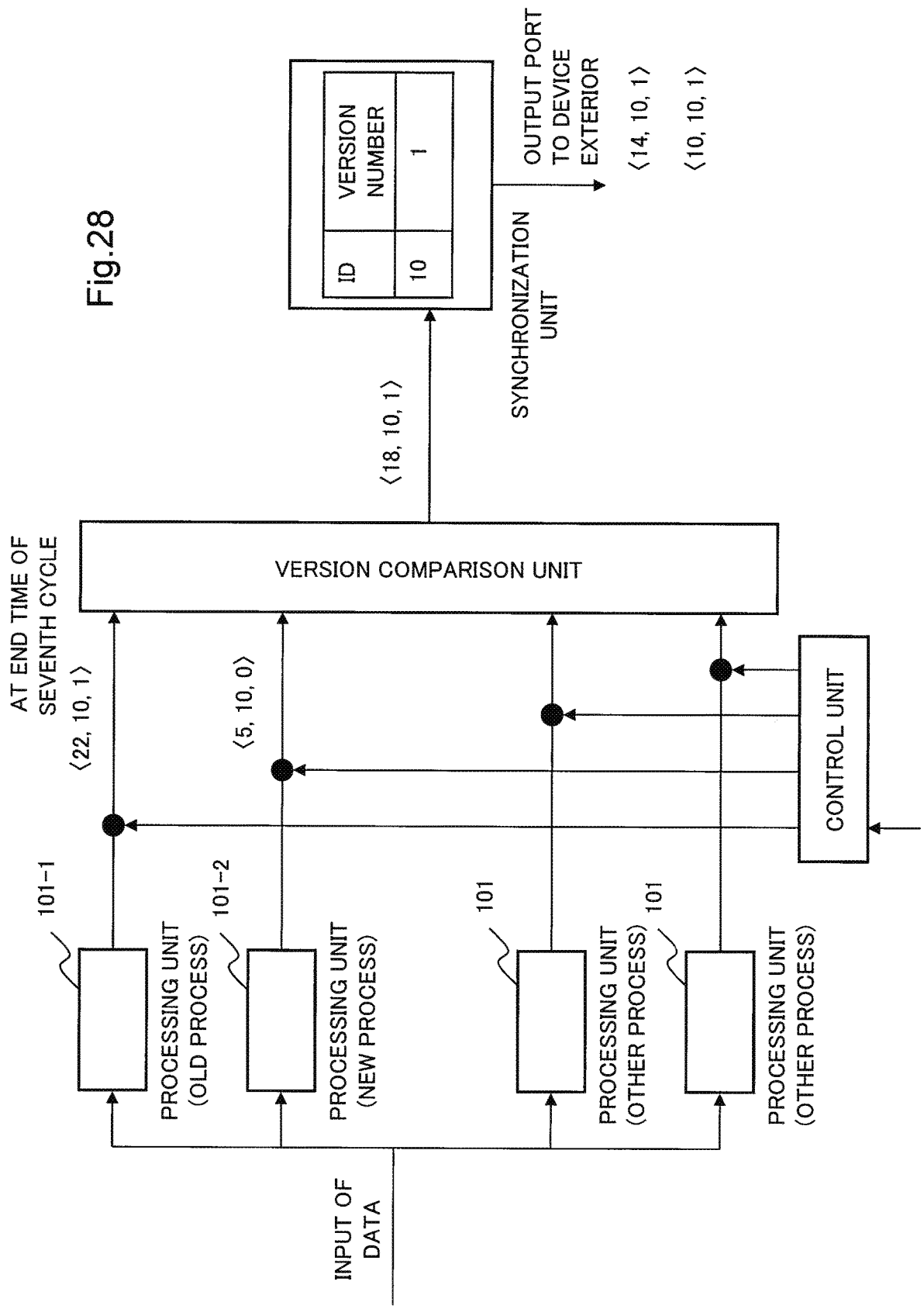
FIG. 28 A figure showing a state of output data of each unit at end time of the seventh cycle in a specific example 3 of operation of an exemplary embodiment of the present invention.

Output information inside the time series data processing device 100 at end time of the seventh cycle is shown in FIG. 28.

At start time of the eighth cycle, input data "9" is given to the processing unit 101-1 of the old process, and the control unit 111 sends <26, 10, 1> to the version comparison unit 121. Also, at the same timing, the input data "8" is also given to the processing unit 101-2 of the new process, and the control unit 111 outputs the results data set <6, 10, 0> (Step S1100). At start time of the eighth cycle, the version comparison unit 121 detects that the results data sets have arrived (Step S1101, Step S1102 and Step S1103). Since the results data sets arrived are two, step proceeds to Step S1201. The process IDs of the two results data sets arrived are detected to be identical (Step S1201), and the one of which the ID coincides and the version number is older by "1" is discarded (Step S1202). That is, the results data set of the new process is discarded. And step returns to Step S1201. Since one among the two results data sets arrived was discarded, and since there remains no results data set of which the process ID is identical, step proceeds to Step S1203 (Step S1201). And for the remaining results data set, arbitration of allocation of the output port of the version comparison unit 121 is carried out. Since the remaining results data set is one, the output port of the version comparison unit 121 is allocated to the results data set. And this results data set is sent to the synchronization unit 131 (Step S1203). That is, in the version comparison unit 121, <5, 10, 0> is discarded and <22, 10, 1> is outputted. By this operation, although the results data set of the old process and the results data set of the new process are both obtained, the results data set of the old process is outputted to the output port to device exterior.

Figure 29:
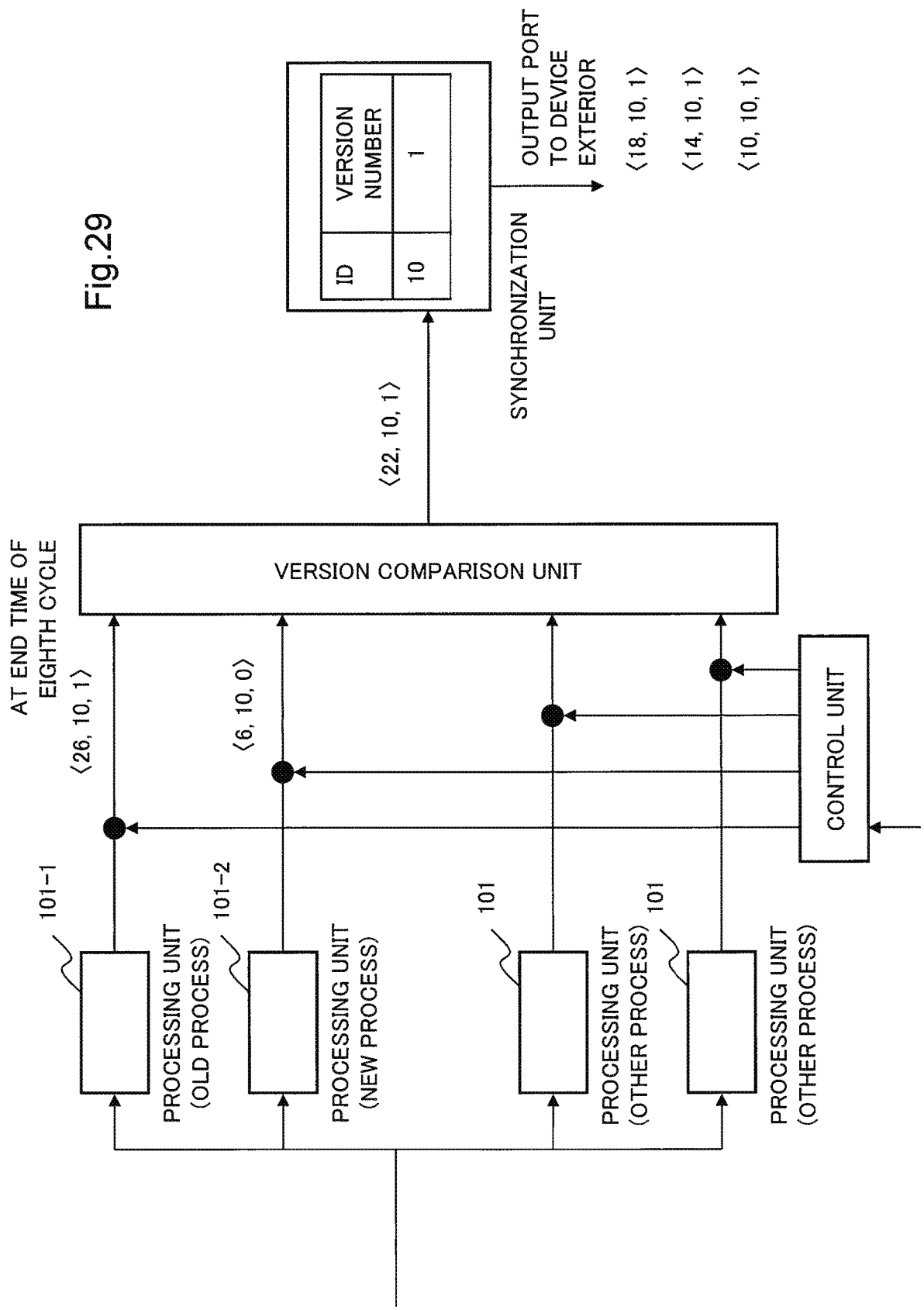
FIG. 29 A figure showing a state of output data of each unit at end time of the eighth cycle in a specific example 3 of operation of an exemplary embodiment of the present invention.

Output information inside the time series data processing device 100 at end time of the eighth cycle is shown in FIG. 29.

At start time of the ninth cycle, the old process becomes being able to be stopped, and the instruction to make the results data outputted after this time from the time series data processing device 100 to device exterior, to the results data of the processing unit 101-2 of the new process, will be issued from the processing unit 101-1 of the old process to the control unit 111. At this time, the version number of the results data of the new process is set to "2" that is newer than the version number 1 of the data of the old process by "1" (Step S1099).

At start time of the ninth cycle, input data "9" is given to the processing unit 101-1 of the old process, and the control unit 111 sends <30, 10, 1> to the version comparison unit 121. Also, at the same timing, the input data "9" is also given to the processing unit 101-2 of the new process, and the control unit 111 sends the results data set <7, 10, 2> to the version comparison unit 121 (Step S1100). The version comparison unit 121, same as the eighth cycle, discards <6, 10, 0> and sends <26, 10, 1> to the synchronization unit 131.

Figure 30:
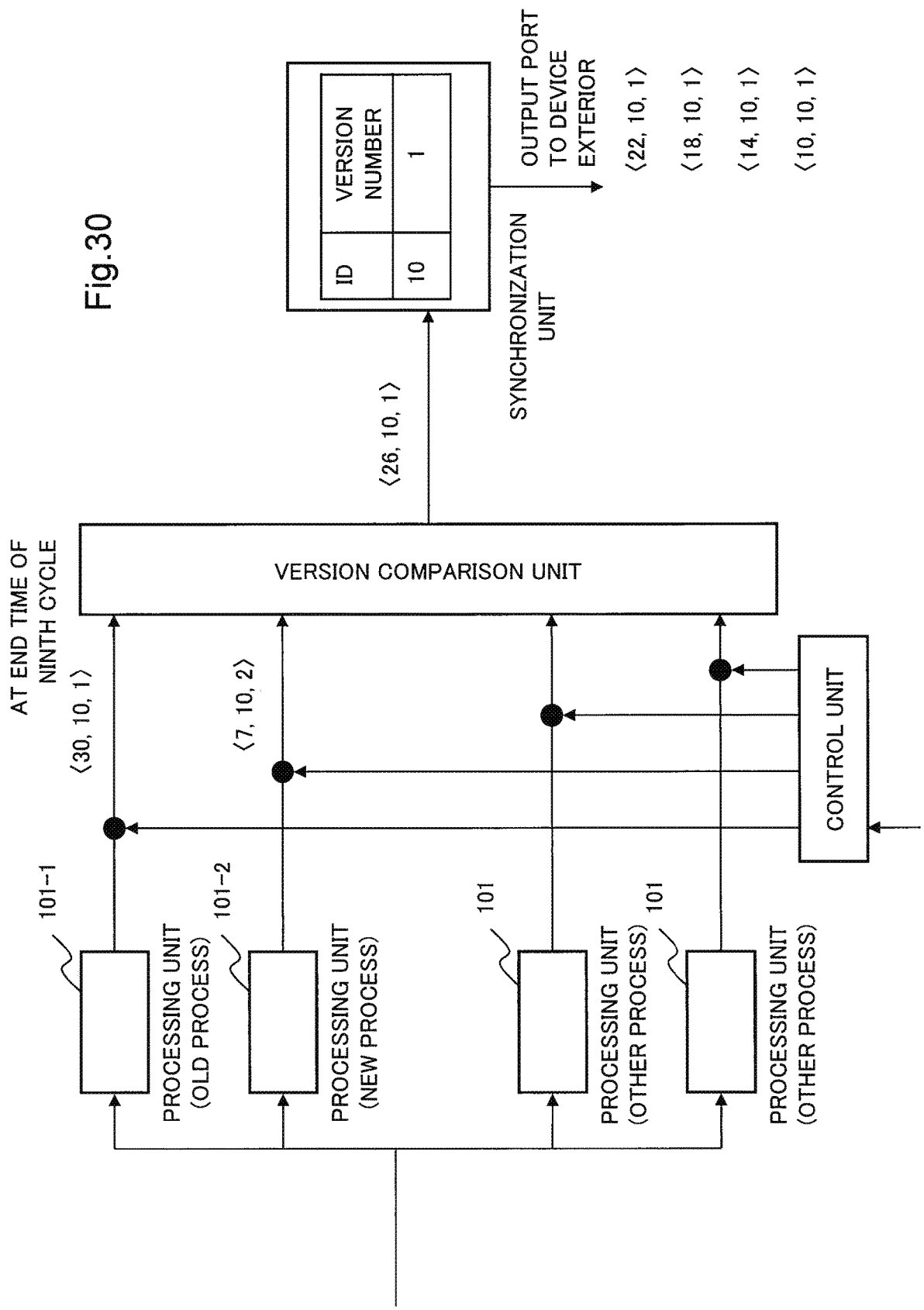
FIG. 30 A figure showing a state of output data of each unit at end time of the ninth cycle in a specific example 3 of operation of an exemplary embodiment of the present invention.

Output information inside the time series data processing device 100 at end time of the ninth cycle is shown in FIG. 30.

At start time of the tenth cycle, input data "10" is given to the processing unit 101-1 of the old process, and the control unit 111 sends <34, 10, 1> to the version comparison unit 121. Also, at the same timing, the input data "9" is also given to the processing unit 101-2 of the new process, and the control unit 111 outputs the results data set <8, 10, 2> (Step S1100).

At start time of the tenth cycle, the version comparison unit 121 detects that the results data sets have arrived (Step S1101, Step S1102 and Step S1103). Since the results data sets arrived are two, step proceeds to Step S1201. The process IDs of the two results data sets arrived are detected to be identical (Step S1201), and the results data set of which the ID coincides and the version number is older by "1 is discarded (Step S1202). That is, the results data set of the old process is discarded. And step returns to Step S1201. Since one among the two results data sets arrived is discarded, and since there remains no results data set of which the process ID is identical, step proceeds to Step S1203 (Step S1201). And for the remaining results data set, arbitration of allocation of the output port of the version comparison unit 121 is carried out. Since the remaining results data set is one, the output port of the version comparison unit 121 is allocated to the results data set. And this results data set is sent to the synchronization unit 131 (Step S1203). That is, in the version comparison unit 121, <30, 10, 1> is discarded and <7, 10, 2> is outputted. By this operation, the result of the old process is not outputted to device exterior any more, and the result of the new process is outputted instead.

Figure 31:
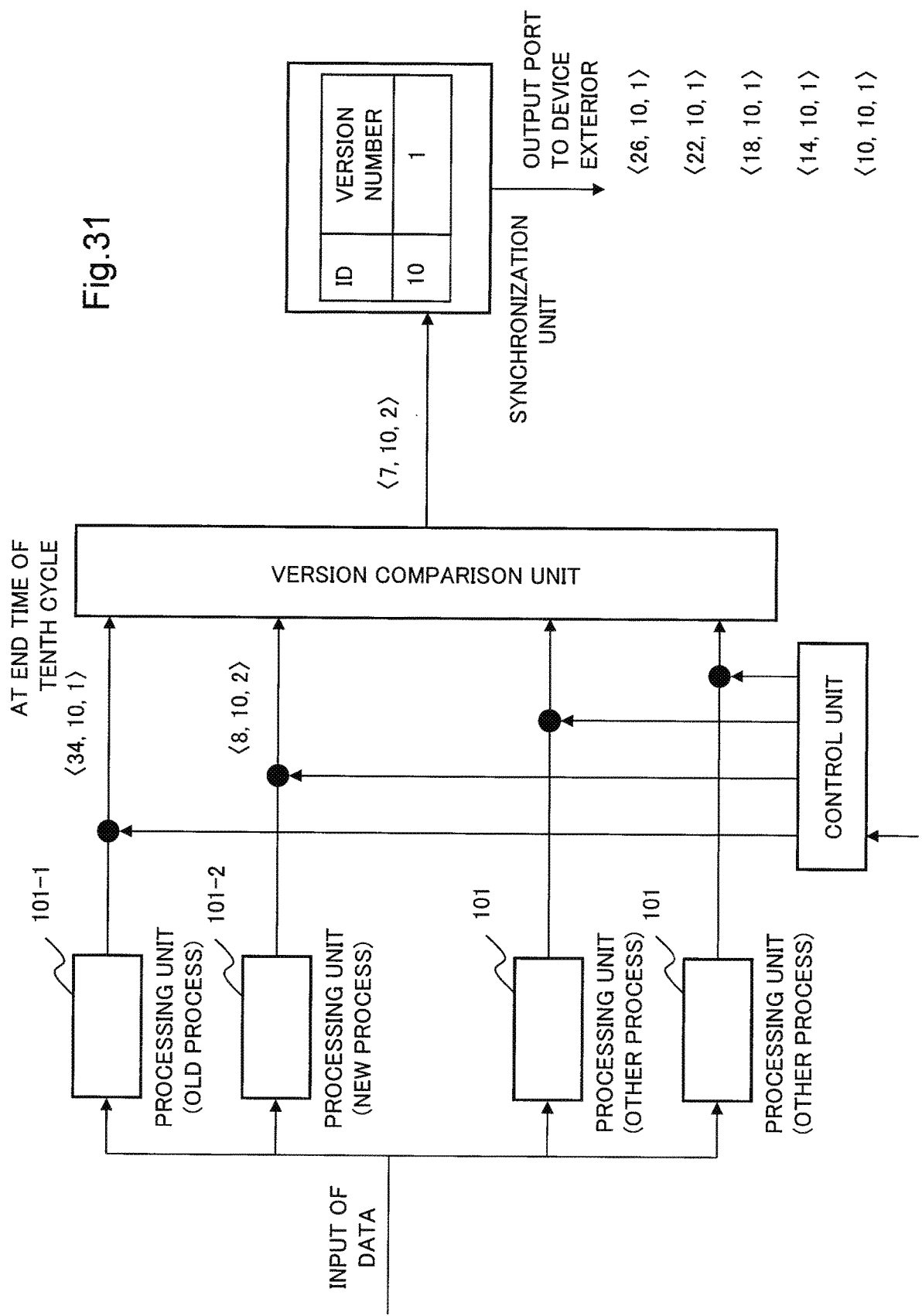
FIG. 31 A figure showing a state of output data of each unit at end time of the tenth cycle in a specific example 3 of operation of an exemplary embodiment of the present invention.
Figure 33:
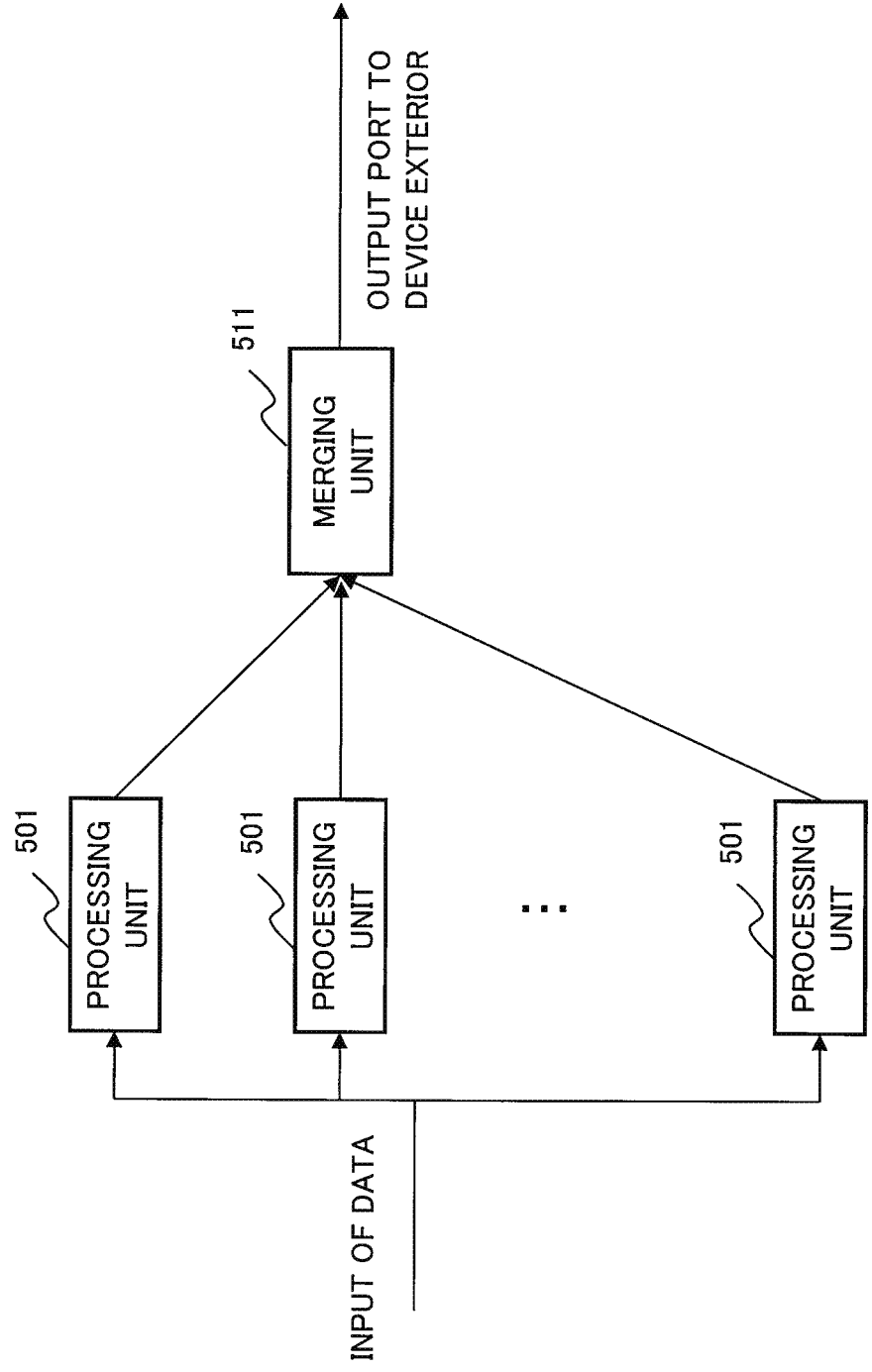
FIG. 33 A block diagram showing a structure of the time series data processing device of NPL 1.
Figure 34:
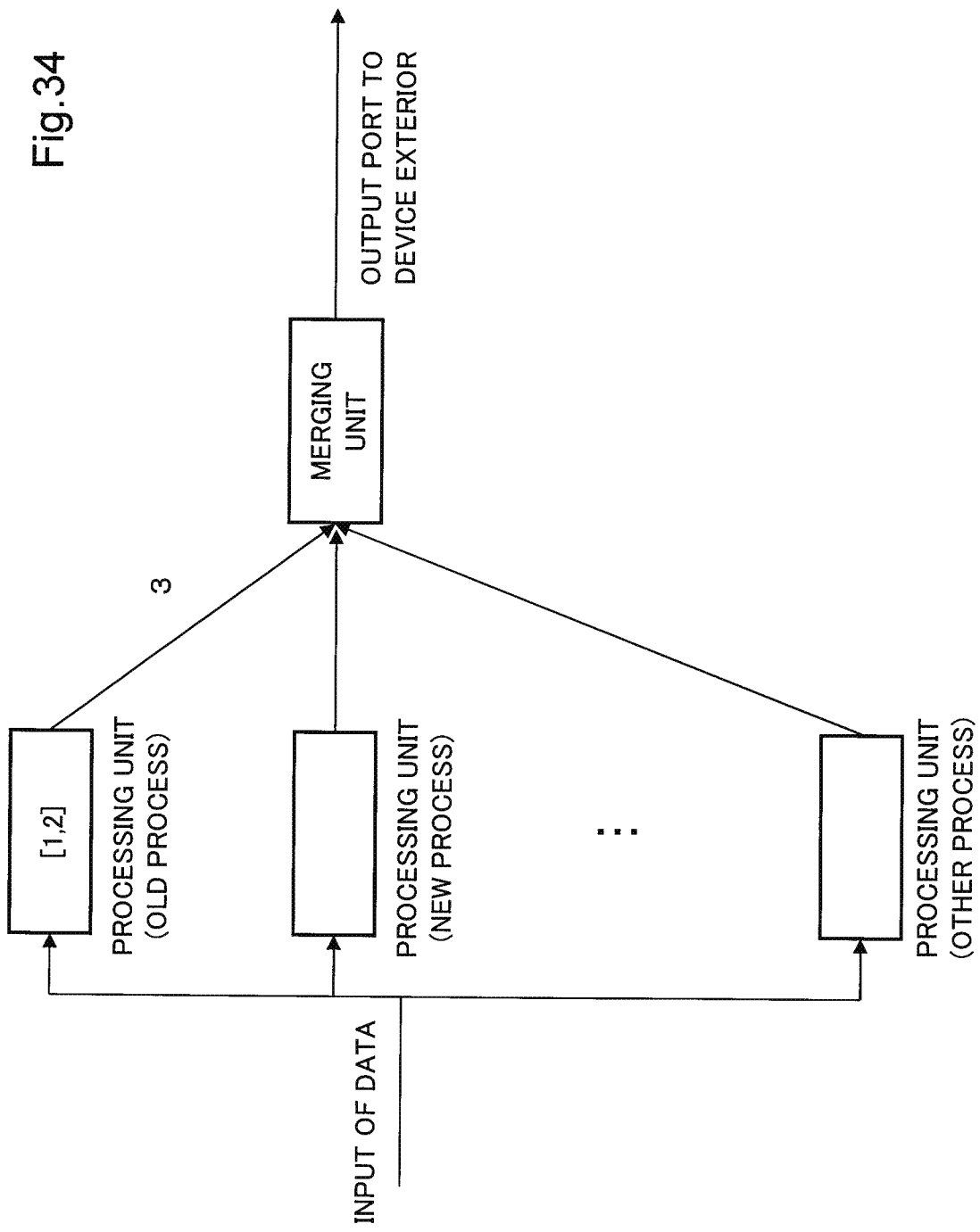
FIG. 34 A figure showing a state of output data of each unit at end time of the second cycle by the first method of the time series data processing device of NPL 1.
Figure 35:
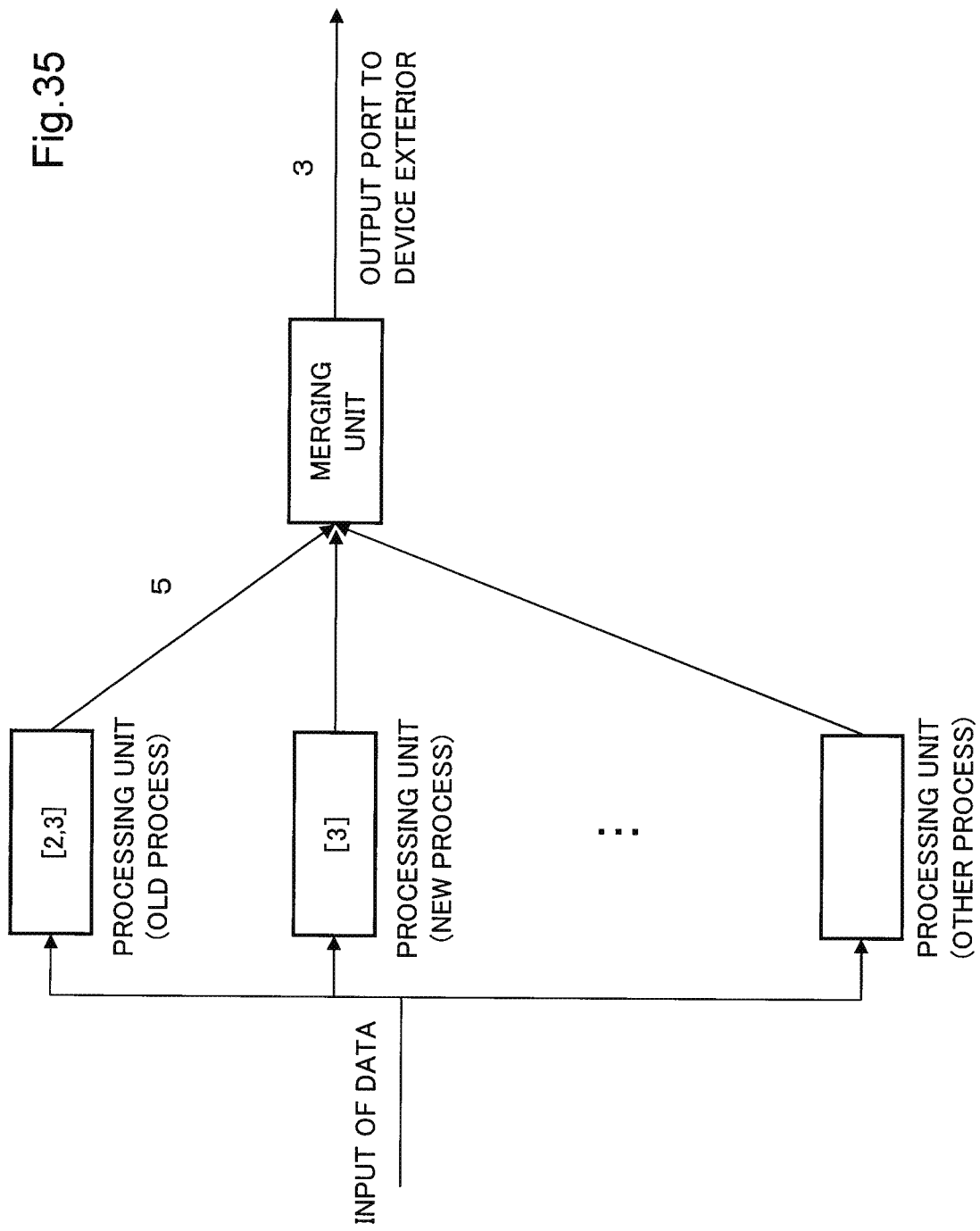
FIG. 35 A figure showing a state of output data of each unit at end time of the third cycle by the first method of the time series data processing device of NPL 1.
Figure 36:
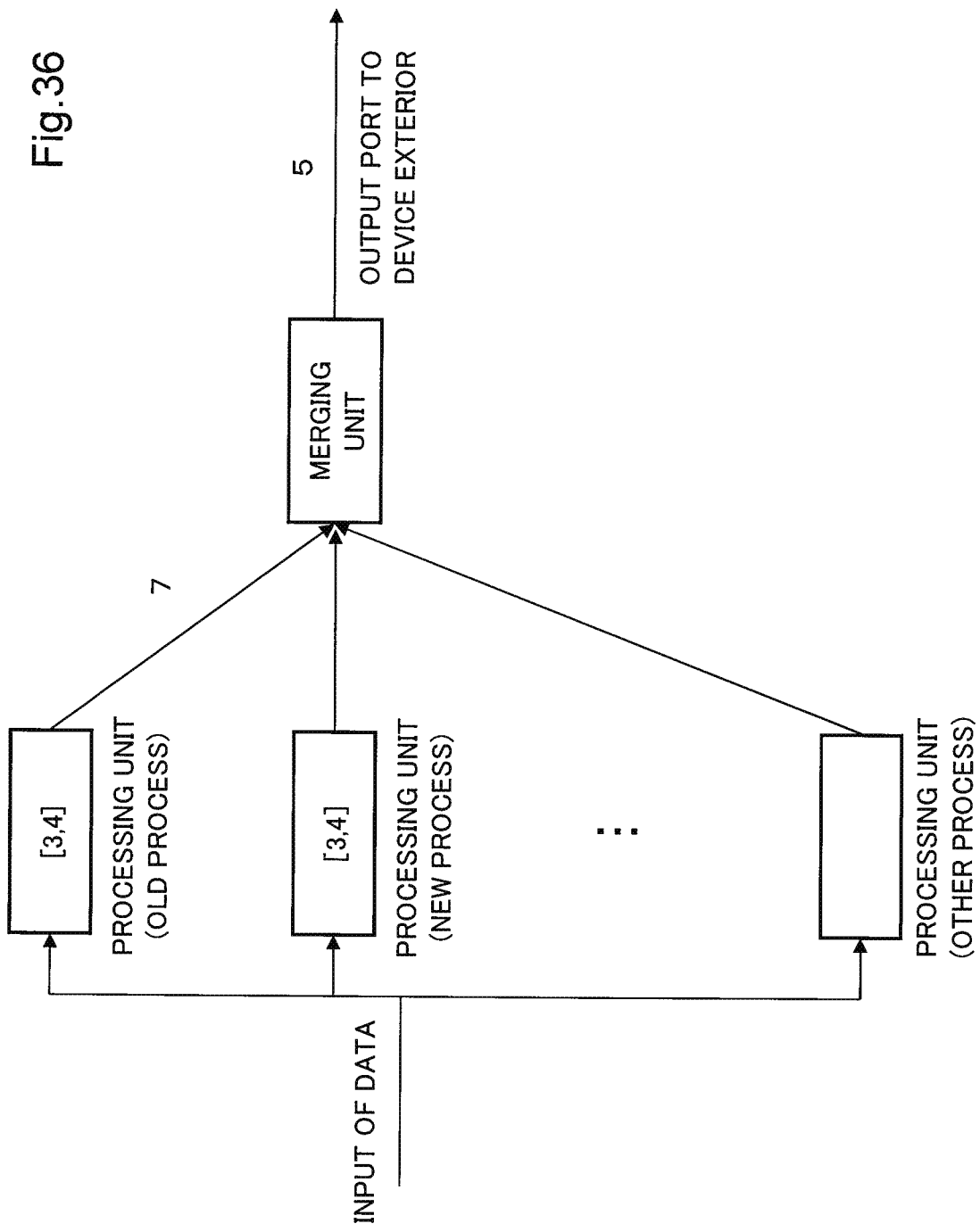
FIG. 36 A figure showing a state of output data of each unit at end time of the fourth cycle by the first method of the time series data processing device of NPL 1.
Figure 37:
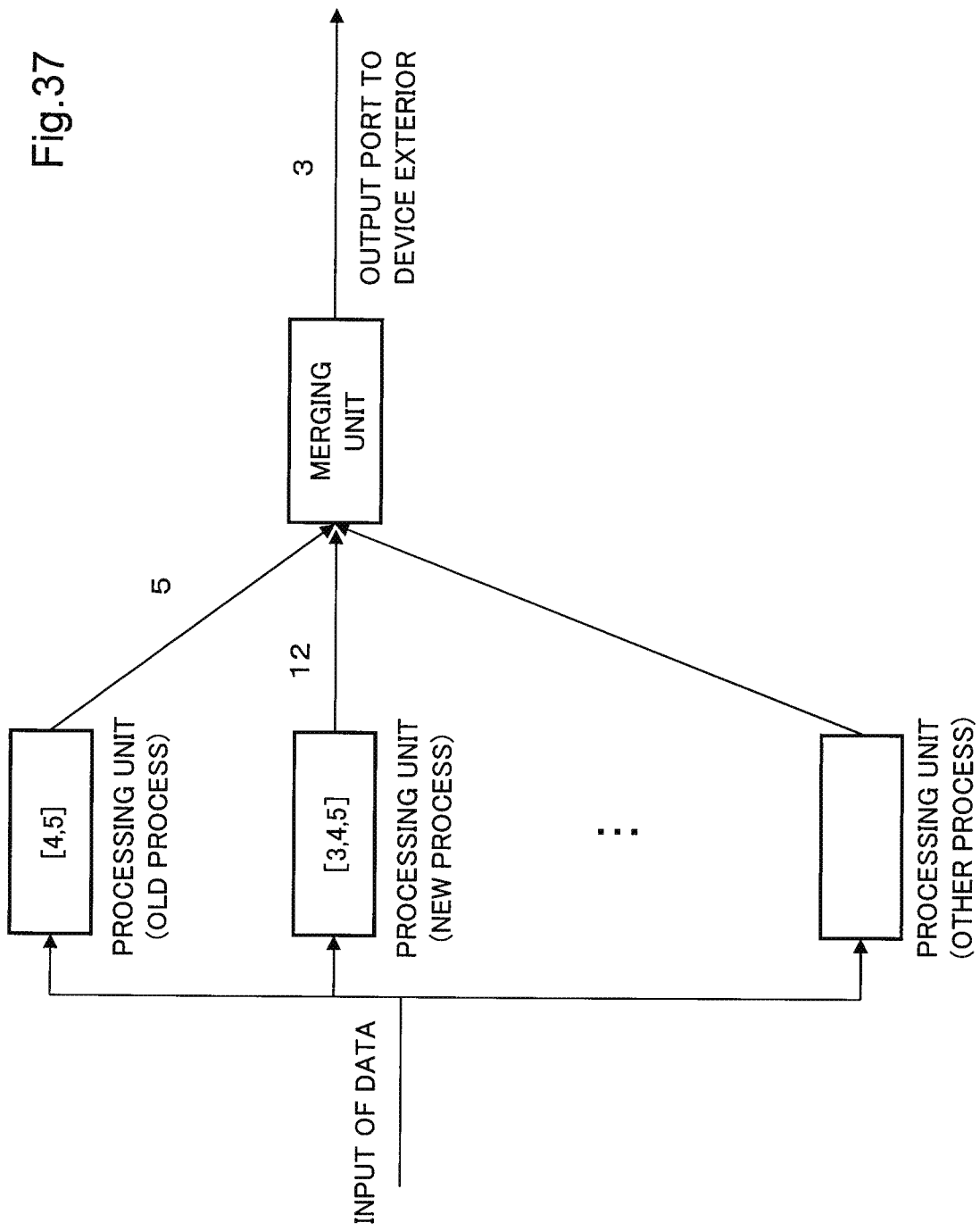
FIG. 37 A figure showing a state of output data of each unit at end time of the fifth cycle by the first method of the time series data processing device of NPL 1.
Figure 38:
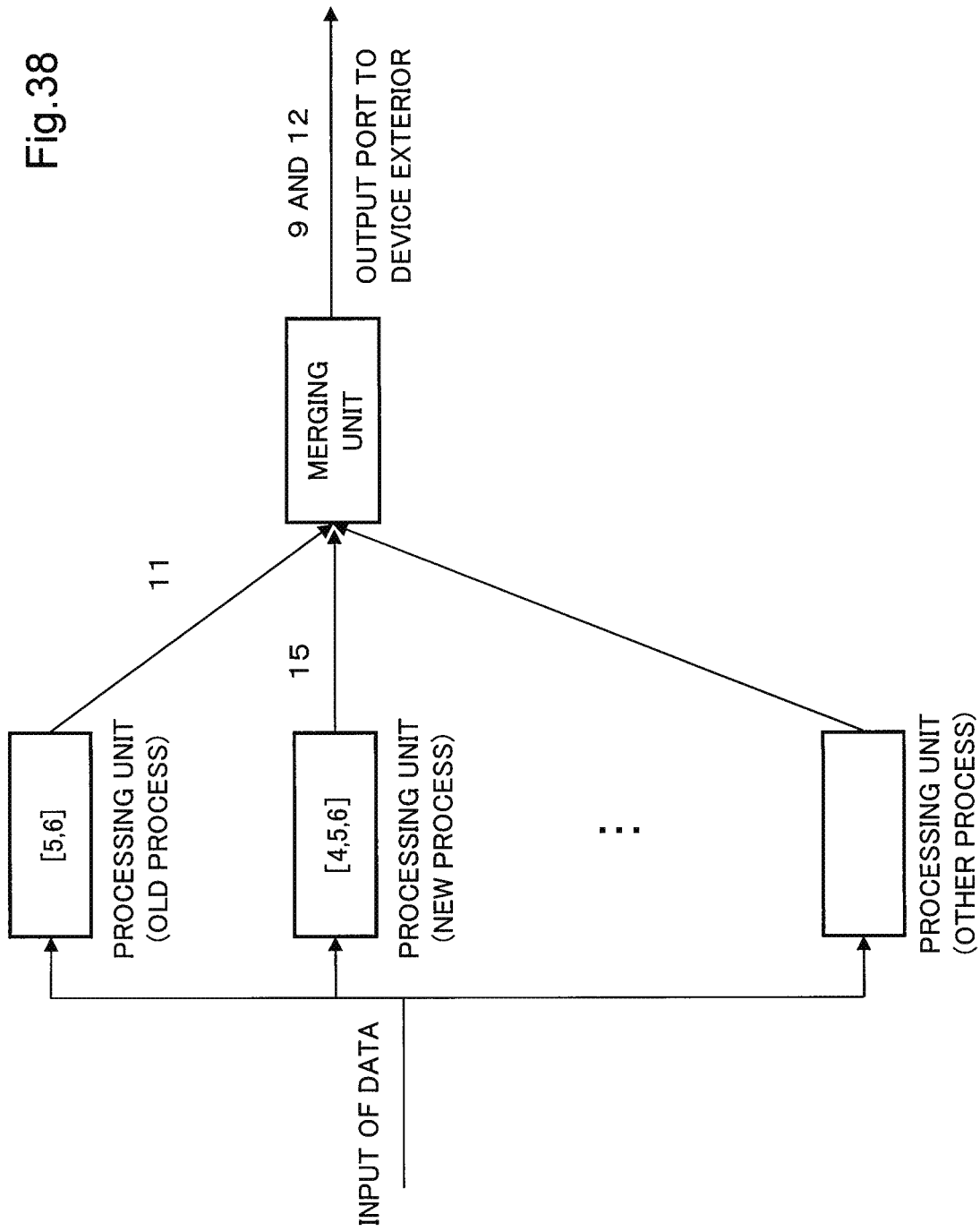
FIG. 38 A figure showing a state of output data of each unit at end time of the sixth cycle by the first method of the time series data processing device of NPL 1.
Figure 39:
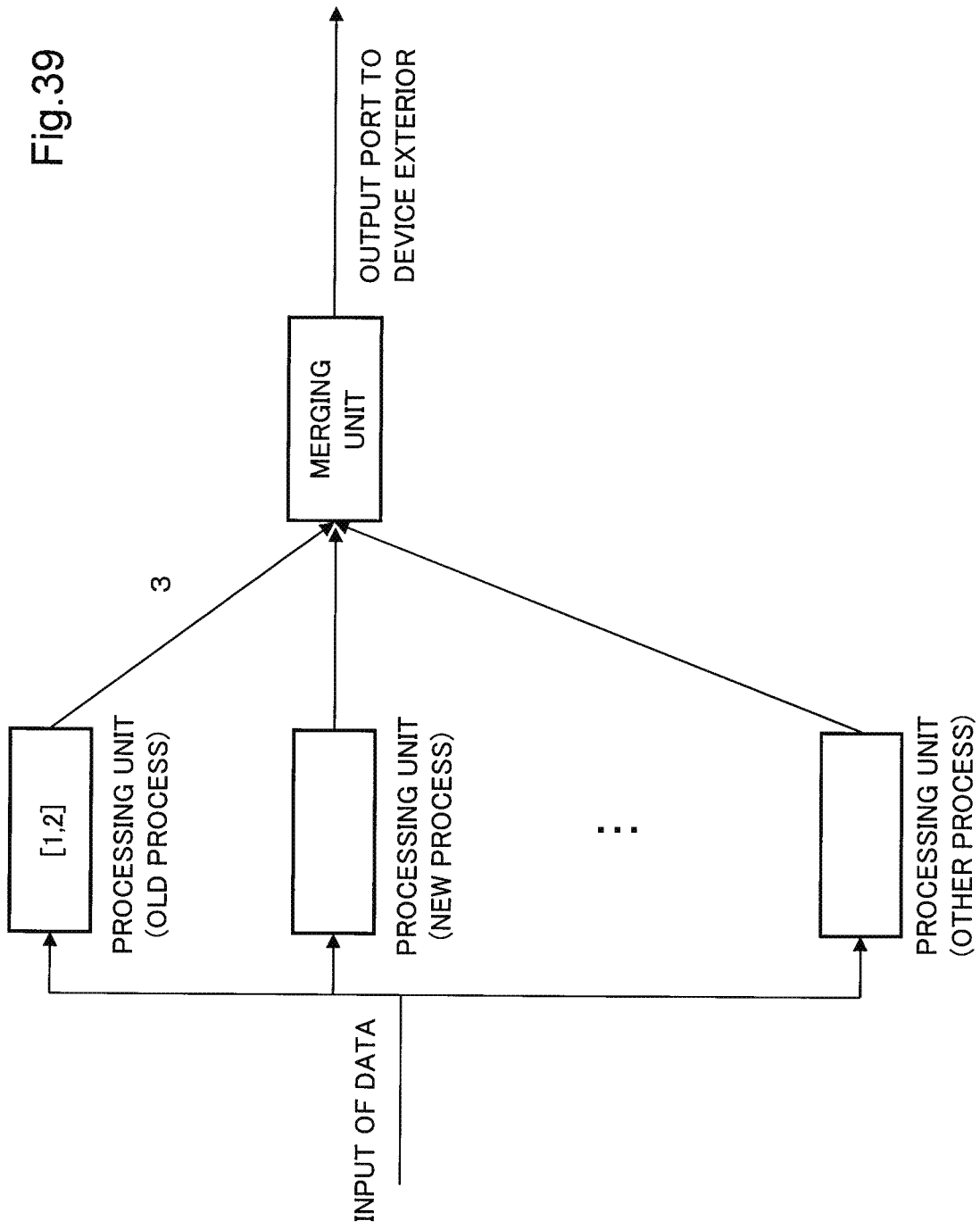
FIG. 39 A figure showing a state of output data of each unit at end time of the second cycle by the second method of the time series data processing device of NPL 1.
Figure 40:
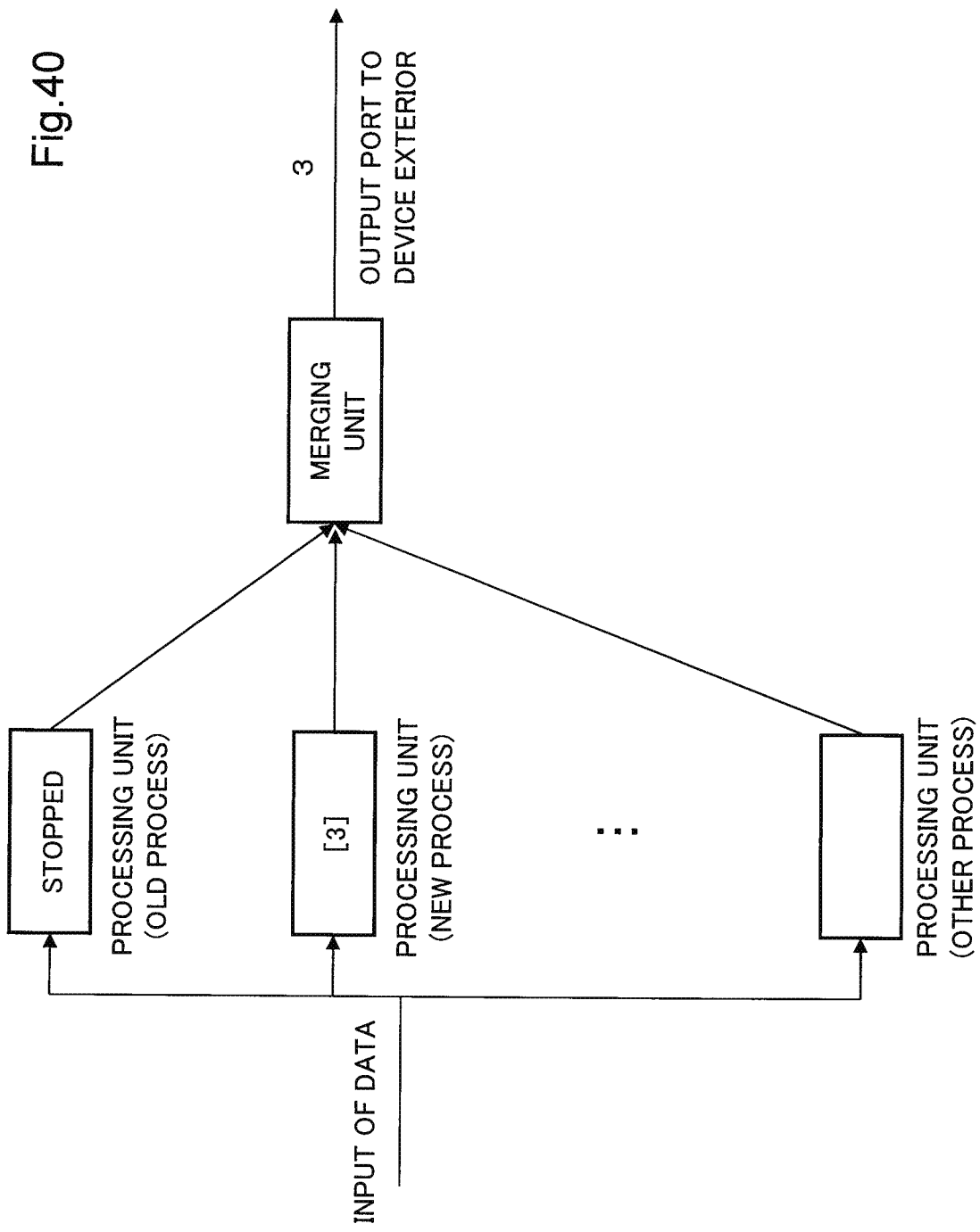
FIG. 40 A figure showing a state of output data of each unit at end time of the third cycle by the second method of the time series data processing device of NPL 1.
Figure 41:
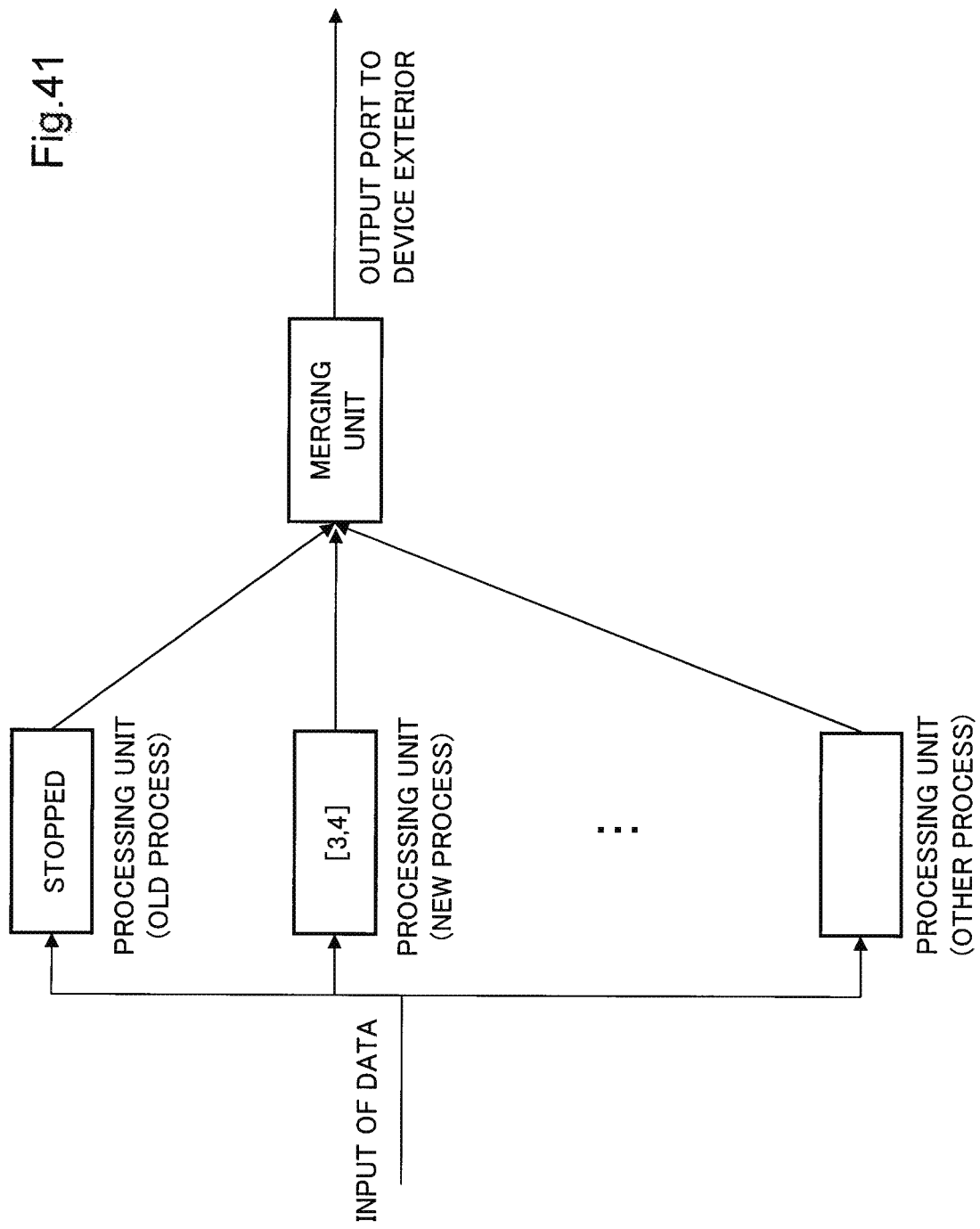
FIG. 41 A figure showing a state of output data of each unit at end time of the fourth cycle by the second method of the time series data processing device of NPL 1.
Figure 42:
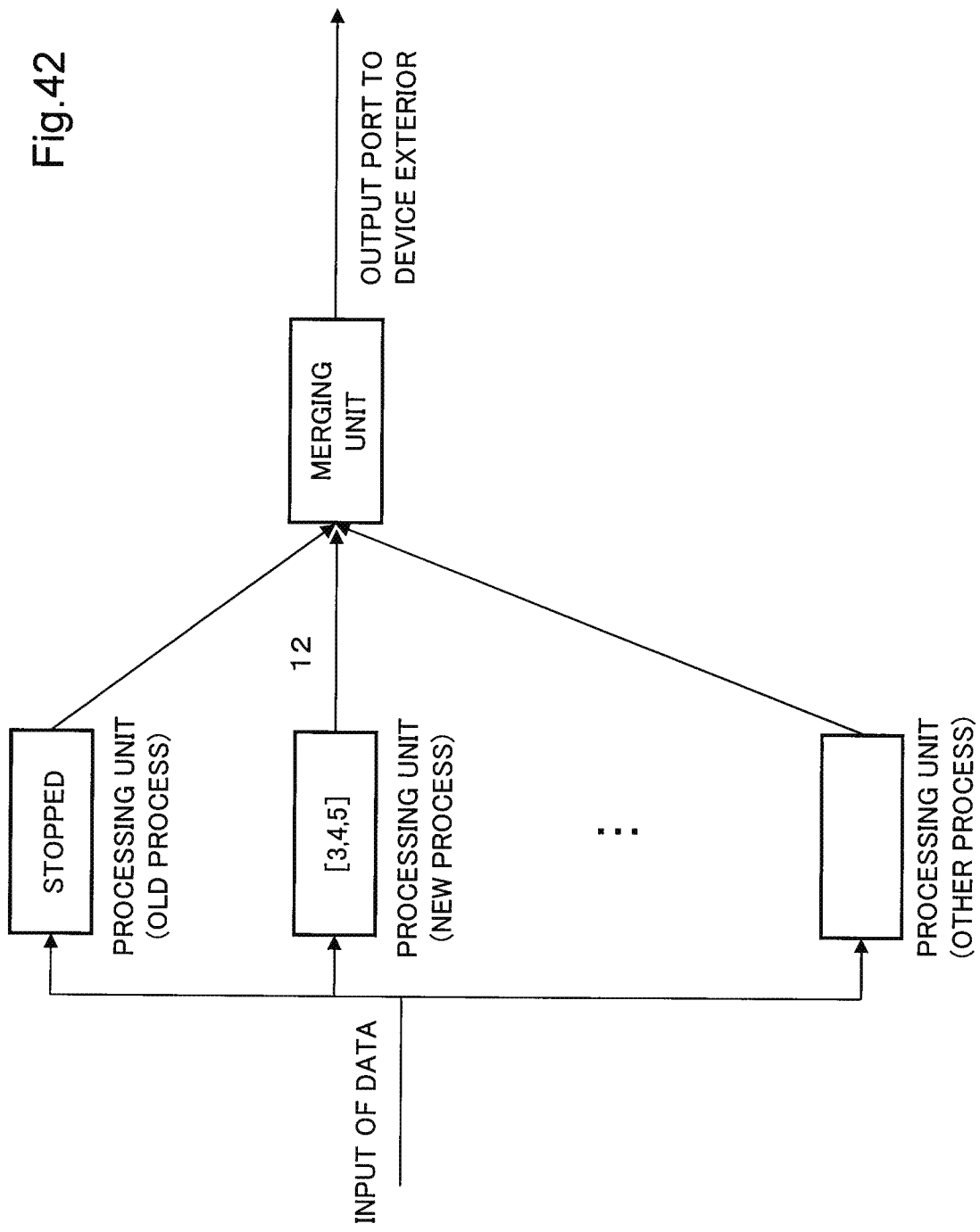
FIG. 42 A figure showing a state of output data of each unit at end time of the fifth cycle by the second method of the time series data processing device of NPL 1.

Output information inside the time series data processing device 100 at end time of the tenth cycle is shown in FIG. 31.

Hereafter, the time series data processing device 100 operates same as the specific example of operation of the exemplary embodiment 1, and continues to output the results data of the new process.

When a sequence of the output to device exterior at end time of the eleventh cycle is represented in younger order of time, it will be <10, 10, 1>, <14, 10, 1>, <18, 10, 1>, <22, 10, 1>, <26, 10, 1> and <7, 10, 2>. Seen from this, after changing of the processes is started, until the time when the old process becomes being able to be stopped, the results outputted from the processing unit 101-1 of the old process are outputted to device exterior without being discarded. And at the time after the time when the old process becomes being able to be stopped, the results outputted from the processing unit 101-1 of the old process are discarded, and the results outputted from the processing unit 101-2 of the new process are outputted to device exterior instead.

As mentioned above, according to the time series data processing of this exemplary embodiment, when the instruction to change process is received, whether the old process is in the state that can be stopped is determined. And when the old process is determined to be in the state that it can be stopped, the identification information that identifies the difference of the process is appended to the results data. Accordingly, when the instruction to change process is received, there are no cases that the results of both of the old process and the new process are outputted to device exterior being mixed.

Further, in the time series data processing of this exemplary embodiment, the results data of the old process is outputted until when the old process is determined to be in the state that can be stopped. Since the results data of the old process before and after the instruction to change process can be outputted to the outside, the results of the old process can be used effectively.

INDUSTRIAL APPLICABILITY

As an example of utilization of the present invention, in an application that calculates an average of numerical values, there is a case when a target period of time during which the average is calculated may be changed. For example, an application that makes values of temperature sensors positioned distributed in a wide range as input data, calculates an average over a certain period of time, and detects an emergency situation including a fire can be mentioned. In this example, the function that, when temperature change has become intense, in order to raise speed that follows the temperature change, reduces a length of the target period of time to calculate the average of the temperature can be realized.

Also, as another example of utilization of the present invention, there is an application that changes parameters used for a certain calculation or output information. For example, consider an application that calculates an index to decide timing to purchase or sell financial products such as a stock. First, depending on a brand of financial products to be purchased or sold and a strategy to purchase or sell, there exists a plurality of indices that is necessary, and sets (collection of elements) of the index that should be outputted are different. A certain device can calculate only a finite number of indices simultaneously. Depending on time, the brand to be purchased or sold and the strategy change. Therefore, the function that, depending on the brand to be purchased or sold at that time and on the strategy, changes the calculated index can be realized.

The time series data processing device of this exemplary embodiment can also be realized by software. The flow charts of the program that control the time series data processing device are same as from FIG. 6 to FIG. 8. That is, the processes that the control unit 111, the version comparison unit 121 and the synchronization unit 131 carry out may be realized by a processor (not illustrated) being equipped in the time series data processing device executing the program.

The program mentioned above may also be stored in a semiconductor memory device such as ROM (Read Only Memory), RAM (Random Access Memory) and a flash memory and a non-transitory medium such as an optical disc, a magnetic disk and a magneto-laser disk.

Although the present invention has been explained with reference to exemplary embodiments as above, the present invention is not limited to the exemplary embodiments mentioned above. Various changes which a person skilled in the art can understand within the scope of the present invention can be performed in the composition of the present invention and details.

This application claims priority based on Japanese Patent Application No. 2012-060862 filed on Mar. 16, 2012 and the disclosure thereof is incorporated herein in its entirety.

REFERENCE SIGNS LIST

100 Time series data processing device
101, 101-1, 101-2 Processing unit
111 Control unit
121 Version comparison unit
131 Synchronization unit
1001 Partial version comparison unit
1002 Waiting data queue
1003 Arbitration unit
500 Time series data processing device
501 Processing unit
511 Merging unit

The invention claimed is:

1. A time series data processing device, comprising:
a first processing unit that executes a first process and outputs first results data;
a second processing unit that executes a second process and outputs second results data;
a control unit that, when an instruction to change a process is received from outside, determines whether said first process can be stopped, generates a first results data set by appending first identification information corresponding to contents of said first process to said first results data, and generates a second results data set by appending second identification information corresponding to contents of said second process to said second results data;
a selection unit that, when said first results data set and said second results data set have arrived simultaneously, selects either of said first results data set or said second results data set as a third results data set on the basis of a first comparison result of said first identification information and said second identification information; and
a synchronization unit that, on the basis of a second comparison result of third identification information included in said third results data and prerecorded fourth identification information, outputs or discards third results data included in said third results data set.

2. The time series data processing device according to claim 1, wherein
said control unit determines whether said first process can be stopped on the basis of a process status of said first processing unit or an output status of said first results data by said first processing unit.

3. The time series data processing device according to claim 2, wherein,
when outputting said third results data, said synchronization unit updates said fourth identification information to said third identification information.

4. The time series data processing device according to claim 3, wherein
before said first process results in a state that said first process can be stopped, said control unit appends as said second identifier a same value as said first identifier and appends as said second version number a version number older than said first version number; and
when said first process results in the state that said first process can be stopped, said control unit appends as said second identifier the same value as said first identifier and appends as said second version number the version number newer than said first version number.

5. The time series data processing device according to claim 2, wherein
said first identification information comprises:
a first identifier that shows the contents of said first process and a first version number that shows a change history of said first process;
said second identification information comprises:
a second identifier that shows the contents of said second process and a second version number that shows a change history of said second process; and
said selection unit, when said first results data set and said second results data set have arrived simultaneously, said first identifier and said second identifier are equal, and said second version number is newer than said first version number, selects said second results data as said third results data set and discards said first results data set.

6. The time series data processing device according to claim 5, wherein
before said first process results in a state that said first process can be stopped, said control unit appends as said second identifier a same value as said first identifier and appends as said second version number a version number older than said first version number; and
when said first process results in the state that said first process can be stopped, said control unit appends as said second identifier the same value as said first identifier and appends as said second version number the version number newer than said first version number.

7. The time series data processing device according to claim 1, wherein,
when outputting said third results data, said synchronization unit updates said fourth identification information to said third identification information.

8. The time series data processing device according to claim 7, wherein
before said first process results in a state that said first process can be stopped, said control unit appends as said second identifier a same value as said first identifier and appends as said second version number a version number older than said first version number; and
when said first process results in the state that said first process can be stopped, said control unit appends as said second identifier the same value as said first identifier and appends as said second version number the version number newer than said first version number.

9. The time series data processing device according to claim 7, wherein
said first identification information comprises:
a first identifier that shows the contents of said first process and a first version number that shows a change history of said first process;
said second identification information comprises:
a second identifier that shows the contents of said second process and a second version number that shows a change history of said second process; and
said selection unit, when said first results data set and said second results data set have arrived simultaneously, said first identifier and said second identifier are equal, and said second version number is newer than said first version number, selects said second results data as said third results data set and discards said first results data set.

10. The time series data processing device according to claim 9, wherein
before said first process results in a state that said first process can be stopped, said control unit appends as said second identifier a same value as said first identifier and appends as said second version number a version number older than said first version number; and
when said first process results in the state that said first process can be stopped, said control unit appends as said second identifier the same value as said first identifier and appends as said second version number the version number newer than said first version number.

11. The time series data processing device according to claim 1, wherein
said first identification information comprises:
a first identifier that shows the contents of said first process and a first version number that shows a change history of said first process;
said second identification information comprises:
a second identifier that shows the contents of said second process and a second version number that shows a change history of said second process; and
said selection unit, when said first results data set and said second results data set have arrived simultaneously, said first identifier and said second identifier are equal, and said second version number is newer than said first version number, selects said second results data as said third results data set and discards said first results data set.

12. The time series data processing device according to claim 11, wherein
said fourth identification information comprises:
a fourth identifier that shows contents of the fourth process and a fourth version number that shows a change history of said fourth process; and
said synchronization unit, when said third identification information and said fourth identifier are equal, and said third version number is not older than said fourth version number, outputs said third results data and updating said recorded said fourth identification information to said third identification information.

13. The time series data processing device according to claim 11, wherein
before said first process results in a state that said first process can be stopped, said control unit appends as said second identifier a same value as said first identifier and appends as said second version number a version number older than said first version number; and
when said first process results in the state that said first process can be stopped, said control unit appends as said second identifier the same value as said first identifier and appends as said second version number the version number newer than said first version number.

14. A time series data processing method, comprising:
executing a first process and outputting a first results data;
executing a second process and outputting a second results data;
determining whether said first process can be stopped when an instruction to change a process is received from outside;
generating a first results data set by appending first identification information corresponding to contents of said first process to said first results data, and
generating a second results data set by appending second identification information corresponding to contents of said second process to said second results data;
selecting either of said first results data set or said second results data set as a third results data set on the basis of a first comparison result of said first identification information and said second identification information when said first results data set and said second results data set have arrived simultaneously; and
outputting or discarding third results data included in said third results data set on the basis of a second comparison result of third identification information included in said third results data and prerecorded fourth identification information.

15. A non-transitory storage medium that stored a time series data processing program making a computer equipped in a time series data processing device equipped with a first processing unit that executes a first process and outputs first results data and a second processing unit that executes a second process and outputs second results data function as:
a control means that, when an instruction to change a process is received from outside, determines whether said first process can be stopped, generates a first results data set by appending first identification information corresponding to contents of said first process to said first results data, and generates a second results data set by appending second identification information corresponding to contents of said second process to said second results data;
a selection means that, when said first results data set and said second results data set have arrived simultaneously, selects either of said first results data set or said second results data set as a third results data set on the basis of a first comparison result of said first identification information and said second identification information; and
a synchronization means that, on the basis of a second comparison result of third identification information included in said third results data and prerecorded fourth identification information, outputs or discards third results data included in said third results data set.

* * * * *